United States Patent
Babaei et al.

(10) Patent No.: US 10,638,487 B2
(45) Date of Patent: Apr. 28, 2020

(54) PACKET DUPLICATION CONTROL

(71) Applicants: Alireza Babaei, Fairfax, VA (US);
Esmael Dinan, Herndon, VA (US);
Kyungmin Park, Herndon, VA (US);
Hyoungsuk Jeon, Centreville, VA (US)

(72) Inventors: Alireza Babaei, Fairfax, VA (US);
Esmael Dinan, Herndon, VA (US);
Kyungmin Park, Herndon, VA (US);
Hyoungsuk Jeon, Centreville, VA (US)

(73) Assignee: Ofinno, LLC, Reston, VA (US)

( * ) Notice: Subject to any disclaimer, the term of this patent is extended or adjusted under 35 U.S.C. 154(b) by 39 days.

(21) Appl. No.: 15/983,838

(22) Filed: May 18, 2018

(65) Prior Publication Data
US 2018/0368132 A1 Dec. 20, 2018

Related U.S. Application Data

(60) Provisional application No. 62/520,251, filed on Jun. 15, 2017.

(51) Int. Cl.
*H04W 72/04* (2009.01)
*H04W 76/15* (2018.01)
(Continued)

(52) U.S. Cl.
CPC ......... *H04W 72/048* (2013.01); *H04L 1/1819* (2013.01); *H04L 5/0032* (2013.01);
(Continued)

(58) Field of Classification Search
CPC ... H04L 5/0032; H04L 5/0053; H04L 1/1819; H04L 1/1887; H04L 1/189; H04L 1/1893;
(Continued)

(56) References Cited

U.S. PATENT DOCUMENTS

2017/0366618 A1 12/2017 Vrzic et al.
2018/0098250 A1 4/2018 Vrzic et al.
(Continued)

FOREIGN PATENT DOCUMENTS

CN 107241164 A 10/2017
EP 2014074286 A1 5/2015
(Continued)

OTHER PUBLICATIONS

R1-121774; 3GPP TSG RAN WG1 Meeting #68bis; Jeju, Korea, Mar. 26-30, 2012; Source: QUALCOMM Incorporated; Title: Common E-RGCH based Interference Control for CELL_FACH; Agenda item: 6.4.2.3; Document for: Discussion.
(Continued)

*Primary Examiner* — Steven H Nguyen
(74) *Attorney, Agent, or Firm* — David Grossman; Kavon Nasabzadeh; Philip Smith

(57) ABSTRACT

A wireless device receives parameters indicating that first bearer(s) of bearer(s) are configured with duplication. Each bearer in bearer(s) is identified by an identifier. A control element of a fixed size of one octet is received. The control element comprises a sequence of activation bits comprising a first activation bit for a first bearer in the first bearer(s). A first position of the first activation bit in the one octet identifies a second position of a first bearer identifier in an ordered list of the bearer identifiers. A first value of the first activation bit indicates whether the PDCP duplication for the first bearer is activated or deactivated. In response to the control element indicating that the PDCP duplication is activated for the first bearer, a first packet corresponding to the first bearer is transmitted via a first cell and a duplicate of the first packet via a second cell.

20 Claims, 36 Drawing Sheets

(51) Int. Cl.
*H04L 1/18* (2006.01)
*H04W 80/02* (2009.01)
*H04W 76/11* (2018.01)
*H04L 5/00* (2006.01)
*H04W 72/12* (2009.01)
*H04W 72/14* (2009.01)

(52) U.S. Cl.
CPC ......... *H04L 5/0053* (2013.01); *H04W 72/042* (2013.01); *H04W 76/11* (2018.02); *H04W 76/15* (2018.02); *H04W 80/02* (2013.01); *H04W 72/1289* (2013.01); *H04W 72/14* (2013.01)

(58) Field of Classification Search
CPC ............. H04W 72/042; H04W 72/048; H04W 72/1289; H04W 72/14; H04W 76/11; H04W 76/15; H04W 80/02
See application file for complete search history.

(56) References Cited

U.S. PATENT DOCUMENTS

| | | | | |
|---|---|---|---|---|
| 2018/0279168 | A1* | 9/2018 | Jheng | H04W 76/20 |
| 2018/0324641 | A1* | 11/2018 | Tsai | H04L 69/321 |
| 2018/0324642 | A1* | 11/2018 | Yu | H04W 76/15 |
| 2018/0332501 | A1* | 11/2018 | Tseng | H04W 28/06 |

FOREIGN PATENT DOCUMENTS

| | | | |
|---|---|---|---|
| EP | 3069492 | A1 | 9/2016 |
| WO | 2017133763 | A1 | 8/2017 |
| WO | 2017182927 | A1 | 10/2017 |
| WO | 2017215670 | A1 | 12/2017 |
| WO | 2017220855 | A1 | 12/2017 |
| WO | 2018059557 | A1 | 4/2018 |
| WO | WO-2018171546 | A1 * | 9/2018 |

OTHER PUBLICATIONS

R2-1704247; 3GPP TSG-RAN WG2 Meeting #98; Hangzhou, China, May 15-19, 2017; Source: CATT; Title: Configuration and activation/deactivation of duplication; Agenda Item: 10.2.2; Document for: Discussion and Decision.
R2-1704834; 3GPP TSG-RAN2#98; Hangzhou, China, May 15-19, 2017; Agenda Item: 10.2.2; Source: Huawei; Title: Email discussion summary on control of UL PDCP duplication; Document for: Discussion and decision.
TS GSM 08.18 VI.0.0 (Aug. 1997); Digital cellular telecommunications system (Phase 2+); General Packet Radio Service (GPRS); Base Station System (BSS)—Serving GPRS Support Node (SGSN); BSS GPRS Protocol (BSSGP) (GSM 08.18 version 1.0.0).
International Search Report and Written Opinion dated Nov. 13, 2018, in PCT Application No. PCT/US2018/033419.
R2-1704248; 3GPP TSG-RAN WG2 Meeting #98; Hangzhou, China, May 15-19, 2017; Source: CATT; Title: Mapping of logical channels onto CCs in CA with duplication; Agenda Item: 10.2.2; Document for: Discussion and Decision.
R2-1705055; 3GPP TSG-RAN WG2 Meeting #98; Hangzhou, China, May 15-19, 2017; Agenda item: 10.2.2; Source: Qualcomm Incorporated; Title: Further details of PDCP duplication in CA case; WID/SID: NR_newRAT-Core—Release 15; Document for: Discussion and Decision.
3GPP TS 36.211 V14.2.0 (Mar. 2017); Technical Specification; 3rd Generation Partnership Project; Technical Specification Group Radio Access Network; Evolved Universal Terrestrial Radio Access (E-UTRA);Physical channels and modulation (Release 14).
3GPP TS 36.212 V14.2.0 (Mar. 2017); Technical Specification; 3rd Generation Partnership Project; Technical Specification Group Radio Access Network; Evolved Universal Terrestrial Radio Access (E-UTRA);Multiplexing and channel coding (Release 14).
3GPP TS 36.213 V14.2.0 (Mar. 2017); Technical Specification; 3rd Generation Partnership Project; Technical Specification Group Radio Access Network; Evolved Universal Terrestrial Radio Access (E-UTRA);Physical layer procedures (Release 14).
3GPP TS 36.300 V14.2.0 (Mar. 2017); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14).
3GPP TS 36.321 V14.2.1 (Mar. 2017); Technical Specification; 3rd Generation Partnership Project; Technical Specification Group Radio Access Network; Evolved Universal Terrestrial Radio Access (E-UTRA);Medium Access Control (MAC) protocol specification; (Release 14).
3GPP TS 36.331 V14.2.2 (Apr. 2017); Technical Specification; 3rd Generation Partnership Project; Technical Specification Group Radio Access Network; Evolved Universal Terrestrial Radio Access (E-UTRA);Radio Resource Control (RRC); Protocol specification (Release 14).
R1-121774; 3GPP TSG RAN WG1; Meeting #68bis; Jeju, Korea, Mar. 26-30, 2012; Source: QUALCOMM Incorporated; Title: Common E-RGCH based interference Control for CELL_FACH.
R2-1701186; 3GPP TSG-RAN WG2 Meeting #97; Athens, Greece, Feb. 13-17, 2017; Agenda Item: 10.2.1.2; Source: InterDigital Communications; Title: Packet Duplication at PDCP.
R2-1700172; 3GPP TSG-RAN2 NR Ad Hoc; Spokane, Washington, US, Jan. 17-19, 2017; Agenda item: 3.2.1.1; Source: Huawei, HiSilicon; Title: Evaluation on packet duplication in multi-connectivity.
R2-1700192; 3GPP TSG-RAN WG2 NR Ad Hoc; Spokane, USA, Jan. 17-19, 2017; Source: CATT, Alcatel-Lucent Shanghai Bell, Nokia; Title: Packet duplication across legs.
R2-1700193; 3GPP TSG-RAN WG2 NR Ad Hoc; Spokane, USA, Jan. 17-19, 2017; Source: CATT; Title: Performance analysis of packet duplication.
R2-1700336; 3GPP TSG-RAN WG2 NR Ad-hoc; Spokane, Washington, USA, Jan. 17-19, 2017; Agenda item: 3.2.1.2; Source: Intel Corporation; Title: Packet duplication for URLLC in DC and CA deployment.
R2-1700373; 3GPP TSG RAN WG2 AH_NR Meeting; Spokane, USA, Jan. 17-19, 2017; Agenda Item: 3.2.1.2; Source: KT Corp.; Title: Discussion on Multi-Connectivity data duplication for URLLC.
R2-1700423; 3GPP TSG-RAN WG2 NR Ad Hoc; Spokane, USA, Jan. 17-19, 2017; Agenda Item : 3.2.1.1 (FS_ NR_newRAT); Source: LG Electronics Inc.; Title: Packet duplication in NR.
R2-1700611; 3GPP TSG-RAN WG2 NR Ad Hoc; Spokane, USA, Jan. 17-19, 2017; Agenda item: 3.2.1.1; Source: Samsung; Title: Efficiency of Packet Duplication for NR.
R2-1700967; 3GPP TSG-RAN WG2 #97; Athens, Greece, Feb. 13-17, 2017; Source: CATT; Title: Packet Duplication in MAC.
R2-1701183; 3GPP TSG-RAN WG2 Meeting #97; Athens, Greece, Feb. 13-17, 2017; Agenda Item: 10.2.1.2; Source: InterDigital Communications; Title: Redundancy below PDCP for NR.
R2-1701201; 3GPP TSG-RAN2 Meeting #97; Athens, Greece, Feb. 13-17, 2017; Agenda item: 10.2.1.2; Source: Huawei, HiSilicon; Title: Redundancy Schemes below PDCP Layer.
R2-1701462; 3GPP TSG-RAN WG2 #97; Athens, Greece, Feb. 13-Feb. 17, 2017; Agenda item: 10.2.1.2 (FS_NR_newRAT); Source: LG Electronics Inc.; Title: Packet duplication in PDCP.
R2-1701542; 3GPP TSG-RAN WG2 Meeting #97; Athens, Greece, Feb. 13-17, 2017; Agenda Item: 10.2.1.2 (FS_NR_newRAT); Source: LG Electronics Inc.; Title: Packet duplication in CA.
R2-1701720; 3GPP TSG-RAN WG2 97 meeting; Athens, Greece, Feb. 13-17, 2017; Agenda item: 10.2.1.2; Source: Intel Corporation; Title: Packet duplication for URLLC within a gNB.
R2-1701846; 3GPP TSG-RAN WG2 #97; Athens, Greece, Feb. 13-17, 2017; Agenda Item: 10.2.2.5; Source: Huawei, HiSilicon; Title: Packet duplication for LTE-NR tight interworking.
R2-1701861; 3GPP TSG-RAN WG2 Meeting #97; Athens, Greece, Feb. 13-17, 2017; Agenda item: 10.2.1.2; Source: Nokia, Alcatel-Lucent Shanghai Bell; Title: Discussion on the support for packet duplication.

(56) References Cited

OTHER PUBLICATIONS

R2-1701986; 3GPP TSG-RAN WG2 Meeting #97; Athens, Greece, Feb. 13-17, 2017; Agenda item: 10.2.1.2; Source: Samsung; Title: Considerations on Packet Duplication for URLLC.
R2-1704272; 3GPP TSG-RAN WG2 Meeting #98; Hangzhou, China, May 15-19, 2017; Agenda item: 10.3.1.10; Source: Nokia, Alcatel-Lucent Shanghai Bell; Title: Duplication Impacts to MAC.
R2-1704496; 3GPP TSG-RAN WG2 Meeting #98; Hangzhou, China, May 15-19, 2017; Agenda Item : 10.3.1.7 (NR_newRAT-Core); Source : LG Electronics Inc.; Title: Semi-persistent scheduling in NR.
R2-1704605; 3GPP TSG-RAN2 Meeting #98; Hangzhou, China, May 15-19, 2017; Agenda Item: 10.3.1.6; Source: Huawei, HiSilicon; Title: PDCP Duplication for CA case.
R2-1704665; 3GPP TSG-RAN WG2 Meeting #98; Hangzhou, China, May 15-19, 2017; Agenda item: 10.3.1.5; Source: ZTE; Title: Consideration on the BSR for data duplication.
R2-1704666; 3GPP TSG-RAN WG2 Meeting #98; Hangzhou, China, May 15-19, 2017; Source: ZTE; Title: Consideration on the LCP for data duplication.
R2-1704834; 3GPP TSG-RAN2#98; Hangzhou, China, May 15-19, 2017; Source: Huawei; Title: Email discussion summary on control of UL PDCP duplication.
R2-1705200; 3GPP TSG-RAN WG2 Meeting #98; Hangzhou, China, May 15-19, 2017; Agenda item: 10.3.1.5; Source: Huawei, HiSilicon; Title: BSR procedure for data duplication.
Tdoc R2-1700428; 3GPP TSG-RAN WG2 #AH; Spokane, Washington, USA, Jan. 17-19, 2017; Agenda Item: 3.2.1.2; Source: Ericsson; Title: Data duplication and link selection for URLLC in NR.
Tdoc R2-1700833; 3GPP TSG-RAN WG2 #97; Athens, Greece, Feb. 13-17, 2017; Agenda Item: 10.2.1.2; Source: Ericsson; Title: Data duplication in lower layers (HARQ).
Tdoc R2-1700834; 3GPP TSG-RAN WG2 #97; Athens, Greece, Feb. 13-17, 2017; Agenda Item: 10.2.1.2; Source: Ericsson; Title: Further aspects of data duplication in PDCP layer.
Tdoc R2-1700865; 3GPP TSG-RAN WG2 #97; Athens, Greece, Jan. 13-17, 2017(Resubmission of R2-1700432); Agenda Item: 10.3.1.1.2; Source: Ericsson; Title: RLC ARQ vs. PDCP data recovery during mobility.
Tdoc R2-1700905; 3GPP TSG-RAN WG2 #97; Athens, Greece, Feb. 13-17, 2017; Agenda Item: 10.2.1.2; Source: Ericsson; Title: Summary of RAN2 solutions for URLLC.
Tdoc R2-1702032; Revision of R2-1700833; 3GPP TSG-RAN WG2 #97; Athens, Greece, Feb. 13-17, 2017; Agenda Item: 10.2.1.2; Source: Ericsson; Title: Data duplication in lower layers (HARQ).
TS GSM 08.18 v1.0.0 (Aug. 1997); Digital cellular telecommunications system (Phase 2+); General Packet Radio Service (GPRS); Base Station System (BSS)—Serving GPRS Support Node (SGSN); BSS GPRS Protocol (BSSGP) (GSM 08.18 version 1.0.0).
R2-1700959; 3GPP TSG-RAN2 #97; Athens, Greece, Feb. 13-17, 2017; Agenda Item: 10.2.1.4; Source: OPPO; Title: HARQ operation in NR; Document for: Discussion, Decision.
R2-1701057; 3GPP TSG-RAN WG2 #97; Feb. 13-17, 2017; Athens, Greece; Source: NTT DOCOMO, Inc.; Title: Clean-up and capturing missing agreements to TR 38.804; Document for: Discussion and decision; Agenda Item: 10.1.

* cited by examiner

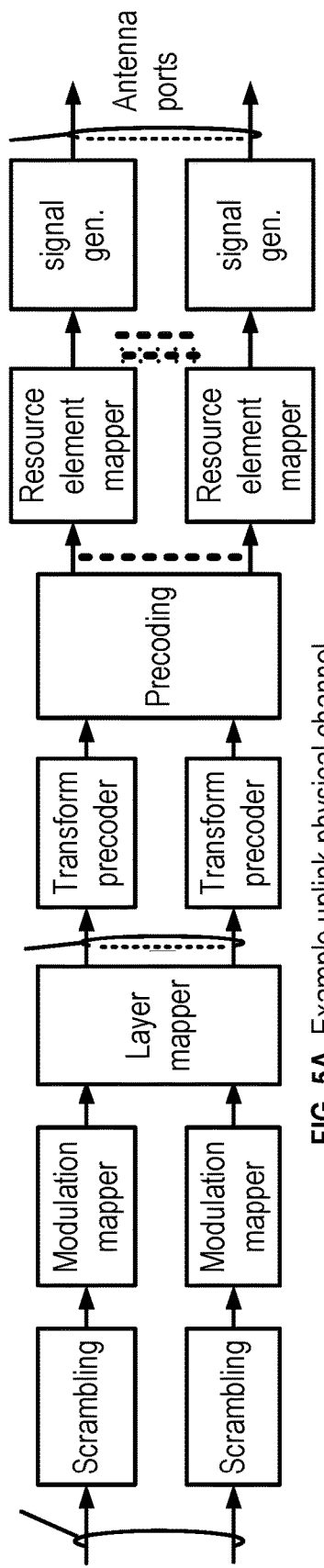
FIG. 5A Example uplink physical channel
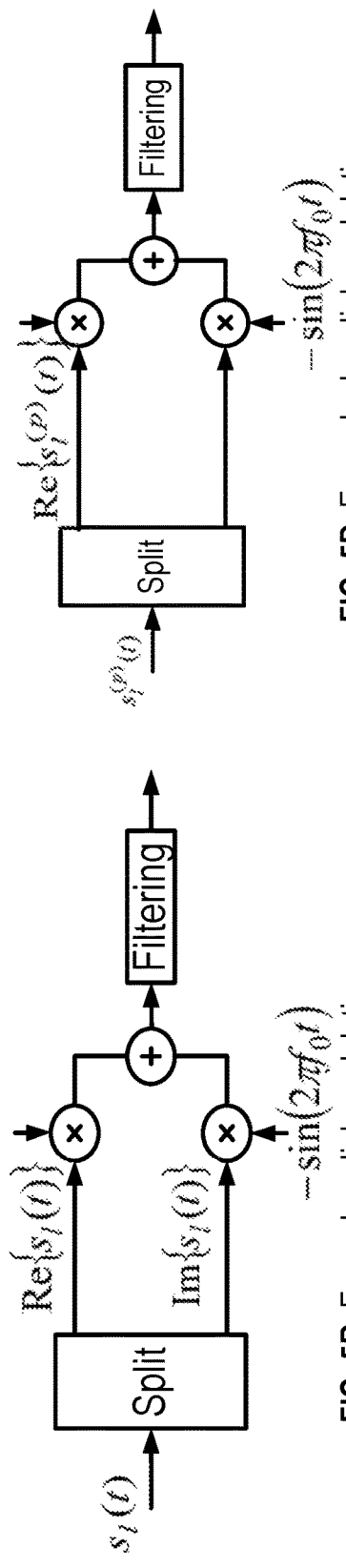
FIG. 5B Example uplink modulation
FIG. 5D Example downlink modulation
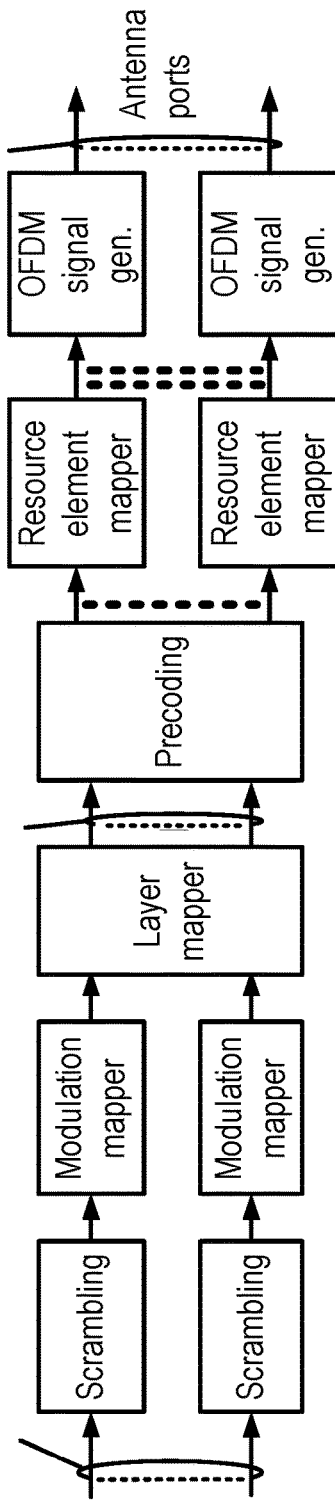
FIG. 5C Example downlink physical channel FIG. 7 Dual-Connectivity- two MAC entities at UE side Example 1: 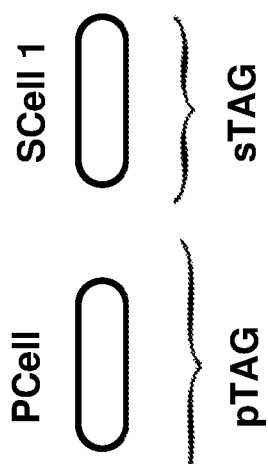
Example 2: 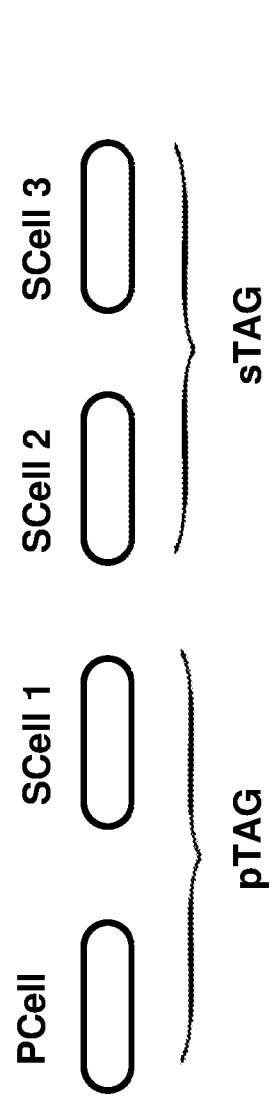
Example 3: 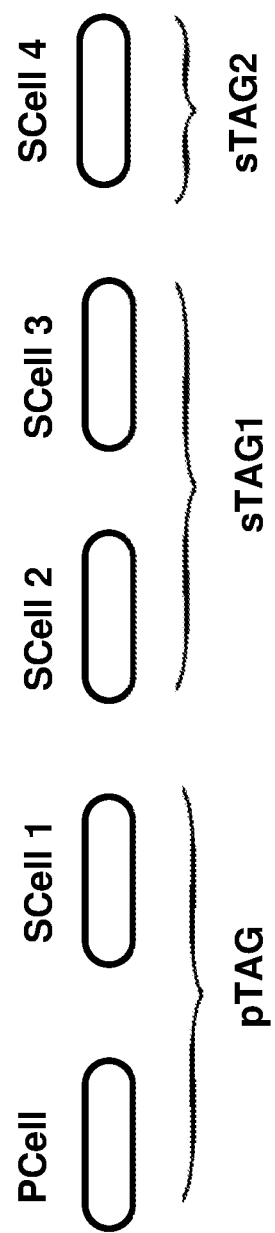
FIG. 8

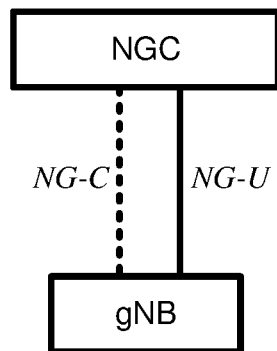
FIG. 10A  gNB connected to NGC
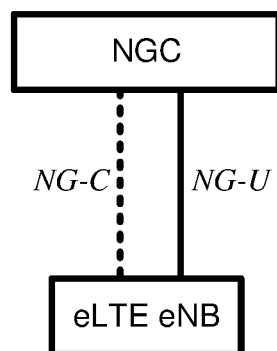
FIG. 10B  eLTE eNB connected to NGC

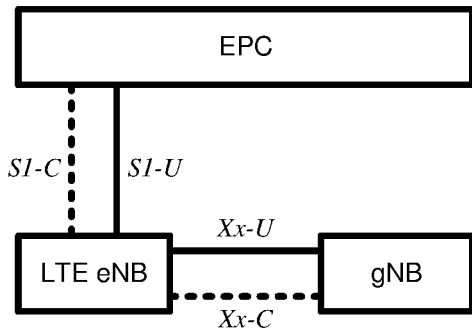

FIG. 11A LTE eNB connected to EPC with non-standalone gNB.
gNB user plane connected to EPC via LTE eNB.

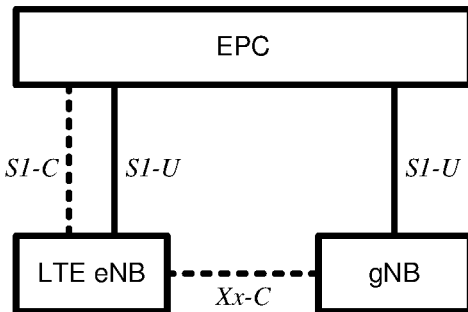

FIG. 11B LTE eNB connected to EPC with non-standalone gNB.
gNB user plane connected to EPC directly.

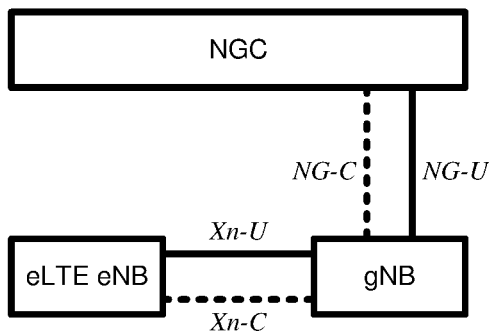

FIG. 11C gNB connected to NGC with non-standalone eLTE eNB.
eLTE eNB user plane connected to NGC via gNB.

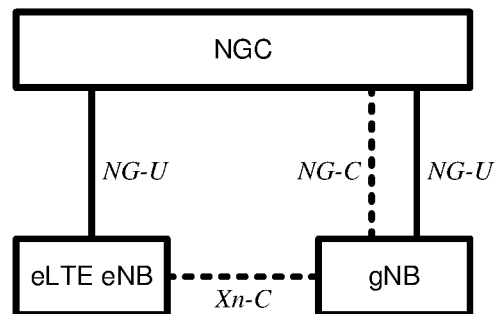

FIG. 11D gNB connected to NGC with non-standalone eLTE eNB.
eLTE eNB user plane connected to NGC directly.

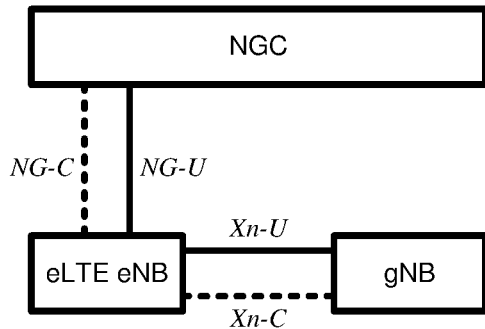

FIG. 11E eLTE eNB connected to NGC with non-standalone gNB.
gNB user plane connected to NGC via eLTE eNB.

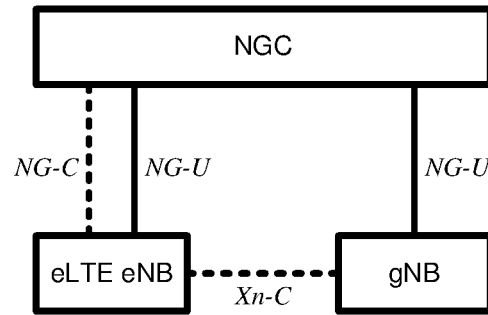

FIG. 11F eLTE eNB connected to NGC with non-standalone gNB.
gNB user plane connected to NGC directly.

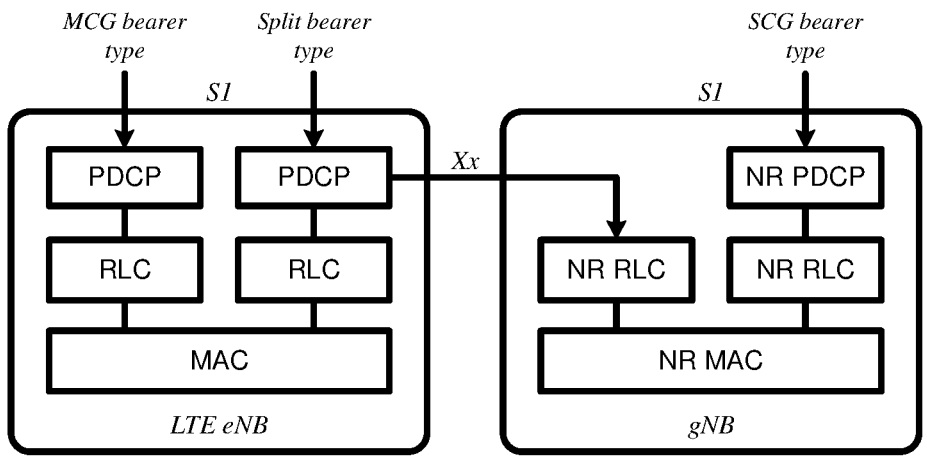
FIG. 12A Radio protocol architecture for split bearer and SCG bearer. LTE eNB connected to EPC with non-standalone gNB.
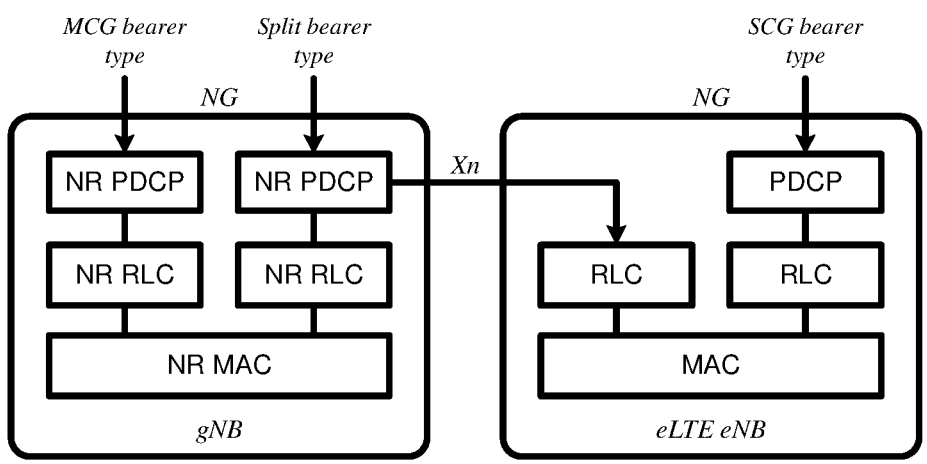
FIG. 12B Radio protocol architecture for split bearer and SCG bearer. gNB connected to NGC with non-standalone eLTE eNB.
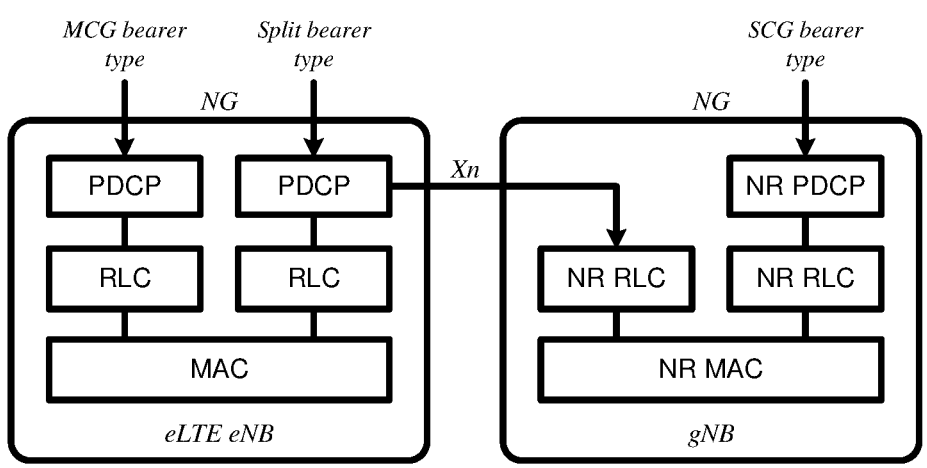
FIG. 12C Radio protocol architecture for split bearer and SCG bearer. eLTE eNB connected to NGC with non-standalone gNB.

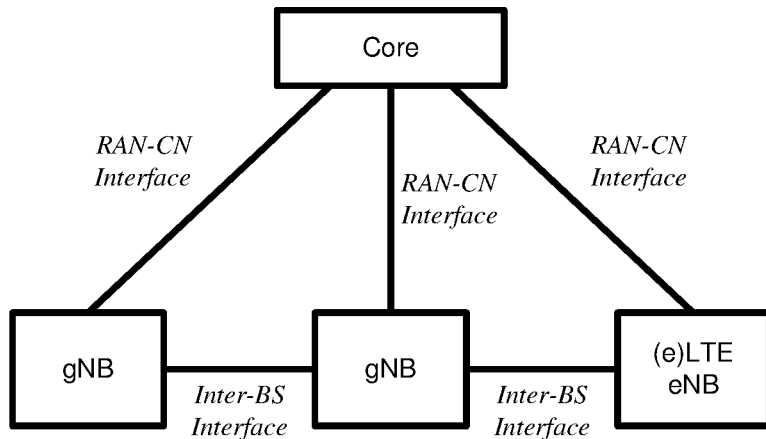
FIG. 13A Non-centralized deployment
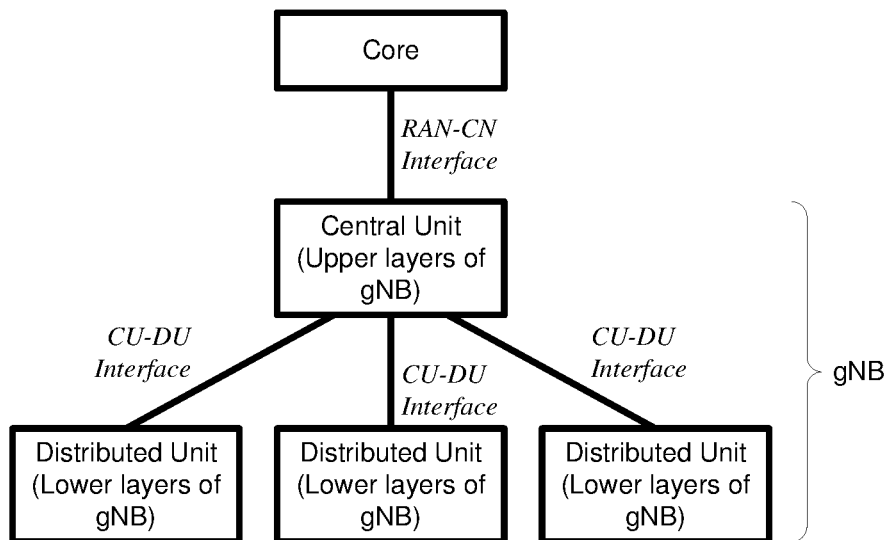
FIG. 13B Centralized deployment

FIG. 18

Receive, by a wireless device, message(s) comprising configuration parameters indicating that 1st bearer(s) in a plurality of bearers are configured with PDCP duplication, where each bearer in the plurality of bearers is identified by a bearer identifier
2710

Receive a control element of a fixed size of one octet, where: the control element comprises a sequence of activation bits comprising a 1st activation bit for a 1st bearer in the 1st bearer(s), where a 1st position of the 1st activation bit in the one octet identifies a 2nd position of a 1st bearer identifier in an ordered list of bearer identifiers of the 1st bearer(s) configured with the PDCP duplication; and a 1st value of the 1st activation bit indicates whether the PDCP duplication for the 1st bearer is activated or deactivated
2720

Transmit, in response to the control element indicating that the PDCP duplication is activated for the 1st bearer, a 1st packet corresponding to the 1st bearer via a 1st cell and a duplicate of the 1st packet via a 2nd cell
2730

FIG. 27

Transmit, by a base station, message(s) comprising configuration parameters indicating that first bearer(s) in a plurality of bearers are configured with PDCP duplication, where each bearer in the plurality of bearers is identified by a bearer identifier
3010

Transmit a control element of a fixed size of one octet, where: the control element comprises a sequence of activation bits comprising a 1st activation bit for a 1st bearer in the first bearer(s), where a 1st position of the 1st activation bit in the one octet identifies a 2nd position of a 1st bearer identifier in an ordered list of bearer identifiers of the first bearer(s) configured with the PDCP duplication; and a 1st value of the 1st activation bit indicates whether the PDCP duplication for the 1st bearer is activated or deactivated
3020

Receive, in response to the control element indicating that the PDCP duplication is activated for the 1st bearer, a 1st packet corresponding to the 1st bearer via a 1st cell and a duplicate of the 1st packet via a 2nd cell
3030

FIG. 30

Transmit, a control element comprising duplication activation bits comprising a 1st duplication activation bit for a 1st bearer, where a 1st position of the 1st duplication activation bit in the control element identifies a 2nd position of a 1st bearer identifier in an ordered list of bearer identifiers of bearer(s) configured with duplication
3210

Receive, in response to the duplication being activated for the 1st bearer, a 1st packet and a duplicate of the 1st packet
3220

FIG. 32

```
┌─────────────────────────────────────────────────────────────┐
│  Receive, by a wireless device, message(s) comprising: a    │
│ parameter indicating that uplink duplication is configured  │
│ for a bearer corresponding to a 1st logical channel and a   │
│ 2nd logical channel; 1st mapping restrictions of the 1st    │
│ logical channel to at least one 1st cell; and 2nd mapping   │
│     restrictions of the 2nd logical channel to at least     │
│                       one 2nd cell                          │
│                           3310                              │
└─────────────────────────────────────────────────────────────┘
                              │
                              ▼
┌─────────────────────────────────────────────────────────────┐
│   Receive a control element indicating activation or        │
│         deactivation of duplication for the bearer          │
│                           3320                              │
└─────────────────────────────────────────────────────────────┘
                              │
                              ▼
         ⬡ control element indicates activation of the ⬡
              duplication?
                 3330
                    │ Yes
                    ▼
┌─────────────────────────────────────────────────────────────┐
│ Applying the 1st mapping restrictions to the 1st logical    │
│ channel and the 2nd mapping restrictions to the 2nd         │
│                      logical channel                        │
│                           3340                              │
└─────────────────────────────────────────────────────────────┘
                              │
                              ▼
         ⬡ control element indicates deactivation of the ⬡
              duplication?
                 3350
                    │ Yes
                    ▼
┌─────────────────────────────────────────────────────────────┐
│ Lift the 1st mapping restrictions from the 1st logical      │
│  channel and the 2nd mapping restrictions from the 2nd      │
│                      logical channel                        │
│                           3360                              │
└─────────────────────────────────────────────────────────────┘
```

FIG. 33

```
┌─────────────────────────────────────────────────────────┐
│ Receive, by a wireless device, configuration parameters │
│   for a 1st periodic resource allocation and a 2nd      │
│             periodic resource allocation                │
│                         3610                            │
└─────────────────────────────────────────────────────────┘
                             │
                             ▼
┌─────────────────────────────────────────────────────────┐
│  Receive a control element indicating activation of     │
│                 duplication for a bearer                │
│                         3620                            │
└─────────────────────────────────────────────────────────┘
                             │
                             ▼
┌─────────────────────────────────────────────────────────┐
│   Activate, in response to receiving the control        │
│   element, 1st resources corresponding to the 1st       │
│   periodic resource allocation on a 1st cell and 2nd    │
│   resources corresponding to the 2nd periodic resource  │
│   allocation on a 2nd cell, where: 1st packets of the   │
│   bearer are transmitted via the 1st plurality of       │
│   resources; and a duplicate of the 1st packets are     │
│       transmitted via the 2nd plurality of resources    │
│                         3640                            │
└─────────────────────────────────────────────────────────┘
```

FIG. 36

PACKET DUPLICATION CONTROL

This application claims the benefit of U.S. Provisional Application No. 62/520,251, filed Jun. 15, 2017, which is hereby incorporated by reference in its entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present invention.

FIG. 8 shows example TAG configurations as per an aspect of an embodiment of the present invention.

FIG. 10A and FIG. 10B are example diagrams for interfaces between a 5G core network (e.g. NGC) and base stations (e.g. gNB and eLTE eNB) as per an aspect of an embodiment of the present invention.

FIG. 11A, FIG. 11B, FIG. 11C, FIG. 11D, FIG. 11E, and FIG. 11F are example diagrams for architectures of tight interworking between 5G RAN (e.g. gNB) and LTE RAN (e.g. (e)LTE eNB) as per an aspect of an embodiment of the present invention.

FIG. 12A, FIG. 12B, and FIG. 12C are example diagrams for radio protocol structures of tight interworking bearers as per an aspect of an embodiment of the present invention.

FIG. 13A and FIG. 13B are example diagrams for gNB deployment scenarios as per an aspect of an embodiment of the present invention.

FIG. 18 is an example illustration of PDCP duplication control MAC control element (MAC CE) format as per an aspect of an embodiment of the present invention.

FIG. 27 is a flow diagram of an aspect of an embodiment of the present disclosure.

FIG. 30 is a flow diagram of an aspect of an embodiment of the present disclosure.

FIG. 32 is a flow diagram of an aspect of an embodiment of the present disclosure.

FIG. 33 is a flow diagram of an aspect of an embodiment of the present disclosure.

FIG. 36 is a flow diagram of an aspect of an embodiment of the present disclosure.

DETAILED DESCRIPTION OF EMBODIMENTS

Figure 1:
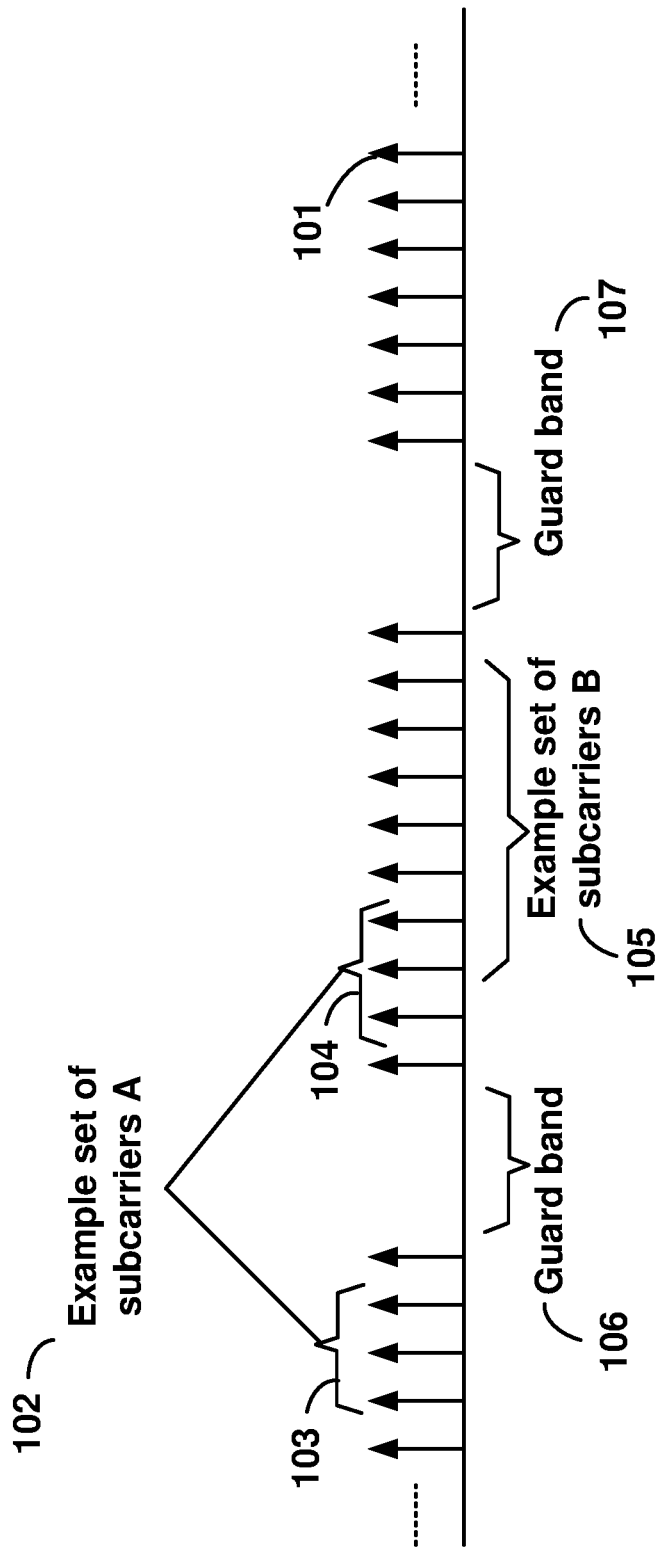
FIG. 1 is a diagram depicting example sets of OFDM subcarriers as per an aspect of an embodiment of the present invention.

Example embodiments of the present invention enable operation of carrier aggregation. Embodiments of the technology disclosed herein may be employed in the technical field of multicarrier communication systems. More particularly, the embodiments of the technology disclosed herein may relate to packet duplication in a multicarrier communication system.

The following Acronyms are used throughout the present disclosure:
ASIC application-specific integrated circuit
BPSK binary phase shift keying
CA carrier aggregation
CSI channel state information
CDMA code division multiple access
CSS common search space
CPLD complex programmable logic devices
CC component carrier
CP cyclic prefix
DL downlink DCI downlink control information
DC dual connectivity
eMBB enhanced mobile broadband
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LTE long term evolution
MCG master cell group
MeNB master evolved node B
MIB master information block
MAC media access control
MAC media access control
MME mobility management entity
mMTC massive machine type communications
NAS non-access stratum
NR new radio
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG resource block groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TTI transmission time intervalTB transport block
UL uplink
UE user equipment
URLLC ultra-reliable low-latency communications
VHDL VHSIC hardware description language
CU central unit
DU distributed unit
Fs-C Fs-control plane
Fs-U Fs-user plane
gNB next generation node B
NGC next generation core
NG CP next generation control plane core
NG-C NG-control plane
NG-U NG-user plane
NR new radio
NR MAC new radio MAC
NR PHY new radio physical
NR PDCP new radio PDCP
NR RLC new radio RLC
NR RRC new radio RRC
NSSAI network slice selection assistance information
PLMN public land mobile network
UPGW user plane gateway
Xn-C Xn-control plane
Xn-U Xn-user plane
Xx-C Xx-control plane
Xx-U Xx-user plane Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
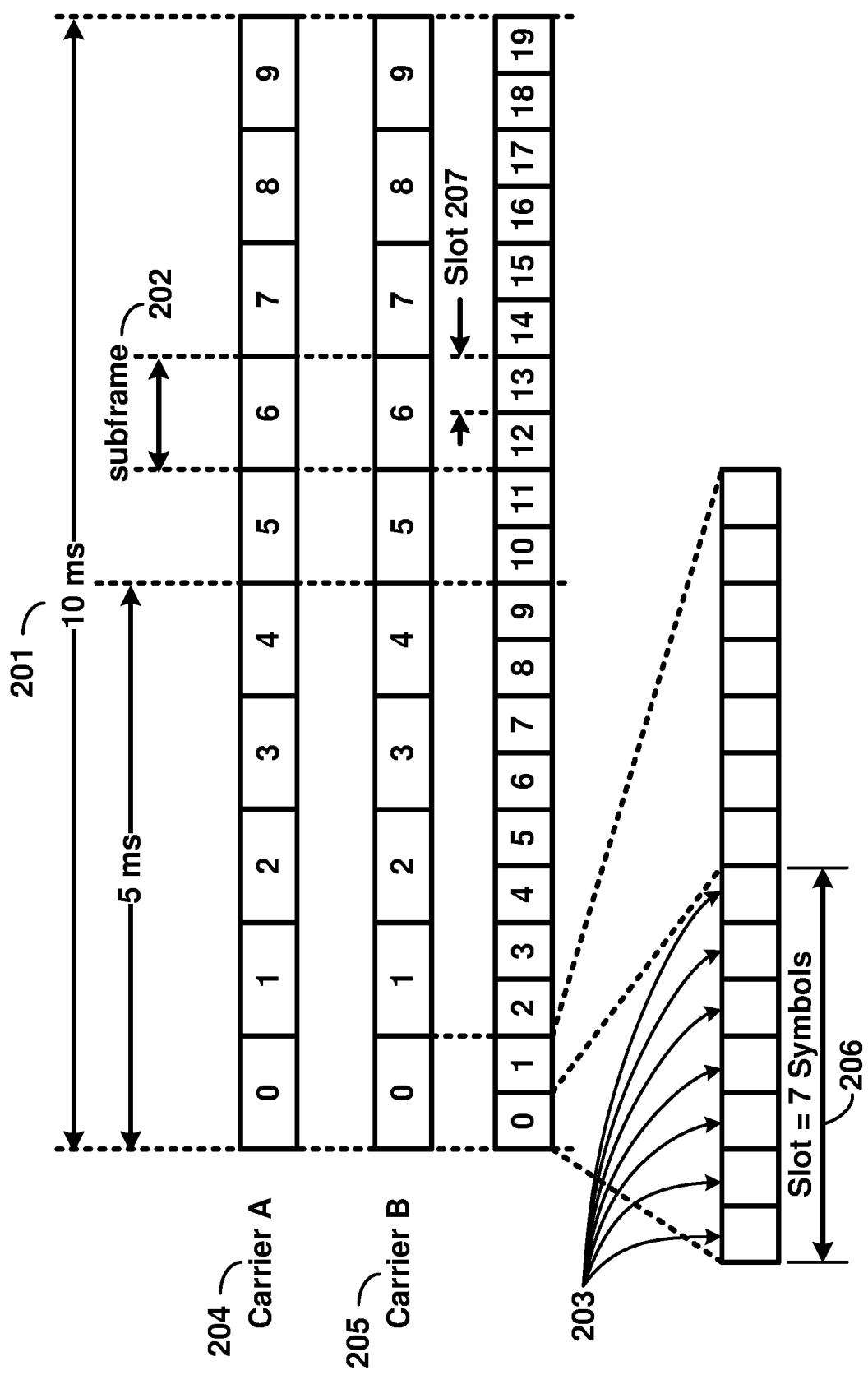
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may contain all downlink, all uplink, or a downlink part and an uplink part and/or alike. Slot aggregation may be supported, e.g., data transmission may be scheduled to span one or multiple slots. In an example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
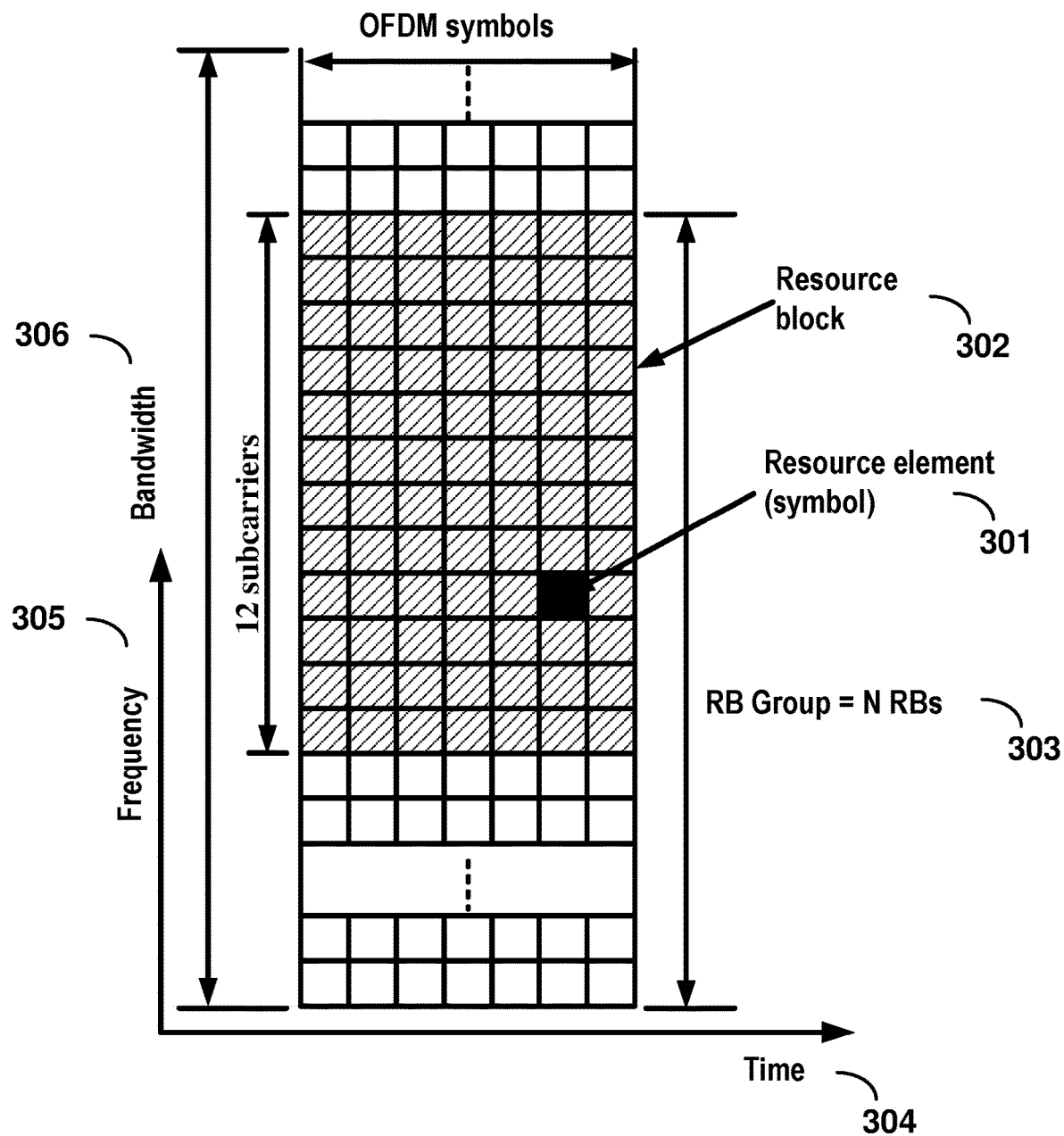
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

In an example embodiment, multiple numerologies may be supported. In an example, a numerology may be derived by scaling a basic subcarrier spacing by an integer N. In an example, scalable numerology may allow at least from 15 kHz to 480 kHz subcarrier spacing. The numerology with 15 kHz and scaled numerology with different subcarrier spacing with the same CP overhead may align at a symbol boundary every 1 ms in a NR carrier.

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
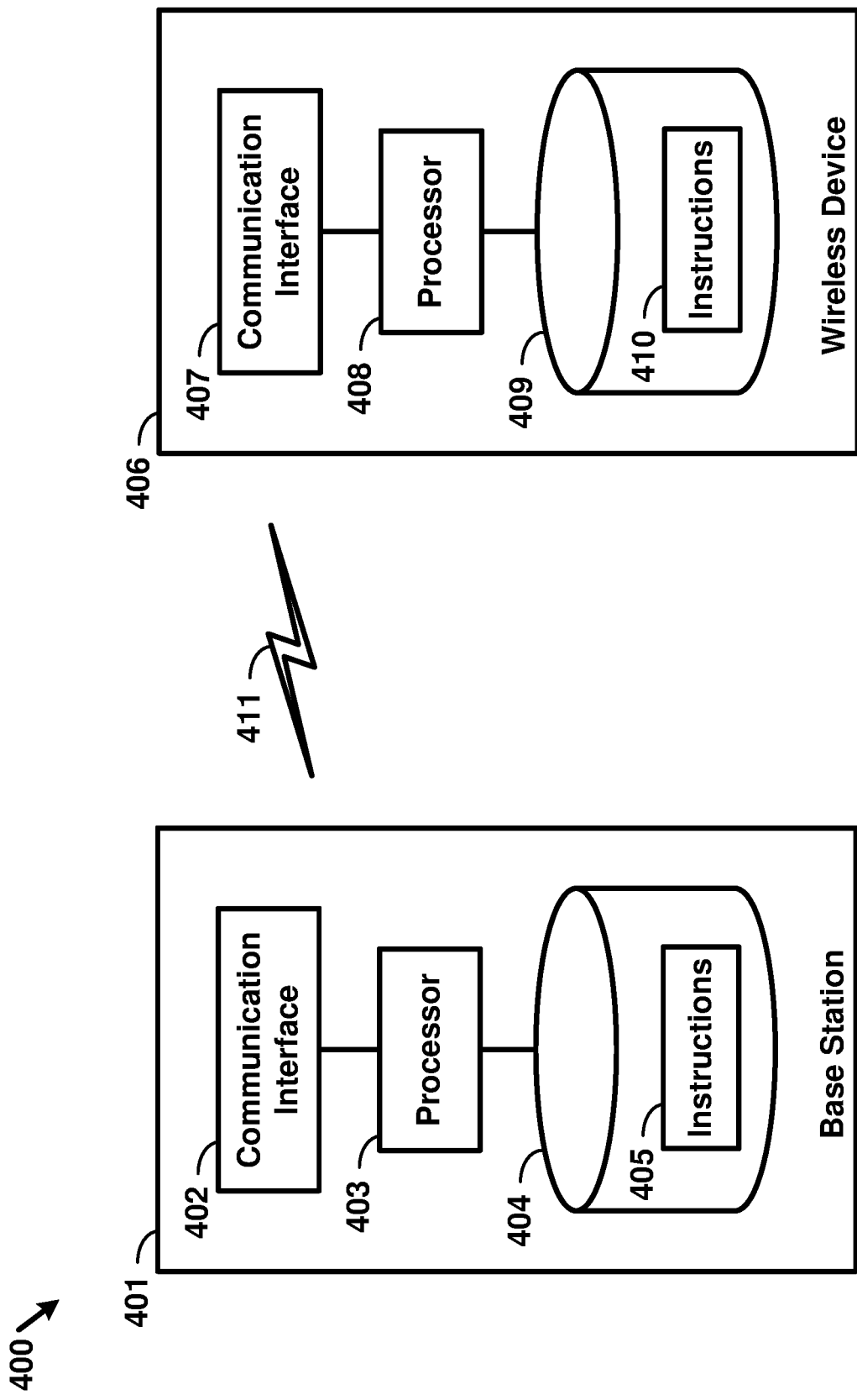
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, a 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g. employing an Xn interface). The base stations may also be connected employing, for example, an NG interface to an NGC. FIG. 10A and FIG. 10B are example diagrams for interfaces between a 5G core network (e.g. NGC) and base stations (e.g. gNB and eLTE eNB) as per an aspect of an embodiment of the present invention. For example, the base stations may be interconnected to the NGC control plane (e.g. NG CP) employing the NG-C interface and to the NGC user plane (e.g. UPGW) employing the NG-U interface. The NG interface may support a many-to-many relation between 5G core networks and base stations.

A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

Figure 6:
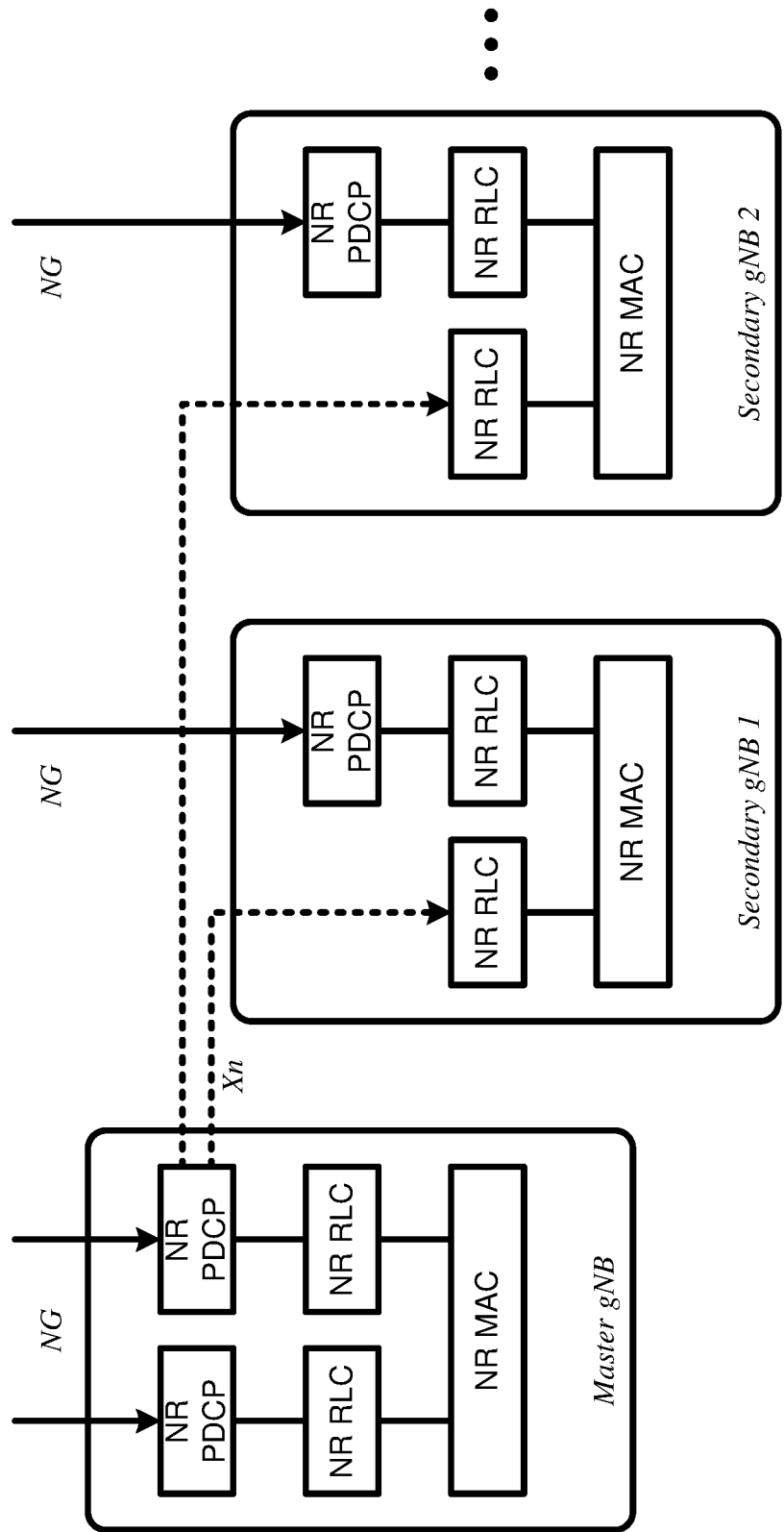
FIG. 6 is an example diagram for a protocol structure with multi-connectivity as per an aspect of an embodiment of the present invention.
Figure 7:
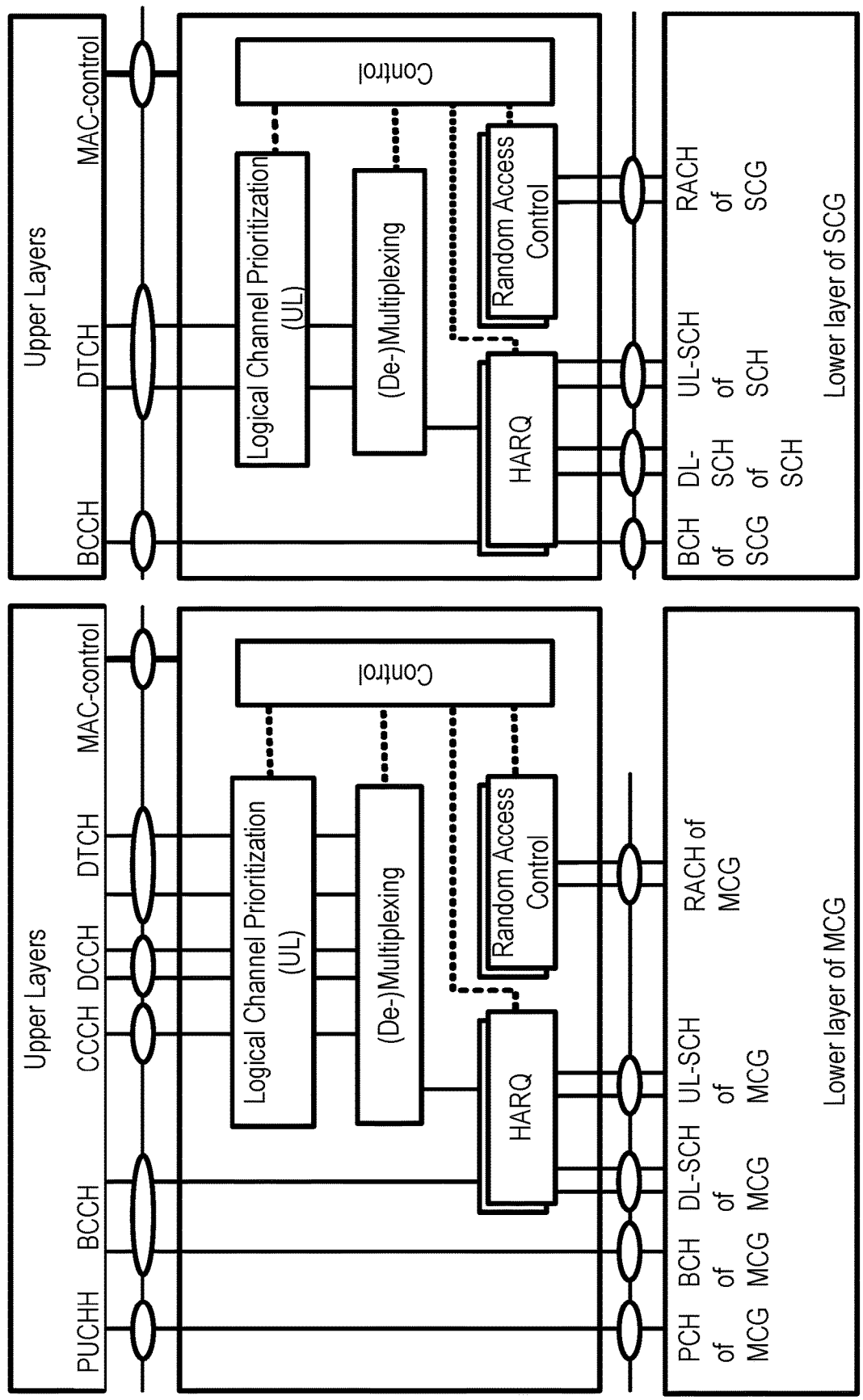
FIG. 7 is an example diagram for a protocol structure with CA and DC as per an aspect of an embodiment of the present invention.

FIG. 6 and FIG. 7 are example diagrams for protocol structure with CA and multi-connectivity as per an aspect of an embodiment of the present invention. NR may support multi-connectivity operation whereby a multiple RX/TX UE in RRC_CONNECTED may be configured to utilize radio resources provided by multiple schedulers located in multiple gNBs connected via a non-ideal or ideal backhaul over the Xn interface. gNBs involved in multi-connectivity for a certain UE may assume two different roles: a gNB may either act as a master gNB or as a secondary gNB. In multi-connectivity, a UE may be connected to one master gNB and one or more secondary gNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In multi-connectivity, the radio protocol architecture that a particular bearer uses may depend on how the bearer is setup. Three alternatives may exist, an MCG bearer, an SCG bearer and a split bearer as shown in FIG. 6. NR RRC may be located in master gNB and SRBs may be configured as a MCG bearer type and may use the radio resources of the master gNB. Multi-connectivity may also be described as having at least one bearer configured to use radio resources provided by the secondary gNB. Multi-connectivity may or may not be configured/implemented in example embodiments of the invention.

In the case of multi-connectivity, the UE may be configured with multiple NR MAC entities: one NR MAC entity for master gNB, and other NR MAC entities for secondary gNBs. In multi-connectivity, the configured set of serving cells for a UE may comprise of two subsets: the Master Cell Group (MCG) containing the serving cells of the master gNB, and the Secondary Cell Groups (SCGs) containing the serving cells of the secondary gNBs. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of NR RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master gNB may be informed by the UE of a SCG failure type, for split bearer, the DL data transfer over the master gNB is maintained; the NR RLC AM bearer may be configured for the split bearer; like PCell, PSCell may not be de-activated; PSCell may be changed with a SCG change (e.g. with security key change and a RACH procedure); and/or a direct bearer type change between a Split bearer and a SCG bearer or simultaneous configuration of a SCG and a Split bearer may or may not supported.

With respect to the interaction between a master gNB and secondary gNBs for multi-connectivity, one or more of the following principles may be applied: the master gNB may maintain the RRM measurement configuration of the UE and may, (e.g, based on received measurement reports or traffic conditions or bearer types), decide to ask a secondary gNB to provide additional resources (serving cells) for a UE; upon receiving a request from the master gNB, a secondary gNB may create a container that may result in the configuration of additional serving cells for the UE (or decide that it has no resource available to do so); for UE capability coordination, the master gNB may provide (part of) the AS configuration and the UE capabilities to the secondary gNB; the master gNB and the secondary gNB may exchange information about a UE configuration by employing of NR RRC containers (inter-node messages) carried in Xn messages; the secondary gNB may initiate a reconfiguration of its existing serving cells (e.g., PUCCH towards the secondary gNB); the secondary gNB may decide which cell is the PSCell within the SCG; the master gNB may or may not change the content of the NR RRC configuration provided by the secondary gNB; in the case of a SCG addition and a SCG SCell addition, the master gNB may provide the latest measurement results for the SCG cell(s); both a master gNB and secondary gNBs may know the SFN and subframe offset of each other by OAM, (e.g., for the purpose of DRX alignment and identification of a measurement gap). In an example, when adding a new SCG SCell, dedicated NR RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
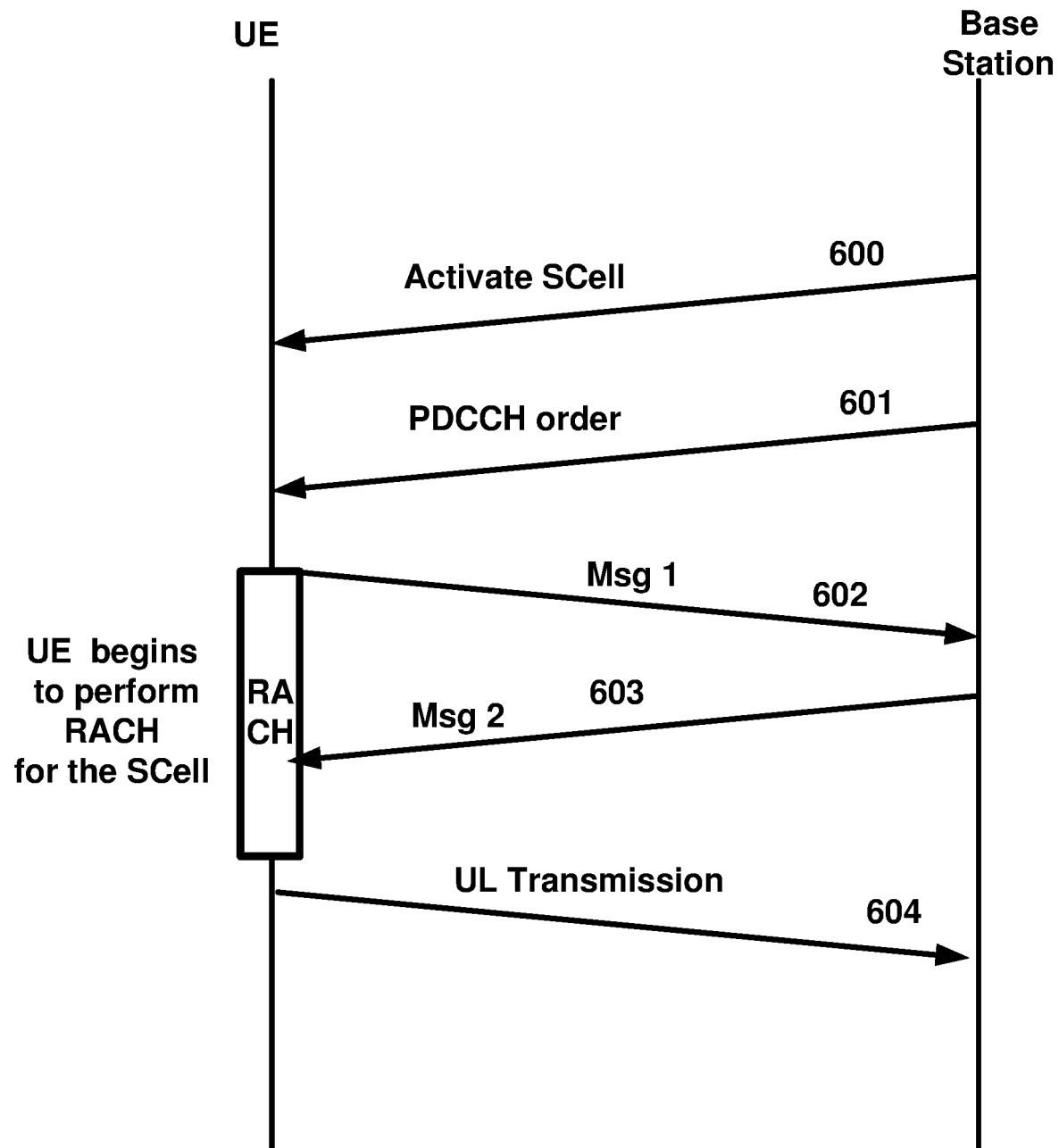
FIG. 9 is an example message flow in a random access process in a secondary TAG as per an aspect of an embodiment of the present invention.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the invention may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

FIG. 11A, FIG. 11B, FIG. 11C, FIG. 11D, FIG. 11E, and FIG. 11F are example diagrams for architectures of tight interworking between 5G RAN and LTE RAN as per an aspect of an embodiment of the present invention. The tight interworking may enable a multiple RX/TX UE in RRC_CONNECTED to be configured to utilize radio resources provided by two schedulers located in two base stations (e.g. (e)LTE eNB and gNB) connected via a non-ideal or ideal backhaul over the Xx interface between LTE eNB and gNB or the Xn interface between eLTE eNB and gNB. Base stations involved in tight interworking for a certain UE may assume two different roles: a base station may either act as a master base station or as a secondary base station. In tight interworking, a UE may be connected to one master base station and one secondary base station. Mechanisms implemented in tight interworking may be extended to cover more than two base stations.

In FIG. 11A and FIG. 11B, a master base station may be an LTE eNB, which may be connected to EPC nodes (e.g. to an MME via the S1-C interface and to an S-GW via the S1-U interface), and a secondary base station may be a gNB, which may be a non-standalone node having a control plane connection via an Xx-C interface to an LTE eNB. In the tight interworking architecture of FIG. 11A, a user plane for a gNB may be connected to an S-GW through an LTE eNB via an Xx-U interface between LTE eNB and gNB and an S1-U interface between LTE eNB and S-GW. In the architecture of FIG. 11B, a user plane for a gNB may be connected directly to an S-GW via an S1-U interface between gNB and S-GW.

In FIG. 11C and FIG. 11D, a master base station may be a gNB, which may be connected to NGC nodes (e.g. to a control plane core node via the NG-C interface and to a user plane core node via the NG-U interface), and a secondary base station may be an eLTE eNB, which may be a non-standalone node having a control plane connection via an Xn-C interface to a gNB. In the tight interworking architecture of FIG. 11C, a user plane for an eLTE eNB may be connected to a user plane core node through a gNB via an Xn-U interface between eLTE eNB and gNB and an NG-U interface between gNB and user plane core node. In the architecture of FIG. 11D, a user plane for an eLTE eNB may be connected directly to a user plane core node via an NG-U interface between eLTE eNB and user plane core node.

In FIG. 11E and FIG. 11F, a master base station may be an eLTE eNB, which may be connected to NGC nodes (e.g. to a control plane core node via the NG-C interface and to a user plane core node via the NG-U interface), and a secondary base station may be a gNB, which may be a non-standalone node having a control plane connection via an Xn-C interface to an eLTE eNB. In the tight interworking architecture of FIG. 11E, a user plane for a gNB may be connected to a user plane core node through an eLTE eNB via an Xn-U interface between eLTE eNB and gNB and an NG-U interface between eLTE eNB and user plane core node. In the architecture of FIG. 11F, a user plane for a gNB may be connected directly to a user plane core node via an NG-U interface between gNB and user plane core node.

FIG. 12A, FIG. 12B, and FIG. 12C are example diagrams for radio protocol structures of tight interworking bearers as per an aspect of an embodiment of the present invention. In FIG. 12A, an LTE eNB may be a master base station, and a gNB may be a secondary base station. In FIG. 12B, a gNB may be a master base station, and an eLTE eNB may be a secondary base station. In FIG. 12C, an eLTE eNB may be a master base station, and a gNB may be a secondary base station. In 5G network, the radio protocol architecture that a particular bearer uses may depend on how the bearer is setup. Three alternatives may exist, an MCG bearer, an SCG bearer, and a split bearer as shown in FIG. 12A, FIG. 12B, and FIG. 12C. NR RRC may be located in master base station, and SRBs may be configured as an MCG bearer type and may use the radio resources of the master base station. Tight interworking may also be described as having at least one bearer configured to use radio resources provided by the secondary base station. Tight interworking may or may not be configured/implemented in example embodiments of the invention.

In the case of tight interworking, the UE may be configured with two MAC entities: one MAC entity for master base station, and one MAC entity for secondary base station. In tight interworking, the configured set of serving cells for a UE may comprise of two subsets: the Master Cell Group (MCG) containing the serving cells of the master base station, and the Secondary Cell Group (SCG) containing the serving cells of the secondary base station. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one split bearer; upon detection of a physical layer problem or a random access problem on a PSCell, or the maximum number of (NR) RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master base station may be informed by the UE of a SCG failure type, for split bearer, the DL data transfer over the master base station is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a master base station and a secondary base station, one or more of the following principles may be applied: the master base station may maintain the RRM measurement configuration of the UE and may, (e.g, based on received measurement reports, traffic conditions, or bearer types), decide to ask a secondary base station to provide additional resources (serving cells) for a UE; upon receiving a request from the master base station, a secondary base station may create a container that may result in the configuration of additional serving cells for the UE (or decide that it has no resource available to do so); for UE capability coordination, the master base station may provide (part of) the AS configuration and the UE capabilities to the secondary base station; the master base station and the secondary base station may exchange information about a UE configuration by employing of RRC containers (inter-node messages) carried in Xn or Xx messages; the secondary base station may initiate a reconfiguration of its existing serving cells (e.g., PUCCH towards the secondary base station); the secondary base station may decide which cell is the PSCell within the SCG; the master base station may not change the content of the RRC configuration provided by the secondary base station; in the case of a SCG addition and a SCG SCell addition, the master base station may provide the latest measurement results for the SCG cell(s); both a master base station and a secondary base station may know the SFN and subframe offset of each other by OAM, (e.g., for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

FIG. 13A and FIG. 13B are example diagrams for gNB deployment scenarios as per an aspect of an embodiment of the present invention. In the non-centralized deployment scenario in FIG. 13A, the full protocol stack (e.g. NR RRC, NR PDCP, NR RLC, NR MAC, and NR PHY) may be supported at one node. In the centralized deployment scenario in FIG. 13B, upper layers of gNB may be located in a Central Unit (CU), and lower layers of gNB may be located in Distributed Units (DU). The CU-DU interface (e.g. Fs interface) connecting CU and DU may be ideal or non-ideal. Fs-C may provide a control plane connection over Fs interface, and Fs-U may provide a user plane connection over Fs interface. In the centralized deployment, different functional split options between CU and DUs may be possible by locating different protocol layers (RAN functions) in CU and DU. The functional split may support flexibility to move RAN functions between CU and DU depending on service requirements and/or network environments. The functional split option may change during operation after Fs interface setup procedure, or may change only in Fs setup procedure (i.e. static during operation after Fs setup procedure).

Figure 14:
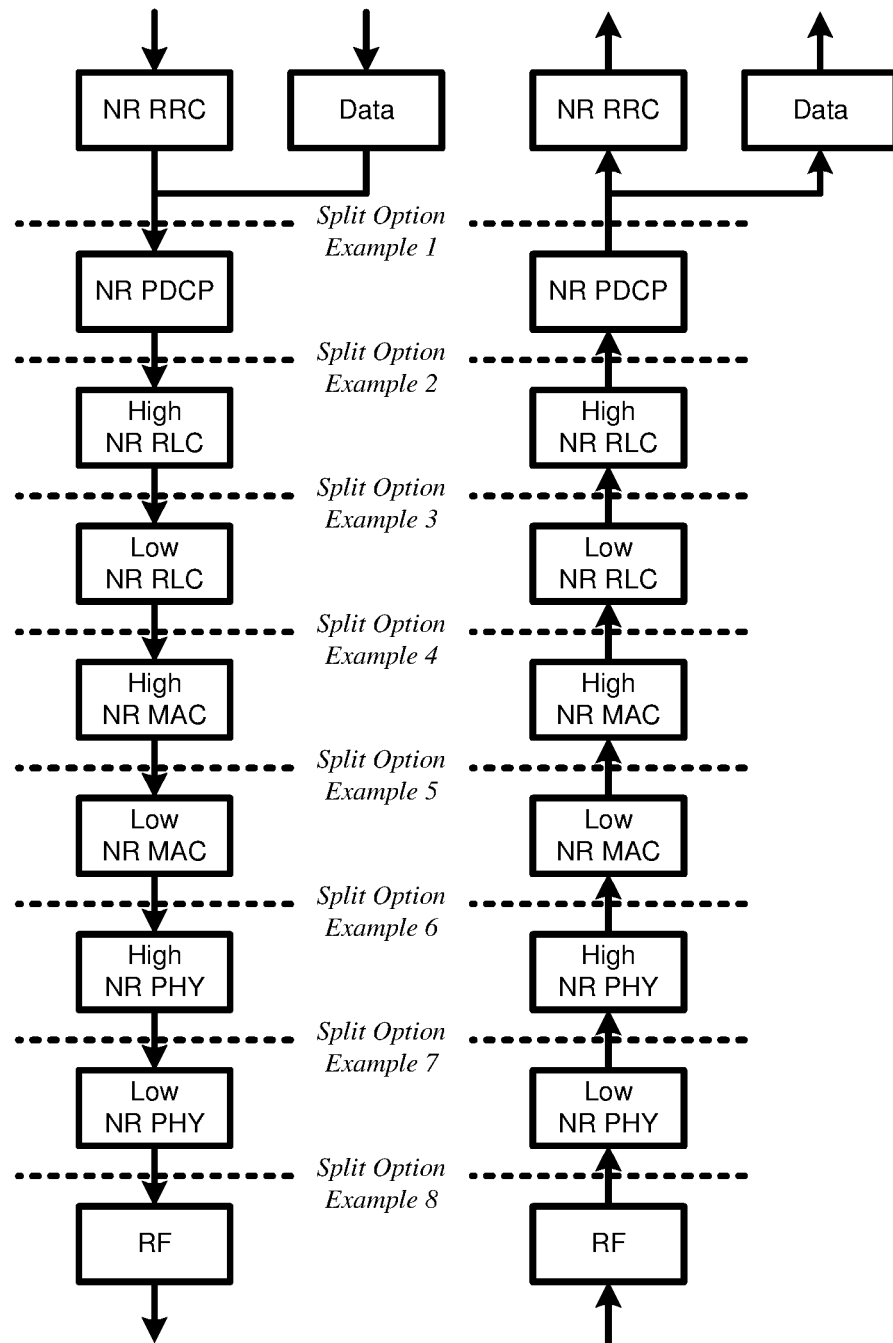
FIG. 14 is an example diagram for functional split option examples of the centralized gNB deployment scenario as per an aspect of an embodiment of the present invention.

FIG. 14 is an example diagram for different functional split option examples of the centralized gNB deployment scenario as per an aspect of an embodiment of the present invention. In the split option example 1, an NR RRC may be in CU, and NR PDCP, NR RLC, NR MAC, NR PHY, and RF may be in DU. In the split option example 2, an NR RRC and NR PDCP may be in CU, and NR RLC, NR MAC, NR PHY, and RF may be in DU. In the split option example 3, an NR RRC, NR PDCP, and partial function of NR RLC may be in CU, and the other partial function of NR RLC, NR MAC, NR PHY, and RF may be in DU. In the split option example 4, an NR RRC, NR PDCP, and NR RLC may be in CU, and NR MAC, NR PHY, and RF may be in DU. In the split option example 5, an NR RRC, NR PDCP, NR RLC, and partial function of NR MAC may be in CU, and the other partial function of NR MAC, NR PHY, and RF may be in DU. In the split option example 6, an NR RRC, NR PDCP, NR RLC, and NR MAC may be in CU, and NR PHY and RF may be in DU. In the split option example 7, an NR RRC, NR PDCP, NR RLC, NR MAC, and partial function of NR PHY may be in CU, and the other partial function of NR PHY and RF may be in DU. In the split option example 8, an NR RRC, NR PDCP, NR RLC, NR MAC, and NR PHY may be in CU, and RF may be in DU.

The functional split may be configured per CU, per DU, per UE, per bearer, per slice, or with other granularities. In per CU split, a CU may have a fixed split, and DUs may be configured to match the split option of CU. In per DU split, each DU may be configured with a different split, and a CU may provide different split options for different DUs. In per UE split, a gNB (CU and DU) may provide different split options for different UEs. In per bearer split, different split options may be utilized for different bearer types. In per slice splice, different split options may be applied for different slices.

In an example embodiment, the new radio access network (new RAN) may support different network slices, which may allow differentiated treatment customized to support different service requirements with end to end scope. The new RAN may provide a differentiated handling of traffic for different network slices that may be pre-configured, and may allow a single RAN node to support multiple slices. The new RAN may support selection of a RAN part for a given network slice, by one or more slice ID(s) or NSSAI(s) provided by a UE or a NGC (e.g. NG CP). The slice ID(s) or NSSAI(s) may identify one or more of pre-configured network slices in a PLMN. For initial attach, a UE may provide a slice ID and/or an NSSAI, and a RAN node (e.g. gNB) may use the slice ID or the NSSAI for routing an initial NAS signaling to an NGC control plane function (e.g. NG CP). If a UE does not provide any slice ID or NSSAI, a RAN node may send a NAS signaling to a default NGC control plane function. For subsequent accesses, the UE may provide a temporary ID for a slice identification, which may be assigned by the NGC control plane function, to enable a RAN node to route the NAS message to a relevant NGC control plane function. The new RAN may support resource isolation between slices. The RAN resource isolation may be achieved by avoiding that shortage of shared resources in one slice breaks a service level agreement for another slice.

The amount of data traffic carried over cellular networks is expected to increase for many years to come. The number of users/devices is increasing and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may be performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

Transmission reliability and latency enhancement are example aspects of ultra-reliable low-latency communications (URLLC). In an example, multi-connectivity may enhance reliability for URLLC. In an example, multi-connectivity may comprise packet duplication, link selection, etc. In an example, packet duplication may be used for user-plane and/or control-plane traffic. In an example, LTE-NR dual connectivity may use packet duplication. In an example, the packet data convergence protocol (PDCP) function in a transmitter may enable packet duplication and the PDCP function in the receiver may enable duplicate packet removal. In an example, radio link control (RLC) retransmission (e.g., ARQ) may not be used for URLLC, e.g., for meeting the user-plane latency requirements. In an example, redundancy schemes operating below PDCP and/ or in carrier aggregation (CA) scenarios may be used for the reliability/latency enhancement of URLLC.

In an example in NR, multi-connectivity (MC) may comprise dual-connectivity (DC) and/or carrier aggregation (CA). In an example, multi-connectivity may comprise collocated eNBs/gNBs and/or non-collocated eNBs/gNBs. In an example, packet duplication may be based on PDCP with a DC architecture. In an example, packet duplication may be used with centralized and/or non-centralized PDCP. In an example, packet duplication backhaul may be used with different latencies and/or different scheduler implementations (e.g., in LTE-NR integration).

In an example, PDCP duplication may be used in NR. In an example, packet duplication may be in lowers layers, e.g., MAC. In an example, DC may use a plurality of (e.g., two) MAC entities. In an example, the MAC entities and/or the schedulers in MAC entities may be coordinated. In an example, in CA, a common MAC entity, e.g., a scheduler, may control transmissions on a plurality of carriers. In an example, packet duplication may be used with CA. In an example, the MAC layer may have information (e.g., timely information) on radio channel quality measurements (such as channel state information (CSI) report, ACK/NACK feedback, etc.).

In an example, TTI repetitions may be configured e.g., in coverage-limited scenarios. TTI repetitions may increase the reliability. TTI repetitions may increase latency. In an example, the TTI repetitions may be performed on one or more carriers. In an example, with TTI repetitions, the received soft bits of multiple consecutive transmissions within a same HARQ process may be combined. Soft combining gain and/or incremental redundancy gains (e.g., if supported within TTI repetitions) may be achieved.

In an example, duplicate transmission of MAC PDUs (e.g., same transport blocks) may be used. In an example, two or more transport blocks (TBs) of a same size may be created by MAC multiplexing and assembly entity. In an example, two or more TBs may comprise a same duplicated MAC PDU. In an example, HARQ transmissions among carriers may be coupled, e.g., using a same transport block size (TBS). In an example, a receiver may use joint decoding (e.g., soft combining) of the transmissions. In an example, HARQ feedback may be aligned among the carriers. The RLC duplicate discard function may be used to handle the duplicates.

In an example, duplicate transmission of MAC SDUs, e.g., RLC PDUs and/or RLC PDU segments may be used. In an example, MAC multiplexing and assembly entity may transmit MAC SDU duplicates via a plurality of carriers. In an example, the HARQ transmissions among the carriers, e.g. transport block size (and required spectrum), HARQ feedback transmissions, etc. may be independent. In an example, a plurality of carrier bandwidths (e.g., numerologies) and/or carriers with different traffic loads may be considered. In an example, RLC duplicate discard function may be used at the receiver to handle the duplicates.

In an example, NR MAC may support data duplication in carrier aggregation. In an example, the MAC may be configured to duplicate and transmit MAC SDUs among a plurality of carries. In an example, HARQ operation of the transmissions may be independent. In an example, duplicate discard functionality of RLC may be used to discard the duplicates.

In an example, PDCP split bearer and/or PDCP split bearer architecture may be used in CA. In an example, a plurality of RLC entities may be configured corresponding to a PDCP bearer. In an example, PDCP may comprise the duplication function and/or duplicate discard function. In an example, duplicate data may be mapped to two or more logical channels. In an example, MAC multiplexing entity may map data of the RLC entities to different carriers that may be independently transmitted by the HARQ entities associated with the corresponding carriers. In an example, logical channel carrier restrictions may be applied. In an example, one or more flags may be configured for a logical channel to allow/forbid scheduling on one or more carriers. In an example, PDCP split bearer with duplication function may be used in CA architecture. In an example, duplication for CA may build on the PDCP split bearer for duplication to two or more logical channels associated with a MAC entity. In an example, for duplication with CA, transmission restrictions may be configured for one or more carriers per logical channel.

In an example, NR MAC may support data duplication in carrier aggregation by transmitting data from different logical channels using different cells/carriers (e.g. by defining carrier restrictions for a logical channel). Data duplication and duplicate discard may be done in PDCP layer. The PDCP split bearer may be configured with a plurality of logical channels associated to a same cell group/MAC. In an example, data duplicated on PDCP and provided to the different logical channels may be transmitted by MAC via a plurality of carriers.

In an example, using MAC duplication, two or more same transport blocks (TB) may be transmitted across a plurality of legs, e.g., using one or more MCS and/or redundancy versions. In an example, separate HARQ functions may operate in each leg, e.g., in CA with a HARQ entity comprising a plurality of HARQ processes for a carrier. In an example, a TB may be encoded/decoded and/or go through HARQ process independently. A duplication detection/removal mechanism may be used in MAC layer. In an example, upper layers may handle the duplication detection.

In an example, packet duplication in MAC may be above the HARQ function (e.g., a function per leg) or at the HARQ function level (e.g., single function for sending and combining redundancy versions). In an example, packet duplication in MAC above the HARQ function (e.g., one function per leg) may use a duplication detection/removal function in MAC, or in higher layers.

In an example, packet duplication may be used for user-plane and/or control-plane in NR PDCP. In an example, redundancy schemes operating below PDCP may be used. In an example, a duplication scheme operating at the MAC sublayer may enable a plurality of transmissions of a transport block over a plurality of resource sets to provide diversity gain e.g., against fading, interference and/or link blockage (e.g., shadowing). The different resource sets may be separated in time, frequency and/or space domains. In an example, at the receiver, the transmissions may be soft-combined and/or processed separately.

In an example, PDCP packet duplication may be configured by radio resource configuration (RRC) signaling, e.g., per bearer and/or split radio bearer. In an example, PDCP packet duplication may be configured per UE using higher layer signaling (e.g., RRC). In an example, packet duplication may be enabled/disabled considering e.g., UE mobility, cell resource availability, backhaul loads and latency, etc. In an example, PDCP packet duplication may be activated or deactivated dynamically through downlink control signaling (e.g., physical layer and/or MAC layer signaling). In an example, a UE may initiate duplication e.g., based on triggering one or more criteria (e.g. measurements of L1, L2 signals, or radio resource management (RRM) and/or radio link monitoring (RLM) events, etc.). In an example, a UE may autonomously activate or deactivate PDCP packet duplication based on one or more configured criteria. The one or more criteria may be configured e.g., with RRC. In an example, a UE may receive a configuration of a prohibit timer (e.g., PDCP duplication prohibit timer). In an example, a UE may start the timer when it receives control signaling from gNB/network indicating that PDCP duplication may be deactivated. The UE may autonomously activate duplication when the timer is expired. The timer may be set to infinity to disable UE autonomous activation of PDCP duplication.

In an example, with URLLC packet duplication at PDCP, a UE may report data in its PDCP buffer to a MAC entity in multi-connectivity. In an example, duplicated data may be considered as new data available for transmission. In an example, the duplicated data may be reported and transmitted, e.g., in the same manner as other data. In an example, for MAC buffer status reporting, the UE MAC may include amount of data resulting from the PDCP duplication function as data available for transmission. In an example, data duplicates may use separate uplink grants. In an example, a grant may be unique per cell group. In an example, assignment between a PDCP duplicate PDU and a MAC entity may be done when the duplicate PDUs are generated in PDCP. In an example, a UE may trigger BSR/SR to an applicable MAC entity. In an example, for resource allocation based on dynamic scheduling, a UE may assign a duplicate PDCP PDU to different MAC entities and triggers BSR/SR for an applicable MAC entity when PDCP duplication is active.

In an example, PDCP at a transmitter may support duplicated packet transmission over a plurality of links. In an example, PDCP at a receiver may perform duplication detection/removal. In an example, for a CA scenario, where transmission points on different carrier frequencies may be connected by ideal backhaul, PDCP duplication may be applied, e.g., based on Dual-Connectivity/Multi-Connectivity framework. In an example, PDCP duplication based on Dual-Connectivity/Multi-Connectivity framework may be applied to scenarios where transmission points on different carrier frequencies are connected by ideal backhaul. In an example redundancy operation below PDCP, duplication may be at RLC layer. In an example, RLC entity at a transmitter may make duplicate transmissions of a PDU. In an example, RLC entity at a receiver side may remove received duplications. In an example, redundancy operation at MAC layer may be MAC SDU duplication and/or autonomous HARQ redundant transmission.

In an example, a RLC PDU may correspond to a PDCP PDU. In an example, a duplicated RLC PDU may comprise a duplicated PDCP PDU. In an example, duplicate transmission of RLC PDUs may be equivalent to duplicate transmission of PDCP PDUs. In an example carrier aggregation (CA) scenario (e.g., ideal backhaul), PDCP entity and RLC entity may share a same topology of transmission points and backhaul structure. In an example, MAC SDU duplication may use one HARQ entity per component carrier/cell. In an example, a MAC TB may be transmitted by a HARQ process of a HARQ entity at a carrier. The duplicated MAC SDUs may be in the respective TBs generated for different carriers. The duplication may be at MAC SDU level, which may correspond to a RLC PDU and in turn to a PDCP PDU. In an example, a MAC SDU may not have a sequence number in NR.

In an example, different redundancy versions of a MAC TB may be transmitted over a plurality of aggregated carriers. In an example, a HARQ process may transmit different RVs of a MAC TB over a plurality of component carriers. At the receiver, soft combining may be used. In an example, a MAC TB may consist of a plurality of MAC SDUs/RLC PDUs/PDCP PDUs. In an example, packet duplication may be applied to data radio bearers (DRBs)/ logical channels carrying URLLC like services.

In an example, a gNB may configure/enable/disable data redundancy below PDCP layer, considering radio conditions and functionalities provisioned in other layers. In an example, a logical channel may be mapped to one or more numerologies/TTI durations/transmission durations. In an example, if a logical channel may be mapped to one or more numerologies/TTI durations/transmission durations, duplicate data of the logical channel may be transmitted over the one or more numerologies (e.g., in a single carrier and/or multiple carriers).

In an example, support for packet duplication function may be configured per radio bearer. In an example, a UE may enable/disable packet duplication function. In an example, the gNB may indicate the UE to turn on/off the duplication function (e.g., using RRC and/or physical layer and/or MAC layer signaling). In an example, for a radio bearer with packet duplicate function, enabling/disabling packet duplication function may be dynamically controlled.

In an example, for UL packet duplication using Dual connectivity in NR-NR inter-working scenario, the UL PDCP entity of the radio bearer may coordinate the transmission of the UL PDCP PDU towards the secondary cell group (SCG) and master cell group (MCG) by indicating the data availability of the same UL PDCP SDU in the buffer status reports (BSRs) to both MCG and SCG. In an example, the wireless device may transmit PDUs of a same PDCP SDU in the logical channels of the MCG and SCG. In an example, the UL PDCP entity may maintain the data availability for the MCG and the SCG separately (e.g. by maintaining separate PDCP SDU buffers for MCG and SCG, or by maintaining separate available or unavailable indications corresponding to SDUs in the same buffer). In an example, whether to allow for duplication and the number of duplications may be configurable via RRC signaling per radio bearer.

In an example, the BSR procedure and SR triggering may be similar as in normal operation without packet duplication. The BSR and SR may be separately triggered by the MAC entities for MCG and SCG on the UE side. In an example, the logical channel(s) corresponding to URLLC may be configured to have highest priority and/or higher priority than other traffic channels. In an example, the logical channel prioritization (LCP) may prioritize the URLLC logical channel(s) when generating and sending the MAC PDU to the lower layers for the UL grant (e.g., configured or dynamic) corresponding to the numerology configured for the URLLC logical channel. In an example, for the DL packet duplication at the PDCP level, the DL RX PDCP entity may discard the duplicated PDCP PDUs e.g., if duplicate reception is detected.

In an example, RRM measurement for mobility in the connected mode may provide information for the gNB/network to manage addition and removal of a cell in multi-connectivity configuration. In an example, semi-static (e.g., using RRC) and dynamic signaling may control which legs of a split bearer, data may be duplicated. In an example, RRM measurements may be considered as baseline input for the data duplication control, e.g., a set of RSRP threshold.

In an example, for DL and UL, duplication for CA may use PDCP duplication to more than one logical channel. In an example, the duplicated PDCP PDUs may be sent over a plurality of (e.g., different) carriers. In an example, the logical channels with data and the logical channels with duplicate data may be handled by one MAC entity. In an example, the logical channels with data and the logical channels with duplicate data may be handled by two or more MAC entities.

In an example, a wireless device may receive one or more messages comprising one or more radio resource configuration (RRC) messages from one or more base stations (e.g., one or more NR gNBs and/or one or more LTE eNBs and/or one or more eLTE eNBs, etc.). In an example, the one or more messages may comprise configuration parameters for a plurality of logical channels. In an example, the one or messages may comprise a logical channel identifier for each of the plurality of logical channels. In an example, the logical channel identifier may be one of a plurality of logical channel identifiers. In an example, the plurality of logical channel identifiers may be pre-configured. In an example, the logical channel identifier may be one of a plurality of consecutive integers.

In an example, the plurality of logical channels configured for a wireless device may correspond to one or more bearers. In an example, there may be one-to-one mapping/correspondence between a bearer and a logical channel. In an example, there may be one-to-many mapping/correspondence between one or more bearers and one or more logical channels. In an example, a bearer may be mapped to a plurality of logical channels. In an example, data from a packet data convergence protocol (PDCP) entity corresponding to a bearer may be duplicated and mapped to a plurality of radio link control (RLC) entities and/or logical channels. In an example, scheduling of the plurality of logical channels may be performed by a single medium access control (MAC) entity. In an example, scheduling of the plurality of logical channels may be performed by a two or more MAC entities. In an example, a logical channel may be scheduled by one of a plurality of MAC entities. In an example, the one or more bearers may comprise one or more data radio bearers. In an example, the one or more bearers may comprise one or more signaling radio bearers. In an example, the one or more bearers may correspond to one or more application and/or quality of service (QoS) requirements. In an example, one or more bearers may correspond to ultra-reliable low latency communications (URLLC) applications and/or enhanced mobile broadband (eMBB) applications and/or massive machine to machine communications (mMTC) applications.

In an example, a first logical channel of the plurality of logical channels may be mapped to one or more of a plurality of transmission time intervals (TTIs)/transmission durations/numerologies. In an example, a logical channel may not be mapped to one or more of the plurality of TTIs/transmission durations/numerologies. In an example, a logical channel corresponding to a URLLC bearer may be mapped to one or more first TTIs/transmission durations and a logical corresponding to an eMBB application may be mapped to one or more second TTIs/transmission durations, wherein the one or more first TTIs/transmission duraions may have shorter duration than the one or more second TTIs/transmission durations. In an example, the plurality of TTIs/transmission durations/numerologies may be pre-configured at the wireless device. In an example, the one or more messages may comprise the configuration parameters of the plurality of TTIs/transmission durations/numerologies. In an example, a base station may transmit a grant/DCI to a wireless device, wherein the grant/DCI may comprise indication of a cell and/or a TTI/transmission durations/ numerology that the wireless device may transmit data. In an example, a first field in the grant/DCI may indicate the cell and a second field in the grant/DCI may indicate the TTI/transmission durations/numerology. In an example, a field in the grant/DCI may indicate both the cell and the TTI/transmission duration/numerology.

In an example, the one or more messages may comprise a logical channel group identifier for one or more of the plurality of the logical channels. In an example, one or more of the plurality of logical channels may be assigned a logical channel group identifier n, $0 \leq n \leq N$ (e.g., N=3, or 5, or 7, or 11 or 15, etc.). In an example, the one or more of the plurality of logical channels with the logical channel group identifier may be mapped to a same one or more TTIs/transmission durations/numerologies. In an example, the one or more of the plurality of logical channels with the logical channel group identifier may only be mapped to same one or more TTIs/transmission durations/numerologies. In an example, the one more of the plurality of logical channels may correspond to a same application and/or QoS requirements. In an example, one or more first logical channels may be assigned logical channel identifier(s) and logical channel group identifier(s) and one or more second logical channels may be assigned logical channel identifier(s). In an example, a logical channel group may comprise of one logical channel.

In an example, the one or more messages may comprise one or more first fields indicating mapping between the plurality of logical channels and the plurality of TTIs/transmission durations/numerologies and/or cells. In an example, the one or more first fields may comprise a first value indicating a logical channel is mapped to one or more first TTI/transmission duration shorter than or equal to the first value. In an example, the one or more first fields may comprise a second value indicating a logical channel is mapped to one or more second TTI/transmission durations longer than or equal to the second value. In an example, the one or more first fields may comprise and/or indicate one or more TTIs/transmission durations/numerologies and/or cells that a logical channel is mapped to. In an example, the mapping may be indicated using one or more bitmaps. In an example, if a value of 1 in a bitmap associated with a logical channel may indicate that the logical channel is mapped to a corresponding TTI/transmission duration/numerology and/or cell. In an example, if a value of 0 in the bitmap associated with a logical channel may indicate that the logical channel is not mapped to a corresponding TTI/transmission duration/numerology and/or cell. In an example, the one or more messages may comprise configuration parameters for the plurality of the logical channels. In an example, the configuration parameters for a logical channel may comprise an associated bitmap for the logical channel wherein the bitmap may indicate the mapping between the logical channel and the plurality of TTIs/transmission durations/numerologies and/or cells.

Figure 15:
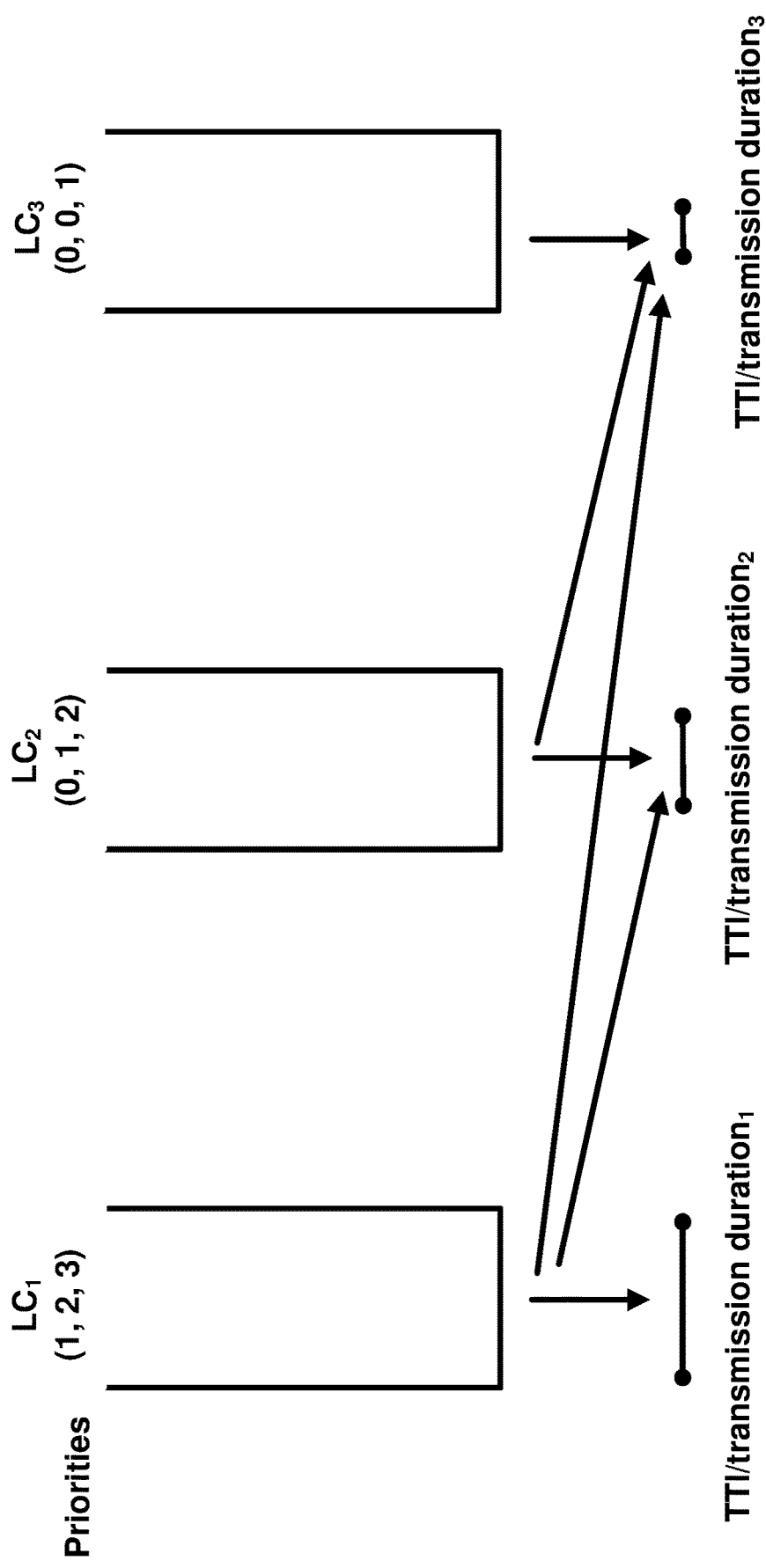
FIG. 15 is an example illustration of mapping of logical channels to transmission durations as per an aspect of an embodiment of the present invention.

In an example, a first logical channel may be assigned at least one first logical channel priority. In an example, the first logical channel may be assigned one or more logical channel priorities for one or more TTIs/transmission durations/numerologies. In an example, the first logical channel may be assigned a logical channel priority for each of the plurality of TTIs/transmission durations/numerologies. In an example, a logical channel may be assigned a logical channel priority for each of one or more of the plurality of TTIs/transmission durations/numerologies. In an example, a logical channel may be assigned a logical channel priority for each of one or more TTIs/transmission durations/numerologies wherein the logical channel is mapped to the each of the one or more TTIs/transmission durations/numerologies. In an example, the one or more messages may comprise one or more second fields indicating priorities of a logical channel on one or more TTIs/transmission durations/numerologies. In an example, the one or more second fields may comprise one or more sequences indicating priorities of a logical channel on one or more TTIs/transmission durations/numerologies. In an example, the one or more second fields may comprise a plurality of sequences for the plurality of logical channels. A sequence corresponding to a logical channel may indicate the priorities of the logical channel on the plurality of TTIs/transmission durations/numerologies/cells or one or more of the plurality of TTIs/transmission durations/numerologies/cells. In an example, the priorities may indicate mapping between a logical channel and one or more TTIs/transmission durations/numerologies. In an example, a priority of a logical channel with a given value (e.g., zero or minus infinity or a negative value) for a TTI/transmission duration/numerology may indicate that the logical channel is not mapped to the TTI/transmission duration/numerology. FIG. 15 illustrates an example with three TTIs/transmission durations/numerologies and three logical channels ($LC_1$, $LC_2$, $LC_3$) wherein $LC_1$ is mapped to $TTI_1$/transmission duration$_1$, $TTI_2$/transmission duration$_2$, and $TTI_3$/transmission duration$_3$ and $LC_2$ is mapped to $TTI_2$/transmission duration$_2$ and $TTI_3$/transmission duration$_3$ and $LC_3$ is mapped to $TTI_3$/transmission duration$_3$. In an example, priorities of $LC_1$ on $TTI_1$/transmission duration$_1$, $TTI_2$/transmission duration$_2$, and $TTI_3$/transmission duration$_3$ may be indicated as (1, 2, 3), priorities of $LC_2$ on $TTI_1$/transmission duration$_1$, $TTI_2$/transmission duration$_2$, and $TTI_3$/transmission duration$_3$ may be indicated as (0, 1, 2), priorities of $LC_3$ on $TTI_1$/transmission duration$_1$, $TTI_2$/transmission duration$_2$, and $TTI_3$/transmission duration$_3$ may be indicated as (0, 0, 1). In an example, sizes of the sequence may be variable. In an example, a size of a sequence associated with a logical channel may be a number of TTIs/transmission durations/numerologies to which the logical channel is mapped. In an example, the sizes of the sequence may be fixed, e.g., the number of TTIs/transmission durations/numerologies/cells.

In an example, a TTI/transmission duration/numerology for a grant (e.g., as indicated by the grant/DCI) may not accept data from one or more logical channels. In an example, the one or more logical channels may not be mapped to the TTI/transmission duration/numerology indicated in the grant. In an example, a logical channel of the one or more logical channels may be configured to be mapped to one or more TTIs/transmission durations/numerologies and the TTI/numerology for the grant may not be among the one or more TTIs/transmission durations/numerologies. In an example, a logical channel of the one or more logical channels may be configured with a max-TTI/transmission duration parameter indicating that the logical channel may not be mapped to a TTI/transmission duration longer than max-TTI/transmission duration, and the grant may be for a TTI/transmission duration longer than max-TTI/transmission duration. In an example, a logical channel may be configured with a min-TTI/transmission duration parameter indicating that the logical channel may not be mapped to a TTI/transmission duration shorter than min-TTI/transmission duration, and the grant may be for a TTI/transmission duration shorter than min-TTI/transmission duration. In an example, a logical channel may not be allowed to be transmitted on a cell and/or one or more numerologies/transmission durations and/or one or more numerologies of a cell. In an example, a logical channel may contain duplicate data and the logical channel may be restricted so that the logical channel is not mapped to a cell/transmission duration/numerology. In an example, the logical channel may not be configured with an upper layer configuration parameter 1aa-allowed and the cell may be an LAA cell.

In an example, a MAC entity and/or a multiplexing and assembly entity of a MAC entity may perform a logical channel prioritization (LCP) procedure to allocate resources of one or more grants, indicated to a wireless device by a base station using one or more DCIs, to one or more logical channel. In an example, the timing between a grant/DCI reception time at the wireless device and transmission time may be dynamically indicated to the wireless device (e.g., at least using a parameter in the grant/DCI). In an example, timing between a grant/DCI reception time at the wireless device and transmission time may be fixed/preconfigured and/or semi-statically configured. In an example, the LCP procedure for NR may consider the mapping of a logical channel to one or more numerologies/transmission durations/TTIs, priorities of a logical channel on the one or more numerologies/transmission durations/TTIs, the numerology/transmission duration/TTI indicated in a grant, etc. The LCP procedure may multiplex data from one or more logical channels to form a MAC PDU. The amount of data from a logical channel included in a MAC PDU may depend on the QoS parameters of a bearer and/or service associated with the logical channel, priority of the logical channel on the numerology/TTI/transmission duration indicated in the grant, etc. In an example, one or more grants may be processed jointly at a wireless device (e.g., resources of the one or more grants are allocated substantially at a same time). In an example, one or more first grants of the one or more grants may be grouped into a grouped grant with capacity equal to sum of the capacities of the one or more first grants and the resources of the grouped grant may be allocated to one or more logical channels.

Figure 16:
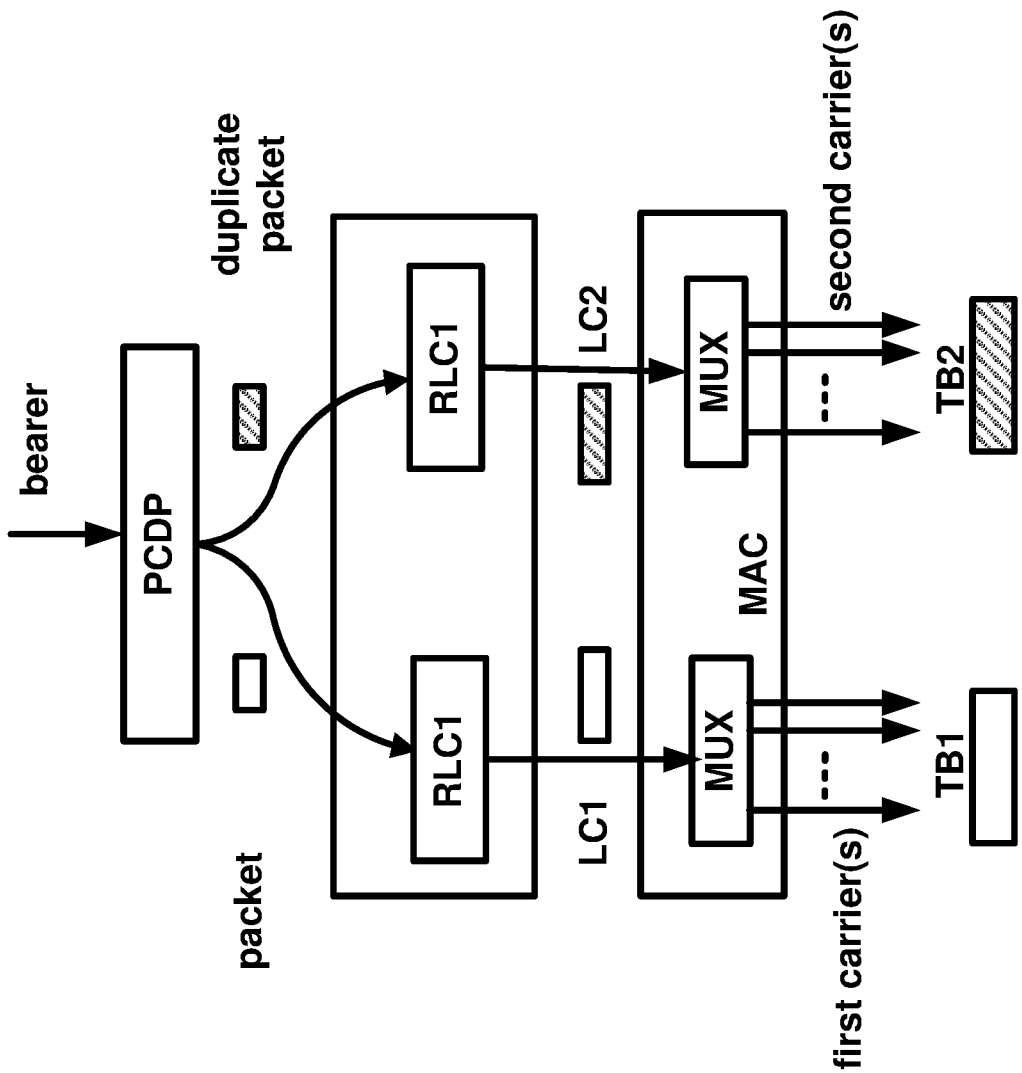
FIG. 16 is an example illustration of PDCP duplication and logical channel mapping restrictions as per an aspect of an embodiment of the present invention.

An example, PDCP packet duplication procedure is shown in FIG. 16. In an example, duplication may be configured for a bearer by RRC. In an example, in response to configuration of PDCP duplication for a radio bearer, an additional RLC entity and an additional logical channel may be added to the radio bearer to handle the duplicated PDCP protocol data units (PDUs). In an example, duplication at PDCP may comprise sending the same PDCP PDUs twice: once on the original RLC entity and a second time on the additional RLC entity. With two independent transmission paths, packet duplication may increase reliability and may reduce latency and is especially beneficial for URLLC services. In an example, when duplication occurs, the original PDCP packet and the corresponding duplicate may not be transmitted on the same carrier. The two different logical channels may either belong to the same MAC entity (e.g., in carrier aggregation) or to different MAC entities (dual connectivity). In the carrier aggregation case as shown in FIG. 16, logical channel mapping restrictions may be used in MAC to ensure that the logical channel carrying the original PDCP PDUs and logical channel carrying the corresponding duplicates may not be sent on the same carrier. As shown in FIG. 16, a first logical channel of the bearer may be mapped to one or more first carriers and a second logical channel of the bearer may be mapped to one or more second carriers. In an example, the one or more first carriers may be different from the one or more second carriers.

Example embodiments enhance triggering conditions for a wireless device to enable/disable packet duplication function.

In an example embodiment, a wireless device may receive one or more messages from a base station (e.g., NR gNB or eLTE eNB). In an example, the one or more messages may comprise configuration parameters for a plurality of logical channels. In an example, the plurality of logical channels may comprise logical channels with data and/or logical channels with duplicate data. In an example, the one or more messages may comprise configuration parameters for a plurality of data radio bearers (DRBs) and/or signaling radio bearers (SRBs). In an example, the configuration parameters for DRBs/SRBs may configure PDCP packet duplication with carrier aggregation for a DRB/SRB. In an example, the base station may enable/disable packet duplication using physical layer and/or MAC layer signaling (e.g., PDCCH like signaling, MAC CE, etc.). In an example, a UE may autonomously enable/disable the PDCP packet duplication for a bearer considering one or more criteria. In an example, the one or more criteria may comprise frequent undelivered data packets measured at the PDCP layer (e.g., frequent undelivered PDCP PDUs). In an example, a threshold may be configured to trigger enabling/disabling the PDCP function for a bearer. In an example, the threshold may be pre-configured. In an example, the threshold may be configured by higher layers (e.g., RRC). In an example, the threshold may be same for the bearers configured with packet duplication. In an example, the threshold may be configured per bearer configured with packet duplication. In an example, the threshold may be cell-specific. In an example, the threshold may indicate a percentage of PDCP PDUs that were not successfully transmitted/delivered. In an example, the percentage may be measured for a time window. In an example, the time window may be pre-configured. In example, the value of time window may be indicated by higher layers (e.g., RRC). In an example, the MAC entity may duplicate the PDCP PDUs for a bearer for which the duplication is configured/enabled and may not duplicate PDCP PDUs for a bearer for which the duplication is disabled (not configured). In an example, a PDCP PDU and a duplicate PDCP PDU may correspond to different RLC entities/logical channels. In an example, the wireless device may receive one or more DCIs/grants for transmission on one or more cells e.g., for one or more numerologies/TTIs on the one or more cells. A DCI/grant may indicate the transmission parameters such as resources for transmission, power control commands, HARQ parameters, modulation and coding scheme (MCS), etc. The wireless device may perform a logical channel prioritization/multiplexing procedure and may allocate the resources of the grant/DC to one or more logical channels to create a MAC PDU. In an example, the one or more logical channels may comprise logical channels with data and/or duplicate data. In an example, the MAC layer may deliver the MAC PDU to Physical layer to create a transport block (TB). The wireless device may calculate transmission power for the TB using at least the power control commands in the grant/DCI. The Physical layer may map the TB to the time/frequency resources indicated in the DCI/grant and may transmit the TB.

In an example embodiment, a wireless device may receive one or more messages from a base station (e.g., NR gNB or eLTE eNB). In an example, the one or more messages may comprise configuration parameters for a plurality of logical channels. In an example, the plurality of logical channels may comprise logical channels with data and/or logical channels with duplicate data. In an example, the one or more messages may comprise configuration parameters for a plurality of data radio bearers (DRBs) and/or signaling radio bearers (SRBs). In an example, the configuration parameters for DRBs/SRBs may configure PDCP packet duplication with carrier aggregation for a DRB/SRB. In an example, the base station may enable/disable packet duplication using physical layer and/or MAC layer signaling (e.g., PDCCH like signaling, MAC CE, etc.). In an example, a UE may autonomously enable/disable the PDCP packet duplication for a bearer considering one or more criteria. In an example, the one or more criteria may comprise frequent undelivered data packets measured at the RLC layer (e.g., frequent undelivered RLC PDUs corresponding to the bearer/PDCP entity configured with packet duplication). In an example, a threshold may be configured to trigger enabling/disabling the PDCP function for a bearer. In an example, the threshold may be pre-configured. In an example, the threshold may be configured by higher layers (e.g., RRC). In an example, the threshold may be same for the bearers configured with packet duplication. In an example, the threshold may be configured per bearer configured with packet duplication. In an example, the threshold may be cell-specific. In an example, the threshold may indicate a percentage of RLC PDUs, corresponding to a bearer configured with duplication, that were not successfully transmitted/delivered. In an example, the percentage may be measured for a time window. In an example, the time window may be pre-configured. In example, the value of time window may be indicated by higher layers (e.g., RRC). In an example, the MAC entity may duplicate the PDCP PDUs for a bearer for which the duplication is configured/enabled and may not duplicate PDCP PDUs for a bearer for which the duplication is disabled (not configured). In an example, a PDCP PDU and duplicate PDCP PDU may correspond to different RLC entities/logical channels. In an example, the wireless device may receive one or more DCIs/grants for transmission on one or more cells e.g., for one or more numerologies/TTIs/transmission durations on the one or more cells. A DCI/grant may indicate the transmission parameters such as resources for transmission, power control commands, HARQ parameters, modulation and coding scheme (MCS), etc. The wireless device may perform a logical channel prioritization/multiplexing procedure and may allocate the resources of the grant/DC to one or more logical channels to create a MAC PDU. In an example, the one or more logical channels may comprise logical channels with data and/or duplicate data. In an example, the MAC layer may deliver the MAC PDU to Physical layer to create a transport block (TB). The wireless device may calculate transmission power for the TB using at least the power control commands in the grant/DCI. The Physical layer may map the TB to the time/frequency resourced indicates in the DCI/grant and may transmit the TB.

In an example embodiment, a wireless device may receive one or more messages from a base station (e.g., NR gNB or eLTE eNB). In an example, the one or more messages may comprise configuration parameters for a plurality of logical channels. In an example, the plurality of logical channels may comprise logical channels with data and/or logical channels with duplicate data. In an example, the one or more messages may comprise configuration parameters for a plurality of data radio bearers (DRBs) and/or signaling radio bearers (SRBs). In an example, the configuration parameters for DRBs/SRBs may configure PDCP packet duplication with carrier aggregation for a DRB/SRB. In an example, the base station may enable/disable packet duplication using physical layer and/or MAC layer signaling (e.g., PDCCH like signaling, MAC CE, etc.). In an example, a UE may autonomously enable/disable the PDCP packet duplication for a bearer considering one or more criteria. In an example, the one or more criteria may comprise frequent undelivered data packets measured at the PHY/MAC layer (e.g., frequent HARQ NACKs and/or poor channels conditions on one or more cells/numerologies mapped to a logical channel corresponding to a bearer configured with packet duplication). In an example, a threshold may be configured to trigger enabling/disabling the PDCP function for a bearer. In an example, the threshold may be pre-configured. In an example, the threshold may be configured by higher layers (e.g., RRC). In an example, the threshold may be same for the bearers configured with packet duplication. In an example, the threshold may be configured per bearer configured with packet duplication. In an example, the threshold may be cell-specific. In an example, the threshold may indicate a percentage/number of HARQ NACKs received for packets transmitted on one or more cells/numerologies where a logical channel corresponding to a bearer configured with duplication, is mapped to. In an example, the percentage may be measured for a time window. In an example, the time window may be pre-configured. In example, the value of time window may be indicated by higher layers (e.g., RRC). In an example, the threshold may indicate a threshold channel quality indicator (CQI). In an example, the MAC entity may duplicate the PDCP PDUs for a bearer for which the duplication is configured/enabled and may not duplicate PDCP PDUs for a bearer for which the duplication is disabled (not configured). In an example, a PDCP PDU and duplicate PDCP PDU may correspond to different RLC entities/logical channels. In an example, the wireless device may receive one or more DCIs/grants for transmission on one or more cells e.g., for one or more numerologies/TTIs/transmission durations on the one or more cells. A DCI/grant may indicate the transmission parameters such as resources for transmission, power control commands, HARQ parameters, modulation and coding scheme (MCS), etc. The wireless device may perform a logical channel prioritization/multiplexing procedure and may allocate the resources of the grant/DC to one or more logical channels to create a MAC PDU. In an example, the one or more logical channels may comprise logical channels with data and/or duplicate data. In an example, the MAC layer may deliver the MAC PDU to Physical layer to create a transport block (TB). The wireless device may calculate transmission power for the TB using at least the power control commands in the grant/DCI. The Physical layer may map the TB to the time/frequency resources indicated in the DCI/grant and may transmit the TB.

Example embodiment enhance efficiency of logical channel multiplexing by discarding data that has already been transmitted from logical channels corresponding to a bearer that is configured with packet duplication.

In an example embodiment, a wireless device may receive one or more messages from a base station (e.g., NR gNB or eLTE eNB). In an example, the one or more messages may comprise configuration parameters for a plurality of logical channels. In an example, the plurality of logical channels may comprise logical channels with data and/or logical channels with duplicate data. In an example, the one or more messages may comprise configuration parameters for a plurality of data radio bearers (DRBs) and/or signaling radio bearers (SRBs). In an example, the configuration parameters for DRBs/SRBs may configure PDCP packet duplication with carrier aggregation for a DRB/SRB. In an example, the base station may enable/disable packet duplication using physical layer and/or MAC layer signaling (e.g., PDCCH like signaling, MAC CE, etc.). In an example, a UE may autonomously enable/disable the PDCP packet duplication for a bearer considering one or more criteria (e.g., as described in embodiments in this disclosure). In an example, the MAC entity may duplicate the PDCP PDUs for a bearer for which the duplication is configured/enabled and may not duplicate PDCP PDUs for a bearer for which the duplication is disabled (not configured). In an example, a PDCP PDU and duplicate PDCP PDUs may correspond to different RLC entities/logical channels. In an example, if a first logical channel with PDCP PDUs (or duplicate PDCP PDUs) of a bearer configured with packet duplication contains a first amount of data (e.g., X bytes or X PDCP PDUs/RLC SDUs) and a second logical channel with duplicate PDCP PDUs (or PDCP PDUs) of a bearer configured with packet duplication contains a second amount of data (e.g., Y bytes or Y PDCP PDUs/RLC SDUs), and the first amount of data is larger than the second amount of data, the wireless device MAC entity may discard a portion of data in the first logical channel that has been transmitted and acknowledged (e.g., HARQ ACKed and/or RLC ACKed). In an example, if the first amount of data is X bytes and the second amount of data is Y bytes and X is larger than Y, the wireless device may discard as much as (X-Y-unACKed data) on top of the buffer for the first logical channel. In an example with more than one logical channel containing duplicate PDCP PDUs, the wireless device MAC entity may discard a portion of data that has been transmitted and acknowledged (e.g., HARQ ACKed and/or RLC ACKed) in at least one logical channel from a plurality of logical channels corresponding to the same bearer. In an example, if the buffer for a logical channel that contains PDCP PDUs or duplicate PDCP PDUs for a bearer configured with packet duplication is emptied and the last data in the buffer is acknowledged (e.g., HARQ ACKed and/or RLC ACKed) after transmission, the wireless device MAC entity may empty one or more logical channels corresponding to the radio bearer (e.g., logical channels containing PDCP PDUs or duplicate PDCP PDUs from the bearer). In an example, the wireless device may perform the data discarding process described in configured times. In an example, the configured times for the discarding process may be pre-configured. In an example, the configured times may be indicated to the wireless device (e.g., using RRC and/or physical layer/MAC layer signaling). In an example, the wireless device may perform duplicate data discard when a buffer status report is triggered and/or when the wireless device creates the buffer status report MAC CE. In an example, the wireless device may receive one or more DCIs/grants for transmission on one or more cells e.g., for one or more numerologies/TTIs/transmission durations on the one or more cells. A DCI/grant may indicate the transmission parameters such as resources for transmission, power control commands, HARQ parameters, modulation and coding scheme (MCS), etc. The wireless device may perform a logical channel prioritization/multiplexing procedure and may allocate the resources of the grant/DC to one or more logical channels to create a MAC PDU. In an example, the one or more logical channels may comprise logical channels with data and/or duplicate data. In an example, the MAC layer may deliver the MAC PDU to Physical layer to create a transport block (TB). The wireless device may calculate transmission power for the TB using at least the power control commands in the grant/DCI. The Physical layer may map the TB to the time/frequency resources indicated in the DCI/grant and may transmit the TB.

Example embodiments enhance buffer status reporting when one or more bearers are configured with packet duplication.

In an example embodiment, a wireless device may receive one or more messages from a base station (e.g., NR gNB or eLTE eNB). In an example, the one or more messages may comprise configuration parameters for a plurality of logical channels. In an example, the plurality of logical channels may comprise logical channels with data and/or logical channels with duplicate data. In an example, the one or more messages may comprise configuration parameters for a plurality of data radio bearers (DRBs) and/or signaling radio bearers (SRBs). In an example, the configuration parameters for DRBs/SRBs may configure PDCP packet duplication with carrier aggregation for a DRB/SRB. In an example, the base station may enable/disable packet duplication using physical layer and/or MAC layer signaling (e.g., PDCCH like signaling, MAC CE, etc.). In an example, the MAC entity may duplicate the PDCP PDUs for a bearer for which the duplication is configured/enabled and may not duplicate PDCP PDUs for a bearer for which the duplication is disabled (not configured). In an example, a PDCP PDU and duplicate PDCP PDUs may correspond to different RLC entities/logical channels. In an example, a wireless device MAC entity may perform data discard process (e.g., as described in embodiments in this disclosure). In an example, a wireless device MAC entity may perform data discard process (e.g., as described in embodiments in this disclosure) when a buffer status report is triggered and/or when a buffer status report MAC CE is created. One or more logical channels corresponding to a bearer configured with packet duplication for which packet duplication is enabled (e.g., enabled by the base station) may have substantially same amount of data (e.g., when the buffer status report MAC CE is created). In an example, a logical channel of the one or more logical channels may have as much as unacknowledged data less data in the logical channel's buffer compared to other logical channels in the one or more logical channels. In an example, if the base station configures/enables the packet duplication for a bearer configured for the wireless device, a plurality of logical channels may correspond to bearer. In an example, the buffer status report may comprise buffer status of one logical channels corresponding to the bearer (e.g., logical channels comprising PDCP PDUs). In an example, the wireless device may receive one or more DCIs/grants for transmission on one or more cells e.g., for one or more numerologies/TTIs/transmission durations on the one or more cell. A DCI/grant may indicate the transmission parameters such as resources for transmission, power control commands, HARQ parameters, modulation and coding scheme (MCS), etc. The wireless device may perform a logical channel prioritization/multiplexing procedure and may allocate the resources of the grant/DC to one or more logical channels to create a MAC PDU. In an example, the one or more logical channels may comprise logical channels with data and/or duplicate data. In an example, the MAC layer may deliver the MAC PDU to Physical layer to create a transport block (TB). The wireless device may calculate transmission power for the TB using at least the power control commands in the grant/DCI. The Physical layer may map the TB to the time/frequency resources indicated in the DCI/grant and may transmit the TB.

In an example embodiment, a wireless device may receive one or more messages from a base station (e.g., NR gNB or eLTE eNB). In an example, the one or more messages may comprise configuration parameters for a plurality of logical channels. In an example, the plurality of logical channels may comprise logical channels with data and/or logical channels with duplicate data. In an example, the one or more messages may comprise configuration parameters for a plurality of data radio bearers (DRBs) and/or signaling radio bearers (SRBs). In an example, the configuration parameters for DRBs/SRBs may configure PDCP packet duplication with carrier aggregation for a DRB/SRB. In an example, a UE may autonomously enable/disable the PDCP packet duplication for a bearer considering one or more criteria (e.g., as described in embodiments in this disclosure). In an example, the MAC entity may duplicate the PDCP PDUs for a bearer for which the duplication is configured/enabled and may not duplicate PDCP PDUs for a bearer for which the duplication is disabled and/or not configured. In an example, a PDCP PDU and duplicate PDCP PDUs may correspond to different RLC entities/logical channels. In an example, a wireless device MAC entity may perform data discard process (e.g., as described in embodiments in this disclosure). In an example, a wireless device MAC entity may perform data discard process (e.g., as described in embodiments in this disclosure) when a buffer status report is triggered and/or when a buffer status report MAC CE is created. One or more logical channels corresponding to a bearer configured with packet duplication for which packet duplication is enabled (e.g., enabled autonomously by the wireless device) may have substantially same amount of data (e.g., when the buffer status report MAC CE is created). In an example, a logical channel of the one or more logical channels may have as much as unacknowledged data less data in the logical channel's buffer compared to other logical channels in the one or more logical channels. In an example, if the wireless device autonomously enables the packet duplication for a bearer configured for the wireless device (and/or configured with packet duplication), a plurality of logical channels may correspond to bearer. In an example, the buffer status report may comprise buffer status of one logical channels corresponding to the bearer (e.g., logical channels comprising PDCP PDUs). In an example, the buffer status report may comprise an indication that a logical channel has a corresponding logical channel with duplicate data. In an example, the indication may be in form of a bitmap. In an example, the indication may be in the MAC subheader corresponding to the BSR. In an example, a value of one in the bit map corresponding to a logical channel may indicate that there is one or more logical channels corresponding to the logical channel with duplicate data. In an example, the wireless device may receive one or more DCIs/grants for transmission on one or more cells e.g., for one or more numerologies/TTIs/transmission durations on the one or more cell. A DCI/grant may indicate the transmission parameters such as resources for transmission, power control commands, HARQ parameters, modulation and coding scheme (MCS), etc. The wireless device may perform a logical channel prioritization/multiplexing procedure and may allocate the resources of the grant/DC to one or more logical channels to create a MAC PDU. In an example, the one or more logical channels may comprise logical channels with data and/or duplicate data. In an example, the MAC layer may deliver the MAC PDU to Physical layer to create a transport block (TB). The wireless device may calculate transmission power for the TB using at least the power control commands in the grant/DCI. The Physical layer may map the TB to the time/frequency resources indicated in the DCI/grant and may transmit the TB.

Example embodiment enhance the HARQ retransmission procedure when one or more bearers are configured with packet duplication.

In an example embodiment, a wireless device may receive one or more messages from a base station (e.g., NR gNB or eLTE eNB). In an example, the one or more messages may comprise configuration parameters for a plurality of logical channels. In an example, the plurality of logical channels may comprise logical channels with data and/or logical channels with duplicate data. In an example, the one or more messages may comprise configuration parameters for a plurality of data radio bearers (DRBs) and/or signaling radio bearers (SRBs). In an example, the configuration parameters for DRBs/SRBs may configure PDCP packet duplication with carrier aggregation for a DRB/SRB. In an example, the base station may enable/disable packet duplication using physical layer and/or MAC layer signaling (e.g., PDCCH like signaling, MAC CE, etc.). In an example, a UE may autonomously enable/disable the PDCP packet duplication for a bearer considering one or more criteria (e.g., as described in embodiments in this disclosure). In an example, the MAC entity may duplicate the PDCP PDUs for a bearer for which the duplication is configured/enabled and may not duplicate PDCP PDUs for a bearer for which the duplication is disabled and/or not configured. In an example, a PDCP PDU and duplicate PDCP PDUs may correspond to different RLC entities/logical channels. In an example, the base station may configure a logical channel (e.g., containing duplicate data) not to be transmitted on one or more cells. In an example, the base station may configure a logical channel not be transmitted on an LAA cell. In an example, the base station may configure a logical channel with a bitmap indicating the one or more cells that a logical channel may and/or may not be mapped to (e.g., data from the logical channel may and/or may not be transmitted on). In an example, the wireless device may receive a DCI/grant for transmission on a first cell e.g., for a first numerology/TTI. The DCI/grant may indicate the transmission parameters such as resources for transmission, power control commands, HARQ parameters, modulation and coding scheme (MCS), etc. In an example, the wireless device may multiplex data from a logical channel that is configured to not be transmitted on one or more cells and create a first MAC PDU. In an example, the one or more cells may not comprise the first cell. The physical layer may create a first TB using the first MAC PDU. The wireless device may calculate power for the first TB using at least the power control commands in the DCI/grant and may map the TB to the resources indicated in the DCI/grant and may transmit the TB. In an example, a HARQ entity may handle transmission and/or retransmission of transport blocks on a plurality of cells comprising the first cell. In an example, the wireless device may receive a NACK and/or a second DCI/grant indicating retransmission of the first TB (or a new redundancy version of the first TB). In an example, the DCI/grant may indicate the HARQ retransmission of the first TB on a second cell of the plurality of cells. In an example, the second cell may not be among the one or more cells. The wireless device may transmit the HARQ retransmission of the first TB e.g., using the transmission parameters (e.g., resources) indicated in the second DCI/grant. In an example, the HARQ entity may be indicated that there is a restriction for a TB (e.g., corresponding to a HARQ process) not to be transmitted on the one or more cells.

In an example embodiment, a wireless device may receive one or more messages from a base station (e.g., NR gNB or eLTE eNB). In an example, the one or more messages may comprise configuration parameters for a plurality of logical channels. In an example, the plurality of logical channels may comprise logical channels with data and/or logical channels with duplicate data. In an example, the one or more messages may comprise configuration parameters for a plurality of data radio bearers (DRBs) and/or signaling radio bearers (SRBs). In an example, the configuration parameters for DRBs/SRBs may configure PDCP packet duplication with carrier aggregation for a DRB/SRB. In an example, the base station may enable/disable packet duplication using physical layer and/or MAC layer signaling (e.g., PDCCH like signaling, MAC CE, etc.). In an example, a UE may autonomously enable/disable the PDCP packet duplication for a bearer considering one or more criteria (e.g., as described in Example A embodiments). In an example, the MAC entity may duplicate the PDCP PDUs for a bearer for which the duplication is configured/enabled and may not duplicate PDCP PDUs for a bearer for which the duplication is disabled and/or not configured. In an example, a PDCP PDU and duplicate PDCP PDUs may correspond to different RLC entities/logical channels. In an example, the base station may configure a logical channel (e.g., containing duplicate data) not to be transmitted on one or more cells. In an example, the base station may configure a logical channel not be transmitted on an LAA cell. In an example, the base station may configure a logical channel with a bitmap indicating the one or more cells that a logical channel may and/or may not be mapped to (e.g., data from the logical channel may and/or may not be transmitted on). In an example, the wireless device may receive a DCI/grant for transmission on a first cell e.g., for a first numerology/TTI/transmission duration. The DCI/grant may indicate the transmission parameters such as resources for transmission, power control commands, HARQ parameters, modulation and coding scheme (MCS), etc. In an example, the wireless device may multiplex data from a logical channel that is configured to not be transmitted on one or more cells and create a first MAC PDU. In an example, the one or more cells may not comprise the first cell. The physical layer may create a first TB using the first MAC PDU. The wireless device may calculate power for the first TB using at least the power control commands in the DCI/grant and may map the TB to the resources indicated in the DCI/grant and may transmit the TB. In an example, a HARQ entity may handle transmission and/or retransmission of transport blocks on a plurality of cells comprising the first cell. In an example, the wireless device may receive a NACK and/or a second DCI/grant indicating retransmission of the first TB (or a new redundancy version of the first TB). In an example, the DCI/grant may indicate the HARQ retransmission of the first TB on a second cell of the plurality of cells. In an example, the second cell may be among the one or more cells. The wireless device may transmit the HARQ retransmission of the first TB e.g., using the transmission parameters (e.g., resources) indicated in the second DCI/grant.

In an example embodiment, a wireless device may receive one or more messages from a base station (e.g., NR gNB or eLTE eNB). In an example, the one or more messages may comprise configuration parameters for a plurality of logical channels. In an example, the plurality of logical channels may comprise logical channels with data and/or logical channels with duplicate data. In an example, the one or more messages may comprise configuration parameters for a plurality of data radio bearers (DRBs) and/or signaling radio bearers (SRBs). In an example, the configuration parameters for DRBs/SRBs may configure PDCP packet duplication with carrier aggregation for a DRB/SRB. In an example, the base station may enable/disable packet duplication using physical layer and/or MAC layer signaling (e.g., PDCCH like signaling, MAC CE, etc.). In an example, a UE may autonomously enable/disable the PDCP packet duplication for a bearer considering one or more criteria (e.g., as described in Example A embodiments). In an example, the MAC entity may duplicate the PDCP PDUs for a bearer for which the duplication is configured/enabled and may not duplicate PDCP PDUs for a bearer for which the duplication is disabled and/or not configured. In an example, a PDCP PDU and duplicate PDCP PDUs may correspond to different RLC entities/logical channels. In an example, the base station may configure a logical channel (e.g., containing duplicate data) not to be transmitted on one or more numerologies/TTIs/transmission durations. In an example, the base station may configure a logical channel with a bitmap indicating the one or more numerologies/TTIs/transmission durations that a logical channel may and/or may not be mapped to (e.g., data from the logical channel may and/or may not be transmitted on). In an example, the wireless device may receive a DCI/grant for transmission on a first cell e.g., for a first numerology/TTI/transmission duration. The DCI/grant may indicate the transmission parameters such as resources for transmission, power control commands, HARQ parameters, modulation and coding scheme (MCS), etc. In an example, the wireless device may multiplex data from a logical channel that is configured to not be transmitted on one or more numerologies/TTIs/transmission durations and create a first MAC PDU. In an example, the one or more numerologies/TTIs/transmission durations may not comprise the first numerology/TTI/transmission durations. The physical layer may create a first TB using the first MAC PDU. The wireless device may calculate power for the first TB using at least the power control commands in the DCI/grant and may map the TB to the resources indicated in the DCI/grant and may transmit the TB. In an example, HARQ entity may handle transmission and/or retransmission of transport blocks on a plurality of TTIs/transmission durations/numerologies of the first cell comprising the first TTI/transmission duration/numerology. In an example, the wireless device may receive a NACK and/or a second DCI/grant indicating retransmission of the first TB (or a new redundancy version of the first TB). In an example, the DCI/grant may indicate the HARQ retransmission of the first TB on a second TTI/transmission duration/numerology of the plurality of TTIs/transmission durations/numerologies. In an example, the second TTI/transmission duration/numerology may not be among the one or more TTIs/transmission durations/numerologies. The wireless device may transmit the HARQ retransmission of the first TB e.g., using the transmission parameters (e.g., resources) indicated in the second DCI/grant. In an example, the HARQ entity may be indicated that there is a restriction for a TB (e.g., corresponding to a HARQ process) not to be transmitted on the one or more TTIs/numerologies.

In an example embodiment, a wireless device may receive one or more messages from a base station (e.g., NR gNB or eLTE eNB). In an example, the one or more messages may comprise configuration parameters for a plurality of logical channels. In an example, the plurality of logical channels may comprise logical channels with data and/or logical channels with duplicate data. In an example, the one or more messages may comprise configuration parameters for a plurality of data radio bearers (DRBs) and/or signaling radio bearers (SRBs). In an example, the configuration parameters for DRBs/SRBs may configure PDCP packet duplication with carrier aggregation for a DRB/SRB. In an example, the base station may enable/disable packet duplication using physical layer and/or MAC layer signaling (e.g., PDCCH like signaling, MAC CE, etc.). In an example, a UE may autonomously enable/disable the PDCP packet duplication for a bearer considering one or more criteria (e.g., as described in embodiments in this disclosure). In an example, the MAC entity may duplicate the PDCP PDUs for a bearer for which the duplication is configured/enabled and may not duplicate PDCP PDUs for a bearer for which the duplication is disabled and/or not configured. In an example, a PDCP PDU and duplicate PDCP PDUs may correspond to different RLC entities/logical channels. In an example, the base station may configure a logical channel (e.g., containing duplicate data) not to be transmitted on one or more numerologies/TTIs/transmission durations. In an example, the base station may configure a logical channel with a bitmap indicating the one or more numerologies/TTIs/transmission durations that a logical channel may and/or may not be mapped to (e.g., data from the logical channel may and/or may not be transmitted on). In an example, the wireless device may receive a DCI/grant for transmission on a first cell e.g., for a first numerology/TTI/transmission duration. The DCI/grant may indicate the transmission parameters such as resources for transmission, power control commands, HARQ parameters, modulation and coding scheme (MCS), etc. In an example, the wireless device may multiplex data from a logical channel that is configured to not be transmitted on one or more numerologies/TTIs/transmission durations and create a first MAC PDU. In an example, the one or more numerologies/TTIs/transmission durations may not comprise the first numerology/TTI/transmission duration. The physical layer may create a first TB using the first MAC PDU. The wireless device may calculate power for the first TB using at least the power control commands in the DCI/grant and may map the TB to the resources indicated in the DCI/grant and may transmit the TB. In an example, HARQ entity may handle transmission and/or retransmission of transport blocks on a plurality of TTIs/transmission durations/numerologies of the first cell comprising the first TTI/transmission duration/numerology. In an example, the wireless device may receive a NACK and/or a second DCI/grant indicating retransmission of the first TB (or a new redundancy version of the first TB). In an example, the DCI/grant may indicate the HARQ retransmission of the first TB on a second TTI/transmission duration/numerology of the plurality of TTIs/transmission durations/numerologies. In an example, the second TTI/transmission duration/numerology may be among the one or more TTIs/transmission durations/numerologies. The wireless device may transmit the HARQ retransmission of the first TB e.g., using the transmission parameters (e.g., resources) indicated in the second DCI/grant.

In an example embodiment, a wireless device may receive one or more messages from a base station (e.g., NR gNB or eLTE eNB). In an example, the one or more messages may comprise configuration parameters for a plurality of logical channels. In an example, the plurality of logical channels may comprise logical channels with data and/or logical channels with duplicate data. In an example, the one or more messages may comprise configuration parameters for a plurality of data radio bearers (DRBs) and/or signaling radio bearers (SRBs). In an example, the configuration parameters for DRBs/SRBs may configure PDCP packet duplication with carrier aggregation for a DRB/SRB. In an example, the base station may enable/disable packet duplication using physical layer and/or MAC layer signaling (e.g., PDCCH like signaling, MAC CE, etc.). In an example, a UE may autonomously enable/disable the PDCP packet duplication for a bearer considering one or more criteria (e.g., as described in embodiments in this disclosure). In an example, the MAC entity may duplicate the PDCP PDUs for a bearer for which the duplication is configured/enabled and may not duplicate PDCP PDUs for a bearer for which the duplication is disabled and/or not configured. In an example, a PDCP PDU and duplicate PDCP PDUs may correspond to different RLC entities/logical channels. In an example, a wireless device MAC entity may perform data discard process (e.g., as described in embodiments in this disclosure). The buffers for logical channels corresponding to data and duplicate data may have same data. In an example, the wireless device may receive a plurality of DCIs/grants. A grant/DCI in the plurality of DCIs/grants may comprise transmission parameters (e.g., time/frequency resources, HARQ parameters, MCS, power control commands, etc.). In an example, the wireless device may create a plurality of TBs using to the plurality of DCIs/grants. In an example, each of the plurality of TBs may contain data from a logical channel of the plurality of logical channels corresponding to a same bearer (e.g., bearer configured with packet duplication). In an example, a first TB of the plurality of TBs may comprise only data from a logical channel corresponding to the bearer. The wireless device may receive an ACK for other TBs in the plurality of TBs. The wireless device may stop transmission or retransmission of the first TB. The wireless device may flush the HARQ buffer corresponding to the first TB.

In an example embodiment, a wireless device may receive one or more messages from a base station (e.g., NR gNB or eLTE eNB). In an example, the one or more messages may comprise configuration parameters for a plurality of logical channels. In an example, the plurality of logical channels may comprise logical channels with data and/or logical channels with duplicate data. In an example, the one or more messages may comprise configuration parameters for a plurality of data radio bearers (DRBs) and/or signaling radio bearers (SRBs). In an example, the configuration parameters for DRBs/SRBs may configure PDCP packet duplication with carrier aggregation for a DRB/SRB. In an example, the base station may enable/disable packet duplication using physical layer and/or MAC layer signaling (e.g., PDCCH like signaling, MAC CE, etc.). In an example, a UE may autonomously enable/disable the PDCP packet duplication for a bearer considering one or more criteria (e.g., as described in embodiments in this disclosure). In an example, the MAC entity may duplicate the PDCP PDUs for a bearer for which the duplication is configured/enabled and may not duplicate PDCP PDUs for a bearer for which the duplication is disabled and/or not configured. In an example, a PDCP PDU and duplicate PDCP PDUs may correspond to different RLC entities/logical channels. In an example, a wireless device MAC entity may perform data discard process (e.g., as described in embodiments in this disclosure). The buffers for logical channels corresponding to data and duplicate data may have same data. In an example, the wireless device may receive a plurality of DCIs/grants for a same TTI/transmission duration on a plurality of cells. A grant/DCI in the plurality of DCIs/grants may comprise transmission parameters (e.g., time/frequency resources, HARQ parameters, MCS, power control commands, etc.). In an example, the wireless device may create a plurality of TBs using to the plurality of DCIs/grants. In an example, each of the plurality of TBs may contain data from a logical channel of the plurality of logical channels corresponding to a same bearer (e.g., bearer configured with packet duplication). In an example, a first TB of the plurality of TBs may comprise only data from a logical channel corresponding to the bearer. The wireless device calculate power for the plurality of TBs at least using the power control commands indicated in the plurality of DCIs/grants. In an example, the wireless device may drop the first TB if the wireless is power limited e.g., if the total calculated power is larger than the UE maximum transmit power.

Example embodiments enhance the efficiency of BSR and PHR reporting when a plurality of MAC entities handle transmission of data from logical channels that contain data and duplicate data.

In an example embodiment, a wireless device may receive one or more messages from a base station (e.g., NR gNB or eLTE eNB). In an example, the one or more messages may comprise configuration parameters for a plurality of logical channels. In an example, the plurality of logical channels may comprise logical channels with data and/or logical channels with duplicate data. In an example, the one or more messages may comprise configuration parameters for a plurality of data radio bearers (DRBs) and/or signaling radio bearers (SRBs). In an example, the configuration parameters for DRBs/SRBs may configure PDCP packet duplication with carrier aggregation for a DRB/SRB. In an example, the base station may enable/disable packet duplication using physical layer and/or MAC layer signaling (e.g., PDCCH like signaling, MAC CE, etc.). In an example, a UE may autonomously enable/disable the PDCP packet duplication for a bearer considering one or more criteria (e.g., as described in embodiments in this disclosure). In an example, the MAC entity may duplicate the PDCP PDUs for a bearer for which the duplication is configured/enabled and may not duplicate PDCP PDUs for a bearer for which the duplication is disabled and/or not configured. In an example, a PDCP PDU and duplicate PDCP PDUs may correspond to different RLC entities/logical channels. In an example, the wireless device may receive one or more DCIs/grants for transmission on one or more cells e.g., for one or more numerologies/TTIs/transmission durations on the one or more cells. In an example, the cells may belong to different cells groups corresponding to different MAC entities. A DCI/grant may indicate the transmission parameters such as resources for transmission, power control commands, HARQ parameters, modulation and coding scheme (MCS), etc. The wireless device may perform a logical channel prioritization/multiplexing procedure and may allocate the resources of the grant/DC to one or more logical channels to create a MAC PDU. In an example, the one or more logical channels may comprise logical channels with data and/or duplicate data. In an example, the MAC layer may deliver the MAC PDU to Physical layer to create a transport block (TB). The wireless device may calculate transmission power for the TB using at least the power control commands in the grant/DCI. The Physical layer may map the TB to the time/frequency resources indicated in the DCI/grant and may transmit the TB. In an example a plurality of MAC entities may be configured for the plurality of logical channels corresponding to data and duplicate PDCP PDUs for a bearer configured with packet duplication. In an example, the base station may configure a plurality of cells for the wireless device. In an example, the base station may configure a cell of the plurality of cells to one of a plurality of cells groups. In an example, a cell group may be configured that handle transmission and retransmission of logical channels comprising PDCP PDUs. In an example, a cell group may be configured that handle transmission and retransmission of duplicate PDCP PDUs. In an example, the wireless device may transmit a plurality of BSRs corresponding to the plurality of MAC entities to the base station, each BSR comprising buffer status for logical channels corresponding to logical channels handled by a MAC entity.

In an example embodiment, a wireless device may receive one or more messages from a base station (e.g., NR gNB or eLTE eNB). In an example, the one or more messages may comprise configuration parameters for a plurality of logical channels. In an example, the plurality of logical channels may comprise logical channels with data and/or logical channels with duplicate data. In an example, the one or more messages may comprise configuration parameters for a plurality of data radio bearers (DRBs) and/or signaling radio bearers (SRBs). In an example, the configuration parameters for DRBs/SRBs may configure PDCP packet duplication with carrier aggregation for a DRB/SRB. In an example, the base station may enable/disable packet duplication using physical layer and/or MAC layer signaling (e.g., PDCCH like signaling, MAC CE, etc.). In an example, a UE may autonomously enable/disable the PDCP packet duplication for a bearer considering one or more criteria (e.g., as described in embodiments in this disclosure). In an example, the MAC entity may duplicate the PDCP PDUs for a bearer for which the duplication is configured/enabled and may not duplicate PDCP PDUs for a bearer for which the duplication is disabled and/or not configured. In an example, a PDCP PDU and duplicate PDCP PDUs may correspond to different RLC entities/logical channels. In an example, the wireless device may receive one or more DCIs/grants for transmission on one or more cells e.g., for one or more numerologies/TTIs on the one or more cells. In an example, the cells may belong to different cells groups corresponding to different MAC entities. A DCI/grant may indicate the transmission parameters such as resources for transmission, power control commands, HARQ parameters, modulation and coding scheme (MCS), etc. The wireless device may perform a logical channel prioritization/multiplexing procedure and may allocate the resources of the grant/DC to one or more logical channels to create a MAC PDU. In an example, the one or more logical channels may comprise logical channels with data and/or duplicate data. In an example, the MAC layer may deliver the MAC PDU to Physical layer to create a transport block (TB). The wireless device may calculate transmission power for the TB using at least the power control commands in the grant/DCI. The Physical layer may map the TB to the time/frequency resources indicated in the DCI/grant and may transmit the TB. In an example a plurality of MAC entities may be configured for the plurality of logical channels corresponding to data and duplicate PDCP PDUs for a bearer configured with packet duplication. In an example, the base station may configure a plurality of cells for the wireless device. In an example, the base station may configure a cell of the plurality of cells to one of a plurality of cells groups. In an example, a cell group may be configured that handle transmission and retransmission of logical channels comprising PDCP PDUs. In an example, a cell group may be configured that handle transmission and retransmission of duplicate PDCP PDUs. In an example, the wireless device may transmit a BSR to the base station, the BSR comprising buffer status for logical channels handled by the plurality of MAC entity. The BSR may be used by the plurality of MAC entities for scheduling the wireless device.

In an example embodiment, a wireless device may receive one or more messages from a base station (e.g., NR gNB or eLTE eNB). In an example, the one or more messages may comprise configuration parameters for a plurality of logical channels. In an example, the plurality of logical channels may comprise logical channels with data and/or logical channels with duplicate data. In an example, the one or more messages may comprise configuration parameters for a plurality of data radio bearers (DRBs) and/or signaling radio bearers (SRBs). In an example, the configuration parameters for DRBs/SRBs may configure PDCP packet duplication with carrier aggregation for a DRB/SRB. In an example, the base station may enable/disable packet duplication using physical layer and/or MAC layer signaling (e.g., PDCCH like signaling, MAC CE, etc.). In an example, a UE may autonomously enable/disable the PDCP packet duplication for a bearer considering one or more criteria (e.g., as described in embodiments in this disclosure). In an example, the MAC entity may duplicate the PDCP PDUs for a bearer for which the duplication is configured/enabled and may not duplicate PDCP PDUs for a bearer for which the duplication is disabled and/or not configured. In an example, a PDCP PDU and duplicate PDCP PDUs may correspond to different RLC entities/logical channels. In an example, the wireless device may receive one or more DCIs/grants for transmission on one or more cells e.g., for one or more numerologies/TTIs on the one or more cells. In an example, the cells may belong to different cells groups corresponding to different MAC entities. A DCI/grant may indicate the transmission parameters such as resources for transmission, power control commands, HARQ parameters, modulation and coding scheme (MCS), etc. The wireless device may perform a logical channel prioritization/multiplexing procedure and may allocate the resources of the grant/DC to one or more logical channels to create a MAC PDU. In an example, the one or more logical channels may comprise logical channels with data and/or duplicate data. In an example, the MAC layer may deliver the MAC PDU to Physical layer to create a transport block (TB). The wireless device may calculate transmission power for the TB using at least the power control commands in the grant/DCI. The Physical layer may map the TB to the time/frequency resources indicated in the DCI/grant and may transmit the TB. In an example a plurality of MAC entities may be configured for the plurality of logical channels corresponding to data and duplicate PDCP PDUs for a bearer configured with packet duplication. In an example, the base station may configure a plurality of cells for the wireless device. In an example, the base station may configure a cell of the plurality of cells to one of a plurality of cells groups. In an example, a cell group may be configured that handle transmission and retransmission of logical channels comprising PDCP PDUs. In an example, a cell group may be configured that handle transmission and retransmission of duplicate PDCP PDUs. In an example, the wireless device may transmit a power headroom report (PHR) corresponding to a grant/DCI received from a MAC entity to the base station.

In an example embodiment, a wireless device may receive one or more messages from a base station (e.g., NR gNB or eLTE eNB). In an example, the one or more messages may comprise configuration parameters for a plurality of logical channels. In an example, the plurality of logical channels may comprise logical channels with data and/or logical channels with duplicate data. In an example, the one or more messages may comprise configuration parameters for a plurality of data radio bearers (DRBs) and/or signaling radio bearers (SRBs). In an example, the configuration parameters for DRBs/SRBs may configure PDCP packet duplication with carrier aggregation for a DRB/SRB. In an example, the base station may enable/disable packet duplication using physical layer and/or MAC layer signaling (e.g., PDCCH like signaling, MAC CE, etc.). In an example, a UE may autonomously enable/disable the PDCP packet duplication for a bearer considering one or more criteria (e.g., as described in Example A embodiments). In an example, the MAC entity may duplicate the PDCP PDUs for a bearer for which the duplication is configured/enabled and may not duplicate PDCP PDUs for a bearer for which the duplication is disabled and/or not configured. In an example, a PDCP PDU and duplicate PDCP PDUs may correspond to different RLC entities/logical channels. In an example, the wireless device may receive one or more DCIs/grants for transmission on one or more cells e.g., for one or more numerologies/TTIs/transmission durations on the one or more cells. In an example, the cells may belong to different cells groups corresponding to different MAC entities. A DCI/grant may indicate the transmission parameters such as resources for transmission, power control commands, HARQ parameters, modulation and coding scheme (MCS), etc. The wireless device may perform a logical channel prioritization/multiplexing procedure and may allocate the resources of the grant/DC to one or more logical channels to create a MAC PDU. In an example, the one or more logical channels may comprise logical channels with data and/or duplicate data. In an example, the MAC layer may deliver the MAC PDU to Physical layer to create a transport block (TB). The wireless device may calculate transmission power for the TB using at least the power control commands in the grant/DCI. The Physical layer may map the TB to the time/frequency resources indicated in the DCI/grant and may transmit the TB. In an example a plurality of MAC entities may be configured for the plurality of logical channels corresponding to data and duplicate PDCP PDUs for a bearer configured with packet duplication. In an example, the base station may configure a plurality of cells for the wireless device. In an example, the base station may configure a cell of the plurality of cells to one of a plurality of cells groups. In an example, a cell group may be configured that handle transmission and retransmission of logical channels comprising PDCP PDUs. In an example, a cell group may be configured that handle transmission and retransmission of duplicate PDCP PDUs. In an example, the wireless device may transmit a power headroom report (PHR) corresponding to a grant/DCI received from any MAC entity to the base station.

In an example embodiment, uplink PDCP duplication may be configurable per data radio bearer (DBR). In an example, uplink PDCP duplication may be configurable per signaling radio bearer (SRB), e.g., for the NR-NR dual connectivity (DC) case. In an example, configuration of the uplink PDCP duplication may be using at least one or more radio resource control (RRC) configuration messages. In an example, some of the PDCP duplication parameters may be configured using RRC and some of the PDCP duplication parameters may be indicated using at least one MAC control element (MAC CE) and/or physical layer signaling (e.g., PDCCH and/or alike). In an example, the initial state of the uplink PDCP duplication for a radio bearer may be indicated to the wireless device (e.g., using an RRC IE and/or MAC CE and/or alike). The initial state may be active and/or not-active. In an example, the PDCP duplication may be active upon configuration of PDCP duplication (e.g., upon RRC configuration). In an example, the PDCP duplication may be active upon configuration of PDCP duplication and may be stopped upon an indication of stopping of the PDCP duplication (e.g., with RRC reconfiguration message and/or MAC CE and/or physical layer signaling). In an example, the additional leg for transmission of a duplicate packet (e.g., additional carrier to which a duplicate logical channel corresponding to the duplicate PDCP packets may be mapped to) may be indicated to the wireless device (e.g., using an RRC IE and/or MAC CE and/or alike). In an example, the initial state of the uplink PDCP duplication may be a default state and/or pre-configured state (e.g., active state or not-active state). The additional leg for transmission of a duplicate packet may be a default leg and/or pre-configured leg (e.g., a default/pre-configured carrier for transmission of a duplicate logical channel).

In an example embodiment, one or more MAC layer mechanisms may be used to control PDCP duplication, e.g., to start and/or stop PDCP duplication for one or more radio bearers, to indicate additional leg/carrier for transmission of duplicate PDCP packets e.g., duplicate logical channel(s) to which duplicate PDCP packets are mapped to, etc. In an example, the one or more MAC layer mechanisms may be in combination with other signaling mechanism (e.g., RRC signaling), for controlling the PDCP duplication. In an example, the one or more MAC layer mechanism may be used for quicker signaling and/or less signaling overhead compared to other signaling mechanisms such as RRC to control the PDCP duplication. In an example, the one or more MAC layer mechanisms may comprise transmission of at least one MAC control element (MAC CE). Other signaling mechanisms (e.g., physical layer such as PDCCH or PDCCH like signaling) may be used in combination with MAC CE and/or RRC and/or alone to control the PDCP duplication.

In an example embodiment, a base station may use at least one MAC control element (MAC CE) to control (e.g., in combination with other signaling mechanisms such as RRC and/or alone) uplink PDCP duplication. In an example, controlling the PDCP duplication may comprise starting and/or stopping the duplication for one or more radio bearers, indicating the additional leg(s) for transmission of at least one PDCP duplicate packet and/or logical channel that PDCP duplicate packets are mapped to, the carrier(s) to transmit duplicate logical channel(s) corresponding to duplicate PDCP packets, logical channel corresponding to PDCP PDUs and/or duplicate logical channels corresponding to duplicate PDCP PDUs, one or more parameters corresponding to duplicate data transmission, etc.

In an example, duplicate PDCP packet data units (PDUs) may be submitted to two different RLC entities (e.g., a first RLC entity and a second RLC entity). In an example, the first RLC entity may be mapped to a first logical channel. The second RLC entity (e.g., the RLC entity receiving the duplicate PDCP PDUs) may be mapped to a second logical channel.

In an example embodiment, a wireless device may receive one or more messages comprising configuration parameters for a plurality of cells. In an example, the one or more messages may comprise one or more RRC messages. In an example, the configuration parameters may comprise parameters for a plurality of logical channels. In an example, the configuration parameters may comprise parameters for one or more radio bearers. In an example, the configuration parameters may indicate whether PDCP duplication is configured and/or activated/started for a first radio bearer. In an example, RRC may configure PDCP duplication for the first radio bearer and MAC CE and/or other MAC layer and/or physical layer signaling may activate/start the PDCP duplication for the first radio bearer. In an example, the first radio bearer may be mapped to a first logical channel and a second logical channel. In an example, the one or more messages may indicate the first logical channel and the second logical channel. In an example, the one or more messages may comprise a field indicating the first logical channel (e.g., comprising a first logical channel ID) and the second logical channel (e.g., comprising a second logical channel ID). In an example, the first logical channel may comprise data corresponding to PDCP PDUs corresponding to the first radio bearer. The second logical channel may comprise data corresponding to duplicate PDCP PDUs corresponding to the first radio bearer. In an example, the one or more messages may indicate that the first logical channel is mapped to at least one first cell/carrier and the second logical channel is mapped to at least one second cell/carrier. The at least one first cell/carrier and the at least one second cell/carrier may be different. In an example, the mapping of the first logical channel and/or the second logical channel to cells/carriers (e.g., the at least one first cell/carrier and the at least one second cell/carrier) may change. In an example, MAC CE may be used to indicate and/or update the mapping of the first logical channel to the at least one first cell/carrier and/or the second logical channel to the at least one second cell/carrier. In an example, MAC CE may comprise a field that indicates the mapping of the first logical channel to the at least one first cell/carrier and the mapping of the second logical channel to the at least one second cell/carrier.

In an example embodiment, in response to starting and/or activating PDCP duplication for the radio bearer (e.g., in response to RRC configuration and/or activation with MAC CE and/or activation with physical layer signaling), the MAC entity may copy the content of buffers associated with the first logical channel (e.g., MAC layer buffer(s) and/or RLC layer buffer(s) and/or alike) to the buffers associated with the second logical channel and may start applying the mapping restriction for the first logical channel (e.g., mapping of the first logical channel to the at least one first cell/carrier) and the second logical channel (e.g., mapping of the second logical channel to the at least one second cell/carrier) in response to performing the logical channel prioritization (LCP) procedure.

In an example embodiment, in response to starting and/or activating PDCP duplication for the radio bearer, the MAC entity may continue transmitting data in buffers associated with the first logical channel without applying the mapping restriction (e.g., mapping of the first logical channel to the at least one first cell/carrier) in response to performing the LCP procedure. The PDCP layer may submit the PDCP packets and duplicate PDCP packets to two different RLC entities (e.g., corresponding to the first logical channel and the second logical channel). In an example, in response to data in buffer(s) associated with the first logical channel being exhausted/depleted, the RLC entity corresponding to the first logical channel may submit data in its associated buffer(s) to the MAC layer and/or the RLC entity corresponding to the second logical channel may submit data in its associated buffer(s) to the MAC layer.

In an example embodiment, in response to stopping and/or deactivating PDCP duplication for the radio bearer (e.g., stopping/deactivating using MAC CE and/or RRC reconfiguration and/or alike), the mapping restriction for the first logical channel (e.g., mapping of the first logical channel to the at least one first cell/carrier) may stop (e.g., may no longer be applied and/or the mapping restriction may not be used in performing the logical channel prioritization procedure). In an example, in response to stopping and/or deactivating the PDCP duplication for the radio bearer, the second logical channel may be dismantled/deactivated. In an example, in response to the stopping and/or deactivating the PDCP duplication for the radio bearer, PDCP layer may not submit multiple PDCP packets to the RLC layer.

In an example embodiment, in response to the stopping and/or deactivating the PDCP duplication for the radio bearer, data in buffers associated with the second logical channel may be discarded/flushed and/or the second logical channel may be dismantled/deactivated. The LCP procedure may not consider the mapping restriction between the first and the second logical channel to the at least one first cell/carrier and the at least one second cell/carrier. In an example, in response to the stopping and/or deactivating the PDCP duplication for the radio bearer, a MAC entity may continue transmitting data in buffers associated with the second logical channel and/or the LCP procedure may continue to consider the mapping restriction between the first logical channel to the at least one first cell/carrier and the second logical channel to the at least one second cell/carrier until the data in buffers associated with the second logical channel is exhausted/depleted. In response to the data in buffers associated with the second logical channel being exhausted/depleted, the second logical channel may be dismantled/deactivated and/or the LCP procedure may not consider the mapping restriction between the first and the second logical channel to the at least one first cell/carrier and the at least one second cell/carrier.

In example embodiment, a logical channel may be configured with mapping restrictions. The wireless device may apply mapping restrictions to the logical channel so that data from the logical channel may be transmitted via one or more cells in a plurality of cells. In an example, the data from the logical channel may not be transmitted via other cells than the one or more cells in the plurality of cell. Other logical channel mapping restrictions may be configured/applied. For example, the logical channel may be transmitted via one or more subcarrier spacings in a plurality of subcarrier spacings or the logical channel may be transmitted via transport blocks that lead to transmission durations (e.g., PUSCH durations) less than a maximum transmission duration. For example, to achieve QoS requirements of a first logical channel (e.g., URLLC), uplink resource used for transmission of data from the first logical channel may be limited to one or more first cells and/or one or more first subcarrier spacings. In an example, the transmission duration of a transport block comprising the data from the first logical channel may be less than one or more first transmission durations. A second logical channel (e.g., corresponding to voice) may be configured with a different mapping restriction. A third logical channel may not be configured with a mapping restriction. The configuration of mapping restriction for logical channels helps to achieve the QoS requirements of the configured logical channels.

In an example implementation of mapping restriction, a logical channel corresponding to a bearer configured with duplication may be configured with mapping restriction. A base station may configure PDCP packet duplication for a bearer of wireless device. Existing implementation of activation/deactivation of packet duplication, leads to inefficient utilization of uplink resources when logical channel mapping restrictions is configured. There is a need to enhance existing packet duplication procedure to enhance uplink resource utilization as the bearers configured with duplication are dynamically activated and deactivated. Example embodiments enhance the existing packet duplication procedures and logical channel mapping restriction processes. Example embodiments implements cross-layer optimization to certain logical channels to achieve higher quality of service.

Figure 25:
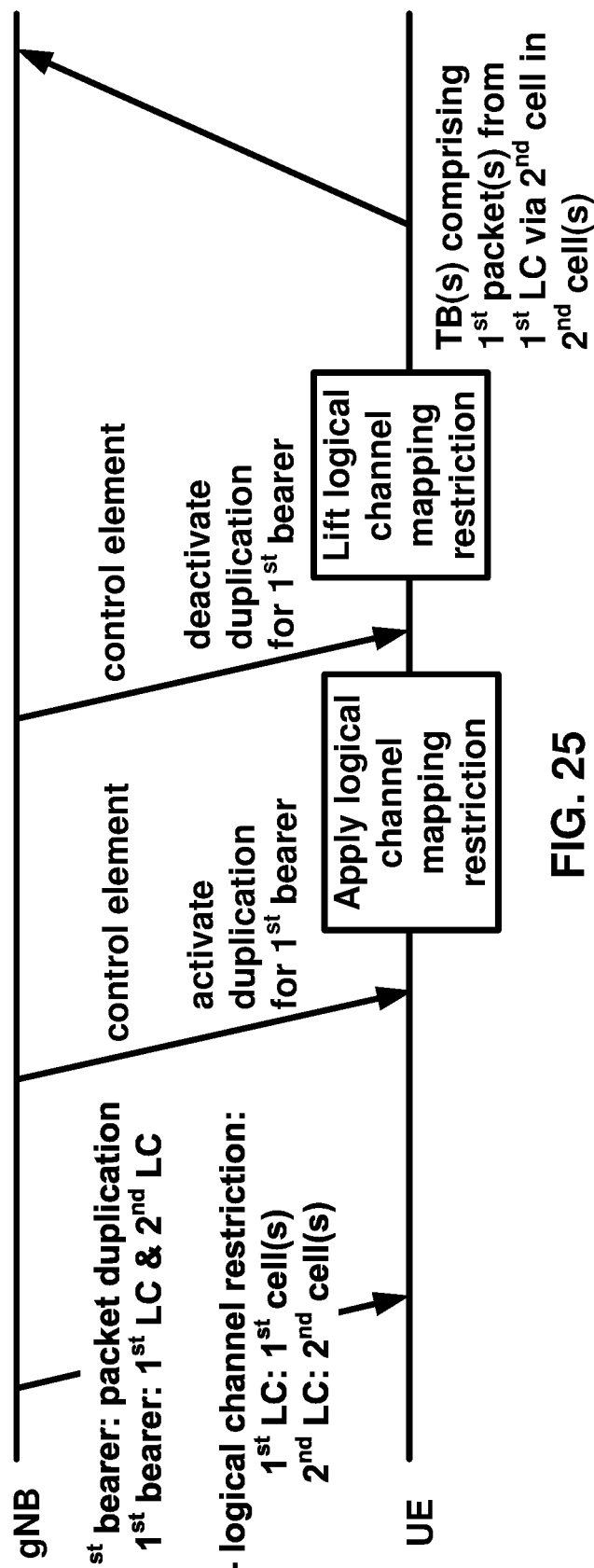
FIG. 25 is an example illustration of PDCP duplication procedure and logical channel mapping restriction as per an aspect of an embodiment of the present invention.
Figure 26:
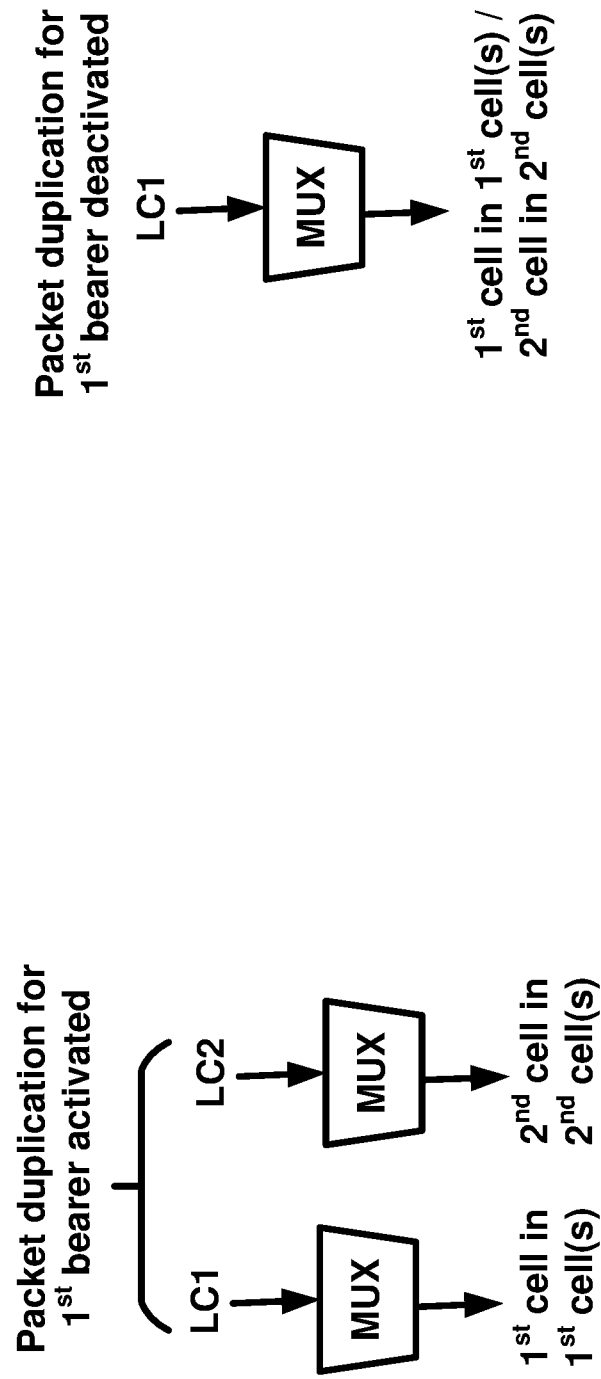
FIG. 26 is an example illustration of PDCP duplication procedure and logical channel mapping restriction as per an aspect of an embodiment of the present invention.

Example embodiments are shown in FIG. 25 and FIG. 26. A wireless device may receive configuration parameters comprising a parameter indicating that uplink duplication is configured for a bearer. In an example, the uplink duplication may be uplink PDCP packet duplication. The duplication may be used to enhance the reliability and latency of data packets corresponding to the bearer. In an example, the configuration parameters for the bearer may comprise the parameter. The bearer may correspond to a first logical channel and a second logical channel. In an example, the bearer may correspond to a first RLC entity corresponding to the first logical channel and a second RLC entity corresponding to the second logical channel. The first RLC entity may handle transmission of original PDCP packets of the bearer. One or more first buffers associated with the first logical channel may comprise the original PDCP packets of the bearer. The second RLC entity may handle transmission of duplicate PDCP packets of the bearer. One or more second buffers associated with the second logical channel may comprise the duplicate PDCP packets of the bearer. The configuration parameters may indicate first mapping restrictions of the first logical channel to at least one first cell. In an example, configuration parameters of the first logical channel may indicate the first mapping restriction. In an example, the configuration parameters of the first logical channel may indicate the at least one first cell (e.g., cell ID of the at least one first cell). The configuration parameters may indicate second mapping restrictions of the second logical channel to at least one second cell. In an example, configuration parameters of the second logical channel may indicate the second mapping restriction. In an example, the configuration parameters of the second logical channel may indicate the at least one second cell (e.g., cell ID of the at least one second cell).

In an example, the wireless device may receive a control element indicating activation or deactivation of duplication for the bearer. In an example, the control element may be a MAC control element. In an example, the control element may comprise one or more fields indicating activation and/or deactivation of one or more bearers comprising the bearer. In an example, a value of zero of a field in the one or fields may indicate that duplication is deactivated for a corresponding bearer. In an example, a value of one of a field in the one or more fields may indicate that duplication is activated for a corresponding bearer. In an example, if the control element indicates activation of the duplication for the bearer (e.g., if a field corresponding to the bearer in the one or more fields of the control element has a value of one), the wireless device may apply the first mapping restrictions to the first logical channel and the second mapping restrictions to the second logical channel. By applying the first mapping restrictions and the second mapping restrictions and by transmitting both original packets corresponding to the bearer and duplicate packets corresponding to the bearer, the uplink reliability and latency are improved for the bearer. In an example, if the control element indicates deactivation of the duplication for the bearer (e.g., if a field corresponding to the bearer in the one or more fields of the control element has a value of one), the wireless device may lift the first mapping restrictions to the first logical channel and the second mapping restrictions to the second logical channel. The lifting of the first mapping restrictions and the second mapping restrictions, if duplication is deactivated for the bearer, provides more scheduling flexibility and enables the wireless device to employ uplink resources for transmission of data which are not allowed to be used when duplication is activated. This improves uplink resource utilization efficiency and enhances the network performance.

In an example, the wireless device may receive a downlink control information (DCI), e.g., in a PDCCH. The DCI may comprise an uplink grant for the wireless device. The uplink grant may indicate transmission parameters for one or more transport blocks (TBs). The transmission parameters may comprise uplink resources for transmission of the one or more TBs, power control command, MIMO parameters, HARQ parameters, etc. In an example, a multiplexing and assembling entity in the MAC entity may construct the one or more TBs. The multiplexing and assembling entity may perform a logical channel prioritization procedure, considering the mapping restrictions. The wireless device may transmit the one or more TBs using the uplink resources indicated by the uplink grant.

In on embodiment, in response to RRC configuration and/or activation of PDCP duplication (e.g., by MAC layer) for a radio bearer, PHR is triggered so that base station knows if UE is power limited for a cell. If duplication is used for URLLC and the logical channel or the duplicate logical channel are mapped to a cell which is power limited, the benefit of duplication is diminished. The base station may use the PHR to configure the logical channel and the duplicate logical channel to be mapped to cells that are not power limited. In one embodiment, the PHR timers (e.g., periodicPHR-Timer) may be have different values if duplication is triggered compared to when duplication is not triggered.

In an example, a wireless device may use Power Headroom reporting (PHR) procedure to provide a serving base station with information about the difference between a nominal UE maximum transmit power and an estimated power for uplink (e.g., UL-SCH) transmission and/or SRS transmission per activated Serving Cell and/or with information about the difference between the nominal UE maximum power and an estimated power for UL-SCH and physical uplink control channel (e.g., PUCCH) transmission (e.g., on SpCell and PUCCH SCell). In an example, RRC may control Power Headroom reporting by configuring a plurality of parameters, e.g., one or more timers (e.g., periodicPHR-Timer, prohibitPHR-Timer and/or alike), and/or a parameter that sets the change in a measured downlink pathloss (e.g., dl-PathlossChange and/or alike), and/or the required power backoff due to power management, etc. In an example, the PHR may be triggered in response to occurrence of an event in a plurality of events occurring. In an example, the plurality of events may comprise: the periodicPHR-Timer expiring or the periodicPHR-Timer being expired and path loss having changed more than dl-pathlossChange dB for at least one activated serving cell of a MAC entity which may be used as a pathloss reference since the last transmission of a PHR in the MAC entity when the MAC entity has uplink resources for new transmission, periodicPHR-Timer being expired, in response to configuration and/or reconfiguration of the power headroom reporting functionality by upper layers which is not used to disable the function, in response to activation of an SCell of a MAC entity with configured uplink, etc.

In an example embodiment, a wireless device may receive one or more messages comprising configuration parameters for a plurality of cells. In an example, the one or more messages may comprise one or more RRC messages. In an example, the configuration parameters may comprise parameters for a plurality of logical channels. In an example, the configuration parameters may comprise parameters for one or more radio bearers. In an example, the configuration parameters may indicate whether PDCP duplication is configured and/or activated/started for a first radio bearer. In an example, RRC may configure PDCP duplication for the first radio bearer and MAC CE and/or other MAC layer and/or physical layer signaling may activate/start the PDCP duplication for the first radio bearer. In an example, RRC may configure and activate/start PDCP duplication for the first radio bearer. In an example, the PDCP duplication for the first radio bearer may start/be activated in response to RRC configuration. In an example, the first radio bearer may be mapped to a first logical channel and a second logical channel. In an example, the one or more messages may indicate the first logical channel and the second logical channel. In an example, the one or more messages may comprise a field indicating the first logical channel (e.g., comprising a first logical channel ID) and the second logical channel (e.g., comprising a second logical channel ID). In an example, the MAC CE may indicate the first logical channel and the second logical channel. In an example, the MAC CE may comprise a field indicating the first logical channel (e.g., comprising a first logical channel ID) and the second logical channel (e.g., comprising a second logical channel ID). In an example, the buffers associated with the first logical channel may comprise data corresponding to PDCP PDUs corresponding to the first radio bearer. The buffers associated with the second logical channel may comprise data corresponding to duplicate PDCP PDUs corresponding to the first radio bearer. In an example, the one or more messages may indicate that the first logical channel is mapped to one or more first cells/carriers and the second logical channel is mapped to one or more second cells/carriers. In an example, the MAC CE may indicate that the first logical channel is mapped to one or more first cells/carriers and the second logical channel is mapped to one or more second cells/carriers. In an example, the MAC CE may comprise a field indicating the one or more first cells (e.g., using one or more first cell IDs) and the one or more second cells (e.g., using one or more second cell IDs). In an example, a MAC entity in the wireless device may consider the mapping of the first logical channel to the one or more first cells/carriers and the second logical channel to the one or more second cells/carriers in response to performing a logical channel prioritization procedure. In an example, the MAC entity in the wireless device may trigger a power headroom report (PHR) in response to configuration and/or activation of PDCP duplication of one or more radio bearers for the wireless device. In an example, the MAC entity in the wireless device may trigger a PHR in response to receiving an activation/starting command (e.g., a MAC CE and/or an RRC message configuring/reconfiguring/starting PDCP duplication) from the base station to configure and/or active/start PDCP duplication for one or more radio bearers. In an example, the PHR MAC CE in response to the PHR being triggered by the configuring/reconfiguring/starting of PDCP duplication may have a first format (e.g., a short format, etc.). The first format may be different from one or more PHR formats when the PHR is triggered by one or more other events. In an example, the PHR MAC CE in response to PHR being triggered by the configuring/reconfiguring/starting PDCP duplication may comprise one or more first PHR types. The one or more first PHR types may be different from one or more second PHR types in response to PHR being triggered by one or more other events. In an example, the wireless device may receive a downlink control information (DCI), e.g., in a PDCCH. The DCI may comprise an uplink grant for the wireless device. The uplink grant may indicate transmission parameters for one or more transport blocks (TBs). The transmission parameters may comprise uplink resources for transmission of the one or more TBs, power control command, MIMO parameters, HARQ parameters, etc. In an example, a multiplexing and assembling entity in the MAC entity may multiplex the PHR MAC CE in the one or more TBs. The multiplexing and assembling entity may perform a logical channel prioritization procedure and multiplex a PHR MAC CE with MAC SDUs. The wireless device may transmit the one or more TBs using the uplink resources indicated by the uplink grant.

In an example embodiment, a wireless device may receive one or more messages comprising configuration parameters for a plurality of cells. In an example, the one or more messages may comprise one or more RRC messages. In an example, the configuration parameters may comprise parameters for a plurality of logical channels. In an example, the configuration parameters may comprise parameters for one or more radio bearers. In an example, the configuration parameters may indicate whether PDCP duplication is configured and/or activated/started for a first radio bearer. In an example, RRC may configure PDCP duplication for the first radio bearer and MAC CE and/or other MAC layer and/or physical layer signaling may activate/start the PDCP duplication for the first radio bearer. In an example, RRC may configure and activate/start PDCP duplication for the first radio bearer. In an example, the PDCP duplication for the first radio bearer may start/be activated in response to RRC configuration. In an example, the first radio bearer may be mapped to a first logical channel and a second logical channel. In an example, the one or more messages may indicate the first logical channel and the second logical channel. In an example, the one or more messages may comprise a field indicating the first logical channel (e.g., comprising a first logical channel ID) and the second logical channel (e.g., comprising a second logical channel ID). In an example, the MAC CE may indicate the first logical channel and the second logical channel. In an example, the MAC CE may comprise a field indicating the first logical channel (e.g., comprising a first logical channel ID) and the second logical channel (e.g., comprising a second logical channel ID). In an example, the buffers associated with the first logical channel may comprise data corresponding to PDCP PDUs corresponding to the first radio bearer. The buffers associated with the second logical channel may comprise data corresponding to duplicate PDCP PDUs corresponding to the first radio bearer. In an example, the one or more messages may indicate that the first logical channel is mapped to one or more first cells/carriers and the second logical channel is mapped to one or more second cells/carriers. In an example, the MAC CE may indicate that the first logical channel is mapped to one or more first cells/carriers and the second logical channel is mapped to one or more second cells/carriers. In an example, the MAC CE may comprise a field indicating the one or more first cells (e.g., using one or more first cell IDs) and the one or more second cells (e.g., using one or more second cell IDs). In an example, a MAC entity in the wireless device may consider the mapping of the first logical channel to the one or more first cells/carriers and the second logical channel to the one or more second cells/carriers in response to performing a logical channel prioritization procedure. In an example, the configuration parameters may comprise parameters for a timer. The parameters for the timer may comprise a first timer value and a second timer value. The wireless device may use the first timer value in response to PDCP duplication being configured and/or activated/started for the wireless device. The wireless device may use the second timer value in response to PDCP duplication not being configured and/or activated/started for the wireless device. In an example, the wireless device may start the timer in response to MAC entity having uplink resources allocated for new transmission for a TTI and it being the first UL resource allocated for a new transmission since last MAC reset. In an example, a MAC entity may start the timer in response to transmission of a PHR MAC CE. Other events may start the timer. The wireless may trigger a PHR in response to the timer being expired. In an example, the wireless device may not trigger a PHR in response to the timer being running. In an example, the timer may be a periodicPHR-Timer. In an example, the timer may be a prohibitPHR-timer. In an example, the wireless device may receive a downlink control information (DCI), e.g., in a PDCCH. The DCI may comprise an uplink grant for the wireless device. The uplink grant may indicate transmission parameters for one or more transport blocks (TBs). The transmission parameters may comprise uplink resources for transmission of the one or more TBs, power control command, MIMO parameters, HARQ parameters, etc. In an example, a multiplexing and assembling entity in the MAC entity may multiplex the PHR MAC CE in the one or more TBs. The multiplexing and assembling entity may perform a logical channel prioritization procedure and multiplex a PHR MAC CE with MAC SDUs. The wireless device may transmit the one or more TBs using the uplink resources indicated by the uplink grant.

If a logical channel and/or its duplicate cannot be transmitted on a cell due to poor channel condition, the corresponding logical channel buffer occupancy will be very large. The base station needs to know this to configure/reconfigure the cells associated with logical channels and their duplicates. In on embodiment, in response to RRC configuration and/or activation of PDCP duplication (e.g., by MAC layer) for a radio bearer, BSR is triggered. If duplication is used for URLLC and the logical channel or the duplicate logical channel are mapped to a cell which has poor channel conditions, the benefit of duplication is diminished. The base station may use the BSR to configure/reconfigure the logical channel and the duplicate logical channel to be mapped to cells with good channel conditions. In one embodiment, the BSR timers (e.g., periodicBSR-Timer) may be have different values if duplication is triggered compared to when duplication is not triggered.

The Buffer Status reporting (BSR) procedure may be used to provide a serving base station with information about the amount of data available for transmission in UL buffers associated with a MAC entity. RRC may control BSR by configuring a plurality of timers (e.g., periodicBSR-Timer and/or retxBSR-Timer and/or logicalChannelSR-Prohibit-Timer, etc.). In an example, a logical channel may be configured with a logicalChannelGroup parameter which may allocate the logical channel to a logical channel group (LCG). A BSR may be triggered in response to an event in a plurality of events occurring.

In an example embodiment, a wireless device may receive one or more messages comprising configuration parameters for a plurality of cells. In an example, the one or more messages may comprise one or more RRC messages. In an example, the configuration parameters may comprise parameters for a plurality of logical channels. In an example, the configuration parameters may comprise parameters for one or more radio bearers. In an example, the configuration parameters may indicate whether PDCP duplication is configured and/or activated/started for a first radio bearer. In an example, RRC may configure PDCP duplication for the first radio bearer and MAC CE and/or other MAC layer and/or physical layer signaling may activate/start the PDCP duplication for the first radio bearer. In an example, RRC may configure and activate/start PDCP duplication for the first radio bearer. In an example, the PDCP duplication for the first radio bearer may start/be activated in response to RRC configuration. In an example, the first radio bearer may be mapped to a first logical channel and a second logical channel. In an example, the one or more messages may indicate the first logical channel and the second logical channel. In an example, the one or more messages may comprise a field indicating the first logical channel (e.g., comprising a first logical channel ID) and the second logical channel (e.g., comprising a second logical channel ID). In an example, the MAC CE may indicate the first logical channel and the second logical channel. In an example, the MAC CE may comprise a field indicating the first logical channel (e.g., comprising a first logical channel ID) and the second logical channel (e.g., comprising a second logical channel ID). In an example, the buffers associated with the first logical channel may comprise data corresponding to PDCP PDUs corresponding to the first radio bearer. The buffers associated with the second logical channel may comprise data corresponding to duplicate PDCP PDUs corresponding to the first radio bearer. In an example, the one or more messages may indicate that the first logical channel is mapped to one or more first cells/carriers and the second logical channel is mapped to one or more second cells/carriers. In an example, the MAC CE may indicate that the first logical channel is mapped to one or more first cells/carriers and the second logical channel is mapped to one or more second cells/carriers. In an example, the MAC CE may comprise a field indicating the one or more first cells (e.g., using one or more first cell IDs) and the one or more second cells (e.g., using one or more second cell IDs). In an example, a MAC entity in the wireless device may consider the mapping of the first logical channel to the one or more first cells/carriers and the second logical channel to the one or more second cells/carriers in response to performing a logical channel prioritization procedure. In an example, the MAC entity in the wireless device may trigger a buffer status report (BSR) in response to configuration and/or activation of PDCP duplication of one or more radio bearers for the wireless device. In an example, the MAC entity in the wireless device may trigger a BSR in response to receiving an activation/starting command (e.g., a MAC CE and/or an RRC message configuring/reconfiguring/starting PDCP duplication) from the base station to configure and/or active/start PDCP duplication for one or more radio bearers. In an example, the BSR MAC CE in response to the BSR being triggered by the configuring/reconfiguring/starting of PDCP duplication may have a first format (e.g., a short format, etc.). The first format may be different from one or more BSR formats when the BSR is triggered by one or more other events. In an example, the wireless device may receive a downlink control information (DCI), e.g., in a PDCCH. The DCI may comprise an uplink grant for the wireless device. The uplink grant may indicate transmission parameters for one or more transport blocks (TB s). The transmission parameters may comprise uplink resources for transmission of the one or more TBs, power control command, MIMO parameters, HARQ parameters, etc. In an example, a multiplexing and assembling entity in the MAC entity may multiplex the BSR MAC CE in the one or more TBs. The multiplexing and assembling entity may perform a logical channel prioritization procedure and multiplex a BSR MAC CE with MAC SDUs. The wireless device may transmit the one or more TBs using the uplink resources indicated by the uplink grant.

In an example embodiment, a wireless device may receive one or more messages comprising configuration parameters for a plurality of cells. In an example, the one or more messages may comprise one or more RRC messages. In an example, the configuration parameters may comprise parameters for a plurality of logical channels. In an example, the configuration parameters may comprise parameters for one or more radio bearers. In an example, the configuration parameters may indicate whether PDCP duplication is configured and/or activated/started for a first radio bearer. In an example, RRC may configure PDCP duplication for the first radio bearer and MAC CE and/or other MAC layer and/or physical layer signaling may activate/start the PDCP duplication for the first radio bearer. In an example, RRC may configure and activate/start PDCP duplication for the first radio bearer. In an example, the PDCP duplication for the first radio bearer may start/be activated in response to RRC configuration. In an example, the first radio bearer may be mapped to a first logical channel and a second logical channel. In an example, the one or more messages may indicate the first logical channel and the second logical channel. In an example, the one or more messages may comprise a field indicating the first logical channel (e.g., comprising a first logical channel ID) and the second logical channel (e.g., comprising a second logical channel ID). In an example, the MAC CE may indicate the first logical channel and the second logical channel. In an example, the MAC CE may comprise a field indicating the first logical channel (e.g., comprising a first logical channel ID) and the second logical channel (e.g., comprising a second logical channel ID). In an example, the buffers associated with the first logical channel may comprise data corresponding to PDCP PDUs corresponding to the first radio bearer. The buffers associated with the second logical channel may comprise data corresponding to duplicate PDCP PDUs corresponding to the first radio bearer. In an example, the one or more messages may indicate that the first logical channel is mapped to one or more first cells/carriers and the second logical channel is mapped to one or more second cells/carriers. In an example, the MAC CE may indicate that the first logical channel is mapped to one or more first cells/carriers and the second logical channel is mapped to one or more second cells/carriers. In an example, the MAC CE may comprise a field indicating the one or more first cells (e.g., using one or more first cell IDs) and the one or more second cells (e.g., using one or more second cell IDs). In an example, a MAC entity in the wireless device may consider the mapping of the first logical channel to the one or more first cells/carriers and the second logical channel to the one or more second cells/carriers in response to performing a logical channel prioritization procedure. In an example, the configuration parameters may comprise parameters for a timer. The parameters for the timer may comprise a first timer value and a second timer value. The wireless device may use the first timer value in response to PDCP duplication being configured and/or activated for the wireless device. The wireless device may use the second timer value in response to PDCP duplication not being configured and/or activated for the wireless device. In an example, the wireless device may start the timer in response to generating one or more BSR MAC CEs. In an example, the wireless device may start the timer in response to generating one or more BSR MAC CEs except when generated BSRs are Truncated BSRs. The timer may be started in response to other events.

The wireless device may trigger a BSR in response to the timer being expired. In an example, the timer may be a periodicBSR-Timer. In an example, the timer may be a retxBSR-Timer. In an example, the timer may be a logicalChannelSR-ProhibitTimer. In an example, the wireless device may receive a downlink control information (DCI), e.g., in a PDCCH. The DCI may comprise an uplink grant for the wireless device. The uplink grant may indicate transmission parameters for one or more transport blocks (TBs). The transmission parameters may comprise uplink resources for transmission of the one or more TBs, power control command, MIMO parameters, HARQ parameters, etc. In an example, a multiplexing and assembling entity in the MAC entity may multiplex the BSR MAC CE in the one or more TBs. The multiplexing and assembling entity may perform a logical channel prioritization procedure and multiplex a BSR MAC CE with MAC SDUs. The wireless device may transmit the one or more TBs using the uplink resources indicated by the uplink grant.

The PDCP duplication control MAC CE is a downlink MAC CE used by the base station to control the PDCP duplication function for one or more radio bearers configured for a wireless device. In an example, the PDCP duplication control MAC CE may start/stop the PDCP duplication for one or more radio bearers. The one or more radio bearers may have been configured by RRC for PDCP duplication. In an example, part of PDCP duplication parameters for a radio bearer may be configured by RRC and part of the parameters may be indicated using the PDCP duplication control MAC CE. In an example, part of the PDCP duplication parameters may be updated with the PDCP duplication control MAC CE after being configured by RRC. Example PDCP duplication parameters that may be indicated by the MAC CE may be the cells that logical channels corresponding to a radio bearer configured with PDCP are mapped to, logical channels that the radio bearer configured with PDCP duplication are mapped to, etc.

In an example embodiment, a wireless device may receive one or more messages comprising configuration parameters for a plurality of cells. In an example, the one or more messages may comprise one or more RRC messages. In an example, the configuration parameters may comprise parameters for one or more logical channels. In an example, the configuration parameters may comprise parameters for one or more radio bearers. In an example, the configuration parameters may indicate whether PDCP duplication is configured for one or more first radio bearers. In an example, RRC may configure PDCP duplication for the one or more first radio bearers. MAC CE may activate/start and/or deactivate/stop the PDCP duplication for the one or more first radio bearers. The RRC configuration may comprise PDCP duplication parameters for the one or more first radio bearers. In an example, a radio bearer in the one or more first radio bearers may be mapped to a first logical channel and a second logical channel. In an example, the one or more messages and/or the one or more RRC messages may indicate the first logical channel and the second logical channel. The buffers associated with the first logical channel may comprise data corresponding to PDCP PDUs corresponding to the radio bearer. The buffers associated with second logical channel may comprise data corresponding to duplicate PDCP PDUs corresponding to the radio bearer. In an example, RRC may indicate mapping restriction for the first logical channel and the second logical channel. As an example of mapping restriction, RRC may indicate that the first logical channel may be mapped to one or more first cells/carriers and the second logical channel may be mapped to one or more second cells/carriers. In an example, the one or more first cells/carriers and the one or more second cells/carriers may be different. The wireless device may receive a MAC CE to activate/start and/or deactivate/stop the PDCP duplication for the one or more first radio bearers. In an example, the MAC CE may comprise at least one activation/deactivation bit that activates/deactivates PDCP duplication for the one or more first radio bearers. In an example, the MAC CE may comprise a single activation/deactivation bit that activates/deactivates PDCP duplication for the one or more first radio bearers. In an example, the activation/deactivation bit may take a value of 1 (e.g., to activate/start) or 0 (e.g., to deactivate/stop) PDCP duplication for the one or more first radio bearers. In an example, MAC CE may not comprise a payload (e.g., may comprise zero bits). The presence of a MAC PDU subheader with LCID corresponding to the PDCP duplication control MAC CE may indicate that PDCP duplication for the one or more first radio bearers are activated. In an example, the wireless device may receive a downlink control information (DCI), e.g., in a PDCCH. The DCI may comprise an uplink grant for the wireless device. The uplink grant may indicate transmission parameters for one or more transport blocks (TBs). The transmission parameters may comprise uplink resources for transmission of the one or more TBs, power control command, MIMO parameters, HARQ parameters, etc. In an example, the MAC entity may construct the one or more TBs. The multiplexing and assembling entity may perform a logical channel prioritization procedure and multiplex MAC SDUs and/or MAC CEs. The wireless device may transmit the one or more TBs using the uplink resources indicated by the uplink grant.

In an example embodiment, a wireless device may receive one or more messages comprising configuration parameters for a plurality of cells. In an example, the one or more messages may comprise one or more RRC messages. In an example, the configuration parameters may comprise parameters for one or more logical channels. In an example, the configuration parameters may comprise parameters for one or more radio bearers. In an example, the configuration parameters may indicate whether PDCP duplication is configured for one or more first radio bearers. In an example, RRC may configure PDCP duplication for the one or more first radio bearers. MAC CE may activate/start and/or deactivate/stop the PDCP duplication for one or more second radio bearers of the one or more first radio bearers. The one or more second radio beaeres may be a subset of the one or more first radio bearers. The RRC configuration may comprise PDCP duplication parameters for the one or more first radio bearers. In an example, a radio bearer in the one or more first radio bearers may be mapped to a first logical channel and a second logical channel. In an example, the one or more messages and/or the one or more RRC messages may indicate the first logical channel and the second logical channel. The buffers associated with the first logical channel may comprise data corresponding to PDCP PDUs corresponding to the radio bearer. The buffers associated with the second logical channel may comprise data corresponding to duplicate PDCP PDUs corresponding to the radio bearer. In an example, RRC may indicate mapping restriction for the first logical channel and the second logical channel. As an example of mapping restriction, RRC may indicate that the first logical channel may be mapped to one or more first cells/carriers and the second logical channel may be mapped to one or more second cells/carriers. In an example, the one or more first cells/carriers and the one or more second cells/carriers may be different. The wireless device may receive a MAC CE to activate/start and/or deactivate/stop the PDCP duplication for the one or more second logical channels of the one or more first radio bearers. In an example, the MAC CE may comprise a field that activates/ starts and/or deactivates/stops PDCP duplication for the one or more second radio bearers. In an example, the field may comprise a bitmap indicating the one or more second radio bearers in the one or more first radio bearers. In an example, the MAC CE may comprise IDs corresponding to the one or more second radio bearers indicating PDCP duplication for the one or more second radio bearers are activated/started and/or deactivated/stopped. In an example, the PDCP duplication control MAC CE may comprise a first format (e.g., comprising one octet) or a second format (e.g., comprising a plurality of octets e.g., 2, 3, 4, etc.). The format of the PDCP duplication MAC CE that is used by the base station may depend on the number of radio bearers that are configured (e.g., with RRC) for PDCP duplication (e.g., the number of the one or more first radio bearers). In an example, the PDCP duplication control MAC CE may comprise of one format (e.g., the first format). In an example, the wireless device may receive a downlink control information (DCI), e.g., in a PDCCH. The DCI may comprise an uplink grant for the wireless device. The uplink grant may indicate transmission parameters for one or more transport blocks (TBs). The transmission parameters may comprise uplink resources for transmission of the one or more TBs, power control command, MIMO parameters, HARQ parameters, etc. In an example, the MAC entity may construct the one or more TBs. The multiplexing and assembling entity may perform a logical channel prioritization procedure and multiplex MAC SDUs and/or MAC CEs. The wireless device may transmit the one or more TBs using the uplink resources indicated by the uplink grant.

In an example embodiment, a wireless device may receive one or more messages comprising configuration parameters for a plurality of cells. In an example, the one or more messages may comprise one or more RRC messages. In an example, the configuration parameters may comprise parameters for one or more logical channels. In an example, the configuration parameters may comprise parameters for one or more radio bearers. In an example, the configuration parameters may indicate whether PDCP duplication is configured for one or more first radio bearers. In an example, RRC may configure PDCP duplication for the one or more first radio bearers. MAC CE may activate/start and/or deactivate/stop the PDCP duplication for the one or more first radio bearers. The RRC configuration may comprise some of the PDCP duplication parameters for the one or more first radio bearers. The MAC CE may comprise some of the PDCP duplication parameters for the one or more first radio bearers. In an example, a radio bearer in the one or more first radio bearers may be mapped to a first logical channel and a second logical channel. In an example, the one or more messages and/or the one or more RRC messages may indicate the first logical channel and the second logical channel. In an example, the MAC CE may indicate the first logical channel and the second logical channel. In an example, the MAC CE may comprise a field comprising a first logical channel ID and a second logical channel ID. The buffers associated with the first logical channel may comprise data corresponding to PDCP PDUs corresponding to the radio bearer. The buffers associated with the second logical channel may comprise data corresponding to duplicate PDCP PDUs corresponding to the radio bearer. In an example, MAC CE may indicate mapping restriction for the first logical channel and the second logical channel. As an example of mapping restriction, the first logical channel may be mapped to one or more first cells/carriers and the second logical channel may be mapped to one or more second cells/carriers. In an example, the one or more first cells/ carriers and the one or more second cells/carriers may be different. The wireless device may receive a MAC CE to activate/start and/or deactivate/stop the PDCP duplication for the one or more first radio bearers. In an example, the MAC CE may comprise at least one activation/deactivation bit that activates/starts and/or deactivates/stops PDCP duplication for the one or more first radio bearers. In an example, the MAC CE may comprise a single activation/deactivation bit that activates/starts and/or deactivates/stops PDCP duplication for the one or more first radio bearers. In an example, MAC CE may not comprise a payload (e.g., may comprise zero bits). The presence of a MAC PDU subheader with LCID corresponding to the PDCP duplication control MAC CE may indicate that PDCP duplication for the one or more first radio bearers are activated/started. In an example, the MAC CE may comprise a field that indicates the mapping restrictions for the logical channels corresponding to the one or more first radio bearers. In an example, the field may comprise one or more cell IDs corresponding to a logical channel corresponding to a bearer in the one or more first radio bearers. In an example, the wireless device may receive a downlink control information (DCI), e.g., in a PDCCH. The DCI may comprise an uplink grant for the wireless device. The uplink grant may indicate transmission parameters for one or more transport blocks (TBs). The transmission parameters may comprise uplink resources for transmission of the one or more TBs, power control command, MIMO parameters, HARQ parameters, etc. In an example, the MAC entity may construct the one or more TBs. The multiplexing and assembling entity may perform a logical channel prioritization procedure and multiplex MAC SDUs and/or MAC CEs. The wireless device may transmit the one or more TBs using the uplink resources indicated by the uplink grant.

In an example embodiment, a wireless device may receive one or more messages comprising configuration parameters for a plurality of cells. In an example, the one or more messages may comprise one or more RRC messages. In an example, the configuration parameters may comprise parameters for one or more logical channels. In an example, the configuration parameters may comprise parameters for one or more radio bearers. In an example, the configuration parameters may indicate whether PDCP duplication is configured for one or more first radio bearers. In an example, RRC may configure PDCP duplication for the one or more first radio bearers. MAC CE may activate/start and/or deactivate/stop the PDCP duplication for one or more second radio bearers of the one or more first radio bearers. The one or more second radio bearers may be a subset of the one or more first radio bearers. The RRC configuration may comprise some of the PDCP duplication parameters for the one or more first radio bearers. The MAC CE may comprise some of the PDCP duplication parameters for the one or more first radio bearers and/or the one or more second radio bearers. In an example, a radio bearer in the one or more first radio bearers may be mapped to a first logical channel and a second logical channel. In an example, the one or more messages and/or the one or more RRC messages may indicate the first logical channel and the second logical channel. In an example, the MAC CE may indicate the first logical channel and the second logical channel. In an example, the MAC CE may comprise a field comprising a first logical channel ID and a second logical channel ID. The buffers associated with the first logical channel may comprise data corresponding to PDCP PDUs corresponding to the radio bearer. The buffers associated with the second logical channel may comprise data corresponding to duplicate PDCP PDUs corresponding to the radio bearer. In an example, MAC CE may indicate mapping restriction for the first logical channel and the second logical channel. As an example of mapping restriction, the first logical channel may be mapped to one or more first cells/carriers and the second logical channel may be mapped to one or more second cells/carriers. In an example, the one or more first cells/carriers and the one or more second cells/carriers may be different. The wireless device may receive a MAC CE to activate/start and/or deactivate/stop the PDCP duplication for the one or more second radio bearers. In an example, the MAC CE may comprise a field that activates/starts and/or deactivates/stops PDCP duplication for the one or more second radio bearers. In an example, the field may comprise a bitmap indicating the one or more second radio bearers in the one or more first radio bearers. In an example, the MAC CE may comprise IDs corresponding to the one or more second radio bearers indicating PDCP duplication for the one or more second radio bearers are activated/started and/or deactivated/stopped. In an example, the PDCP duplication control MAC CE may comprise a first format (e.g., comprising one octet) or a second format (e.g., comprising a plurality of octets e.g., 2, 3, 4, octets, etc.). The format of the PDCP duplication MAC CE that is used by the base station may depend on the number of radio bearers that are configured (e.g., with RRC) for PDCP duplication (e.g., the number of the one or more first radio bearers). In an example, the PDCP duplication control MAC CE may comprise of one format (e.g., the first format). In an example, the MAC CE may comprise a field that indicates the mapping restrictions for the logical channels corresponding to the one or more first radio bearers. In an example, the field may comprise one or more cell IDs corresponding to a logical channel corresponding to a bearer in the one or more first radio bearers. In an example, the wireless device may receive a downlink control information (DCI), e.g., in a PDCCH. The DCI may comprise an uplink grant for the wireless device. The uplink grant may indicate transmission parameters for one or more transport blocks (TBs). The transmission parameters may comprise uplink resources for transmission of the one or more TBs, power control command, MIMO parameters, HARQ parameters, etc. In an example, the MAC entity may construct the one or more TBs. The multiplexing and assembling entity may perform a logical channel prioritization procedure and multiplex MAC SDUs and/or MAC CEs. The wireless device may transmit the one or more TBs using the uplink resources indicated by the uplink grant.

Figure 17:
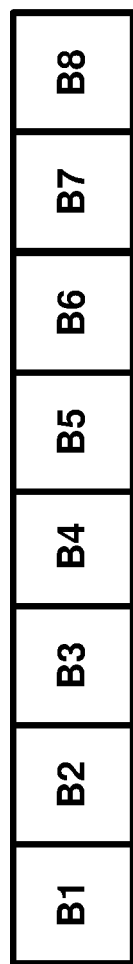
FIG. 17 is an example illustration of PDCP duplication control MAC control element (MAC CE) format as per an aspect of an embodiment of the present invention.

In an example embodiment, a MAC CE format as shown in FIG. 17 may be used. The MAC CE may comprise an octet indicating a bitmap may be used that may indicate the radio bearers to be activated/deactivated for PDCP duplication. A bit equal to one may indicate that the corresponding radio bearer is activated for PDCP duplication. A bit equal to zero may indicate that the corresponding radio bearer is deactivated for PDCP duplication. In an example, the radio bearers may be sorted according to their bearer IDs. In an example, B1 may correspond to the largest bearer ID, B2 may correspond to the second largest bearer ID, and so on. In an example, B1 may correspond to the smallest bearer ID, B2 may correspond to the second smallest bearer ID, and so on. Other criteria for sorting radio bearer IDs may be used.

In an example, a single PDCP duplication MAC CE format may be used (e.g., the first format or the second format).

Figure 18:
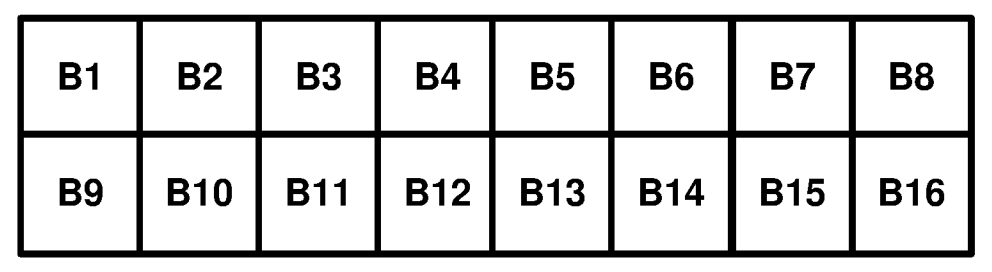

In an example embodiment, a MAC CE format as shown in FIG. 18 may be used. The MAC CE may comprise two octets indicating a bitmap may be used that may indicate the radio bearers to be activated/deactivated for PDCP duplication. A bit equal to one may indicate that the corresponding radio bearer is activated for PDCP duplication. A bit equal to zero may indicate that the corresponding radio bearer is deactivated for PDCP duplication. In an example, the radio bearers may be sorted according to their bearer IDs. In an example, B1 may correspond to the largest bearer ID, B2 may correspond to the second largest bearer ID, and so on. In an example, B1 may correspond to the smallest bearer ID, B2 may correspond to the second smallest bearer ID, and so on. Other criteria for sorting radio bearer IDs may be used. In an example, a single PDCP duplication MAC CE format may be used (e.g., the first format or the second format).

In an example, a MAC CE format according to FIG. 17 or FIG. 18 may be used depending on the number of bearers configured for PDCP duplication and/or the number of bearers for which PDCP duplication is activated/deactivated. In an example first format, an octet indicating a bitmap may be used that may indicate the radio bearers to be activated/deactivated for PDCP duplication. In an example, the base station may use a first format MAC CE for PDCP duplication control in response to number of configured radio bearers for PDCP duplication and/or the number of bearers activated/deactivated for PDCP duplication being less than or equal to 8. In an example, the base station may use a second format MAC CE for PDCP duplication control in response to number of configured radio bearers for PDCP duplication and/or the number of bearers activated/deactivated for PDCP duplication being larger than 8. In example, the second format MAC CE may comprise two octets. Other examples (e.g., three, four octets, etc.) may be used.

Example MAC CE formats for PDCP duplication control are shown in FIG. 17 and FIG. 18. In an example, a plurality of MAC CE formats may be used for PDCP duplication control. In an example, the base station may use a format in the plurality of formats depending on the number of bearers configured for PDCP duplication and/or the number of bearers for which PDCP duplication is activated/deactivated. In an example first format, an octet indicating a bitmap may be used that may indicate the radio bearers to be activated/deactivated for PDCP duplication. In an example, the base station may use a first format MAC CE for PDCP duplication control in response to number of configured radio bearers for PDCP duplication and/or the number of bearers activated/deactivated for PDCP duplication being less than or equal to 8. In an example, the base station may use a second format MAC CE for PDCP duplication control in response to number of configured radio bearers for PDCP duplication and/or the number of bearers activated/deactivated for PDCP duplication being larger than 8. In example, the second format MAC CE may comprise two octets. Other examples (e.g., three, four octets, etc.) may be used. A bit equal to one may indicate that the corresponding radio bearer is activated for PDCP duplication. A bit equal to zero may indicate that the corresponding radio bearer is deactivated for PDCP duplication. In an example, the radio bearers may be sorted according to their bearer IDs. In an example, B1 may correspond to the largest bearer ID, B2 may correspond to the second largest bearer ID, and so on. In an example, B1 may correspond to the smallest bearer ID, B2 may correspond to the second smallest bearer ID, and so on. Other criteria for sorting radio bearer IDs may be used. In an example, a single PDCP duplication MAC CE format may be used (e.g., the first format or the second format).

PDCP duplication is a method for improving packet transmission reliability in a wireless network. The base station may configure PDCP duplication for one or more bearers of a wireless device and may dynamically activate or deactivate the PDCP duplication with a control element (e.g., MAC control element). A wireless device may be configured with up to 32 bearers and each bearer may be associated with a bearer identifier. Implementation of existing MAC CE mechanisms will result in increased downlink signaling overhead for PDCP duplication activation.

For example, if the control element for PDCP duplication control includes the bearer identifiers for which the PDCP duplication is activated or deactivated, the size of the MAC CE may require large number of bits. For example, if eight bearers are configured with PDCP duplication and a bearer identifier includes five bit, forty bits (five octets) will be needed to indicate the bearer identifiers for the eight bearers configured with PDCP duplication. This increases downlink signaling overhead and leads to inefficient resource utilization. There is a need to efficiently indicate the status of PDCP duplication (e.g., activation or deactivation) for bearers configured with PDCP duplication.

For example, if the control element for PDCP duplication control includes a bitmap for which the PDCP duplication is activated or deactivated for configured bears, the size of the MAC CE may require 32 bits. For example, 32 (four octets) may be needed to indicate duplication activation/deactivation for each bearer identifier from 0 to 31. In another example, when less than 32 bearers are configured, the bitmap may includes bits for configured bearer identifiers, for example, 18 bits for 18 configured bearers. This increases downlink signaling overhead and leads to inefficient resource utilization. There is a need to efficiently indicate the status of PDCP duplication (e.g., activation or deactivation) for bearers configured with PDCP duplication.

Example embodiments provide efficient control element formats (e.g. MAC CE formats) and PDCP duplication processes to activate/deactivate PDCP duplication bearers configured with PDCP duplication. Example embodiments reduces downlink signaling overhead and leads to efficient resource utilization compared with when legacy MAC CE mechanisms are implemented.

Figure 23:
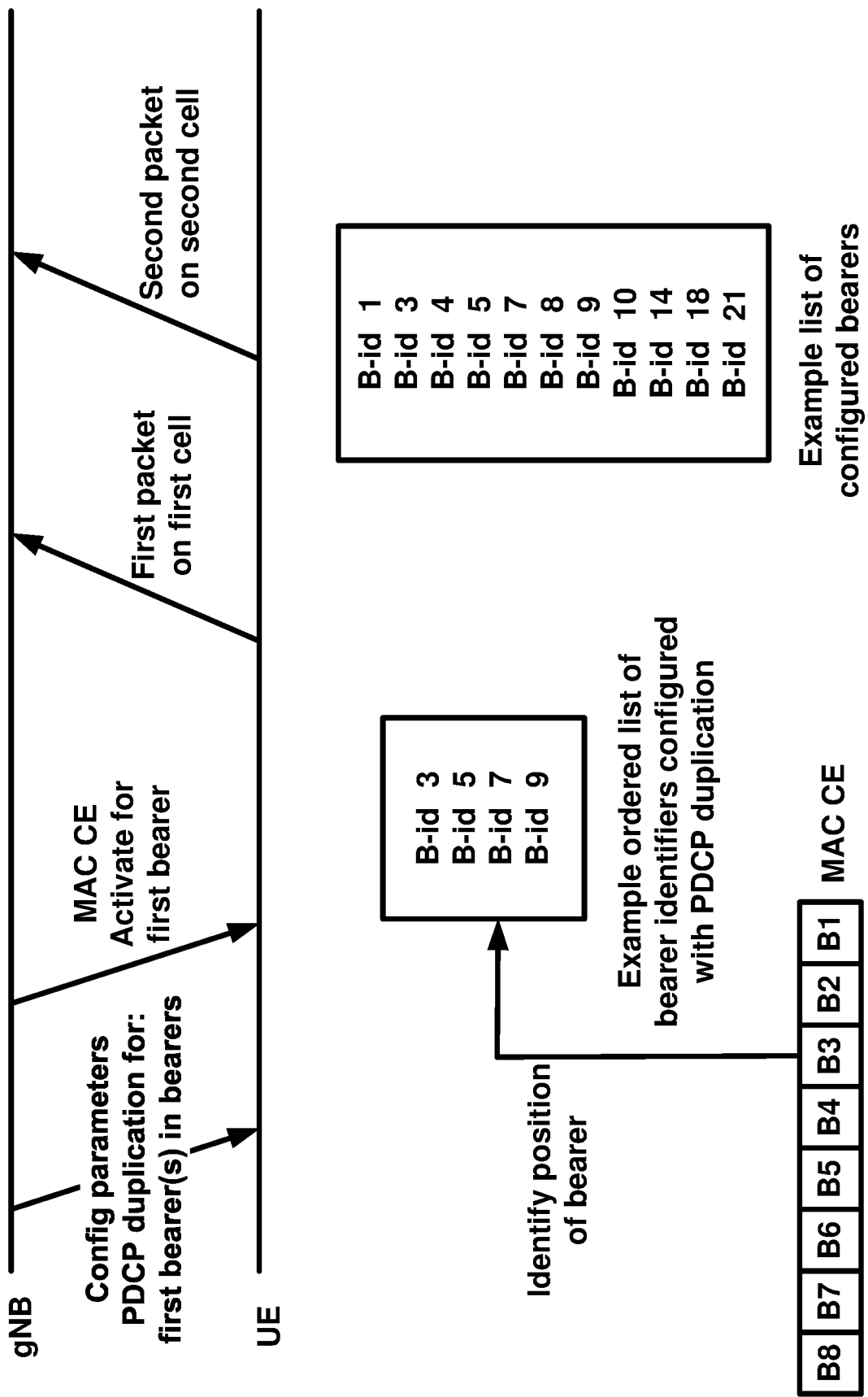
FIG. 23 is an example illustration of PDCP duplication procedure as per an aspect of an embodiment of the present invention.

An example PDCP duplication procedure and PDCP duplication MAC CE format is shown in FIG. 23. In an example, a wireless device may receive one or more messages comprising configuration parameters for a wireless device. In an example, the configuration parameters may comprise bear configurations parameters for a plurality of bearers. For example, the configuration parameters may comprise one or more bearer identifiers for one or more bearers. In an example, the plurality of bearers may comprise data radio bearers and signaling radio bearers. In an example, a bearer in the plurality of bearers may be identified with a bearer identifier. In an example, the configuration parameters may indicate that one or more first bearers in the plurality of bearers are configured with PDCP duplication. The configuration parameters may comprise PDCP duplication configuration parameters for the one or more first bearers. In an example, a bearer in the one or more first bearers may be data radio bearers. In an example, the one or more first bearers may be data radio bearers.

The wireless device may receive a control element. In an example, the control element may be a MAC control element. In an example, the control element may be multiplex with downlink data in a downlink packet/transport block. A subheader corresponding to the control element may comprise a logical channel identifier indicating that the control element is a PDCP duplication control control element, e.g., for activation or deactivation of PDCP duplication for one or more bearers.

In an example, the control element may comprise a sequence of activation bits. In an example, the sequence of activation bits may be for activation and/or deactivation of PDCP duplication for the one or more first bearers. In an example, the sequence of activation bits may comprise a first bit for a first bearer in the one or more first bearers. The packet duplication MAC CE does not include bearer identifiers. Example embodiments reduce downlink signaling overhead and leads to efficient resource utilization by implementing one bit for activation/deactivation control element.

In an example, the first bit may have a first position in the one octet/sequence of activation bits/control element. The first position of the first bit may identify a second position of first bearer identifier in an ordered list of bearer identifiers of the one or more first bearers configured with PDCP duplication. In an example, at least one message (e.g. RRC message) may configure 16 bearers and configure 6 of the 16 bearers with packet duplication and the 10 other bearers with no packet duplication. Example embodiments implement an ordered list of bearer identifiers of 6 bearer that are configured with PDCP duplication (e.g. see FIG. 23). This further reduces the size of the MAC CE and reduces downlink signaling overhead and increases spectral efficiency. Ordering the bearer identifiers of bearers configured with PDCP duplication, enables an efficient mechanism to determine the position of an activation bit corresponding to a first bearer configured with PDCP duplication and reduces the size of the MAC CE.

In an example, the ordered list of the bearer identifiers of the one or more first bearers may be an ascending ordered list of the bearer identifiers of the one or more first bearers. In an example, a first position of the first bit in the one octet/sequence of activation bits/control element may be same as the second position of the first bearer in the one or more first bearers. In an example, a first value of the first bit may indicate whether the PDCP duplication for the first bearer is activated or deactivated. In an example, the PDCP duplication for the first bearer may be activated in response to the first value of the first bit being one. In an example, the PDCP duplication for the first bearer may be deactivated in response to the first value of the first bit being zero. Example embodiments reduces the size of the MAC CE to only one octet including 8 bits. In an example, the control element may have a fixed size. In an example, the control element may have a fixed size of one octet. Example embodiments enables using a fixed size MAC CE which further reduces the MAC CE subheader size, because a fixed size MAC CE does not require a length field. This further reduces downlink signaling overhead and increases spectral efficiency. Example embodiments limits the number of bearers configured with PDCP duplication to 8 to enable implementation of a fixed one octet size for MAC CE. This limitation further increases downlink signaling overhead by enabling implementation of a fixed MAC CE that has a smaller subheader size.

In an example, the wireless device may receive a first uplink grant for a first cell and a second uplink grant for a second cell. In an example, in response to the control element indicating that the PDCP duplication is activated for the first bearer, the wireless device may transmit a first packet corresponding to the first bearer via the first cell and a duplicate of the first packet via the second cell. The one or more messages may comprise configuration parameters for the first cell and the second cell. In an example, a first RLC entity may handle packets from the first radio bearer. The wireless device may add a second RLC entity to handle duplicate packets corresponding to the first radio bearer. In an example, the first packet may correspond to the first RLC entity and the second packet may correspond to the second RLC entity. In an example, a first buffer associated with a first logical channel may comprise the first packet corresponding to the first radio bearers and a second buffer associated with a second logical channel may comprise the duplicate of the first packet. In an example, configuration parameters for the first logical channel may indicate that the first cell is a first allowed serving cell for transmission of data from the first logical channel. In an example, configuration parameters for the second logical channel may indicate that the second cell is a second allowed serving cell for transmission of data from the second logical channel.

In an example, in response to PDCP duplication being deactivated for the first bearer, the wireless device may no longer apply the logical channel restriction for the first logical channel. The wireless device may multiplex data from the first logical channel in a transport block that is transmitted via the second cell in response to the PDCP duplication being deactivate for the first bearer. In an example, the wireless device may receive a control element indicating that the PDCP duplication is deactivated for the first bear. The wireless device may no longer apply the logical channel restriction for the first logical channel and may transmit the first logical channel via the first cell or the second cell in response to the PDCP duplication being deactivated for the first bearer.

Figure 19:
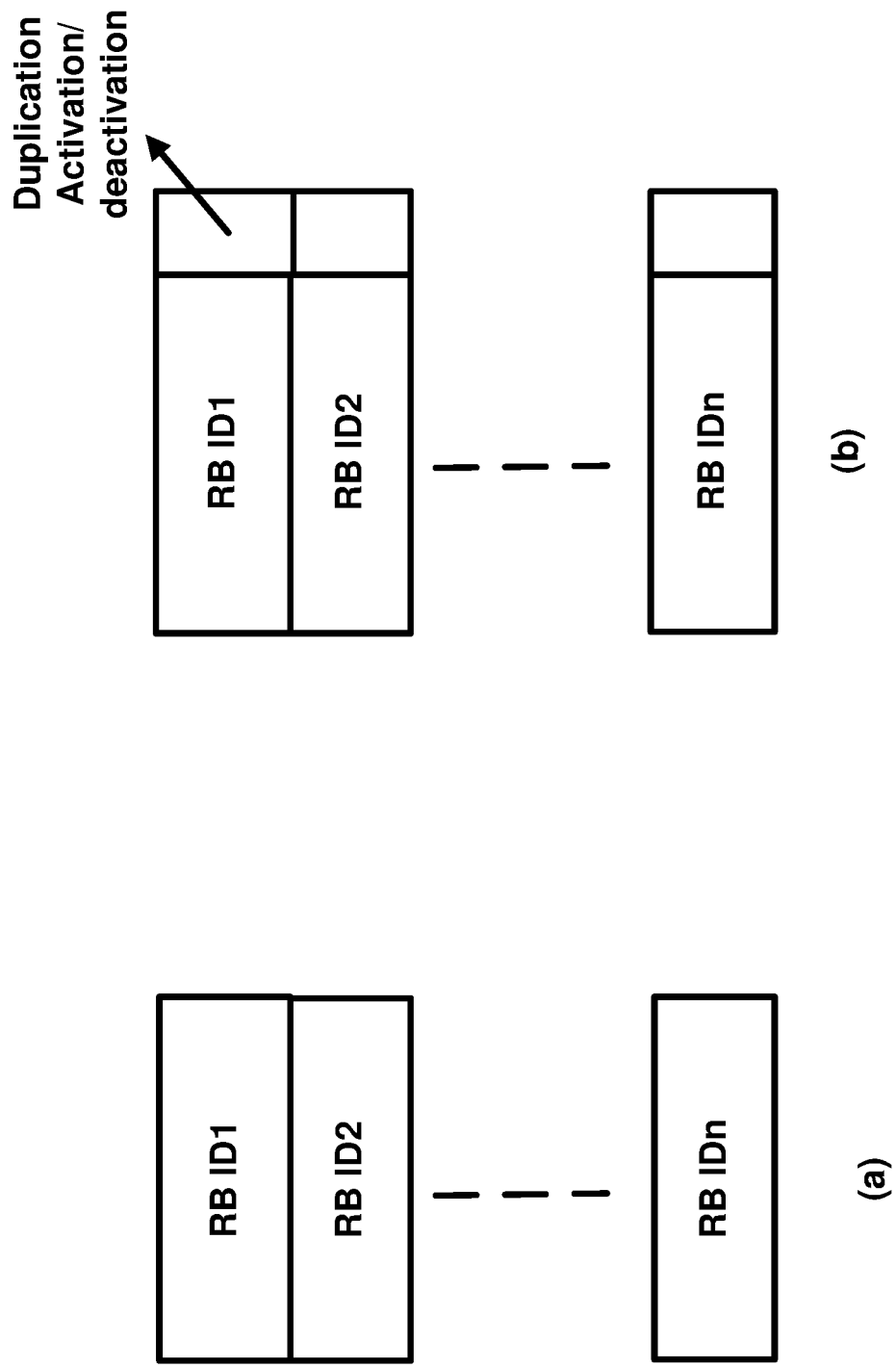
FIG. 19 is an example illustration of PDCP duplication control MAC control element (MAC CE) format as per an aspect of an embodiment of the present invention.

Example PDCP duplication control MAC CE formats are shown in FIG. 19. In an example, the MAC CE may comprise IDs corresponding to the one or more second radio bearers. The one or more second radio bearers may be a subset of one or more first radio bearers configured for PDCP duplication, e.g., by RRC. In an example, in FIG. 19(a), the radio bearers whose IDs are included in the MAC may be activated for PDCP duplication. The radio bearers that are configured for PDCP duplication (e.g., by RRC) and their IDs are not included in the MAC CE may be deactivated for PDCP duplication. In the example, in FIG. 19(b), an activation/deactivation field may correspond to a radio bearer ID. The activation/deactivation field may comprise one or more bits. The value of the one or more bits may indicate if the corresponding radio bearer is activated for PDCP duplication or PDCP duplication for the corresponding radio bearer is deactivated/stopped. For example, a value of one may indicate that PDCP duplication is activated for the corresponding radio bearer and a value of zero may indicate that the PDCP duplication for the corresponding radio bearers is deactivated/stopped. In an example, for the MAC CE format in FIG. 19(b), n (e.g., the number of radio bearer IDs in the MAC CE) may equal the number of bearers configured for PDCP duplication (e.g., by RRC).

Figure 20:
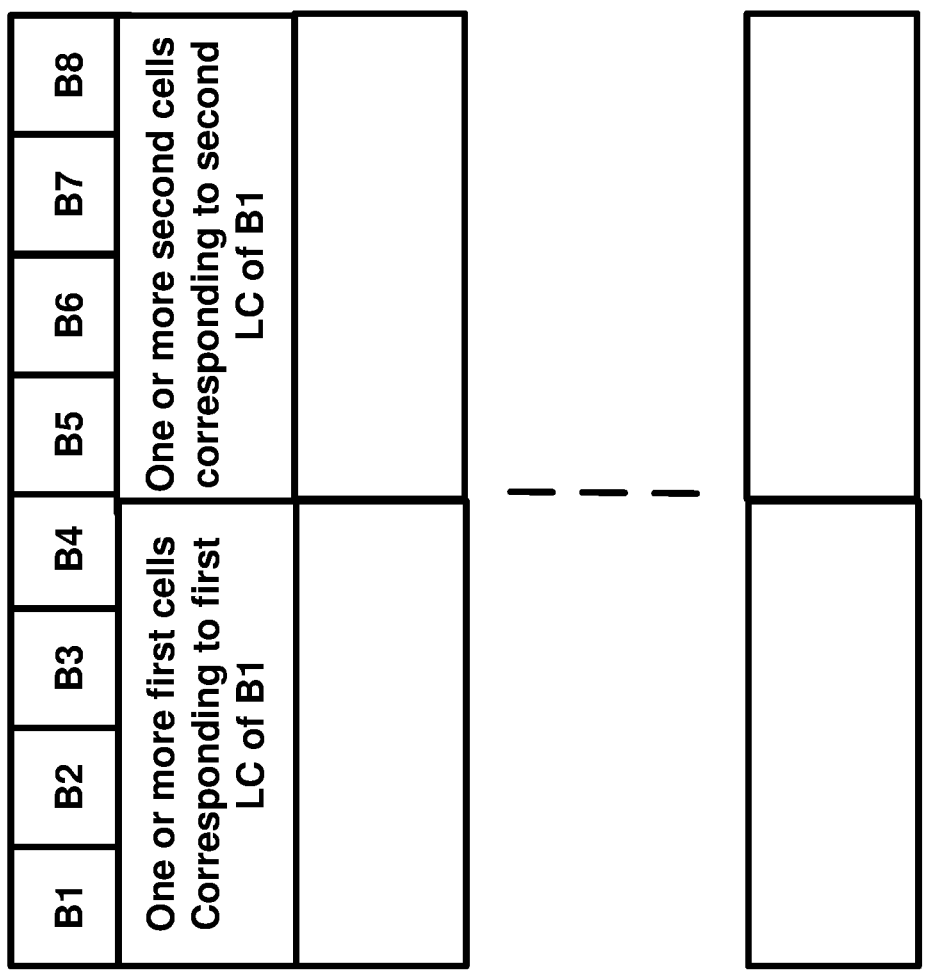
FIG. 20 is an example illustration of PDCP duplication control MAC control element (MAC CE) format as per an aspect of an embodiment of the present invention.

An example PDCP duplication control MAC CE format is shown in FIG. 20. The MAC CE may comprise a first field indicating one or more second radio bearers that are activated for PDCP duplication for the wireless device. The one or more second radio bearers may be a subset of one or more first radio bearers configured for PDCP duplication for the wireless device (e.g., by RRC). In an example shown in FIG. 20, the first field may comprise one octet. Larger sizes of the first field (e.g., larger number of octets) may be used for the first field if the number of radio bearers configured and/or activated for PDCP duplication is larger (e.g., larger than 8).

In an example, the MAC CE for PDCP duplication control may comprise a second plurality of fields. The number of the second plurality of fields may be equal to or larger than the number of activated and/or configured radio bearers for PDCP duplication and/or other numbers. In an example, for a radio bearer indicated to be deactivated/stopped for PDCP duplication, there may not be a corresponding field in the second plurality of fields. One or more fields in the plurality of fields may correspond to a radio bearer (e.g., indicated to be activated for PDCP duplication) in the first field. In an example, a field in the one or more fields in the plurality of fields corresponding to a first radio bearer in the first field (e.g., indicated to be activated for PDCP duplication) may indicate one or more first cells/carriers and one or more second cells/carriers. The one or more first cells/carriers may be used for mapping a first logical channel corresponding to the first radio bearer and the one or more second logical channel may be used for mapping a second logical channel (e.g., duplicate logical channel) corresponding to the first radio bearer. In an example, buffers associated to the first logical channel may comprise data corresponding to PDCP PDUs corresponding to the first radio bearer. In an example, the buffers associated to the second logical corresponding to the first radio bearer may comprise data corresponding to duplicate PDCP PDUs corresponding to the first radio bearer. In an example, a field in the one or more fields in the plurality of fields corresponding to a first radio bearer in the first field (e.g., indicated to be activated for PDCP duplication) may indicate other parameters related to PDCP duplication for the first radio bearer (e.g., the first logical channel, the second logical channel, etc.).

Figure 21:
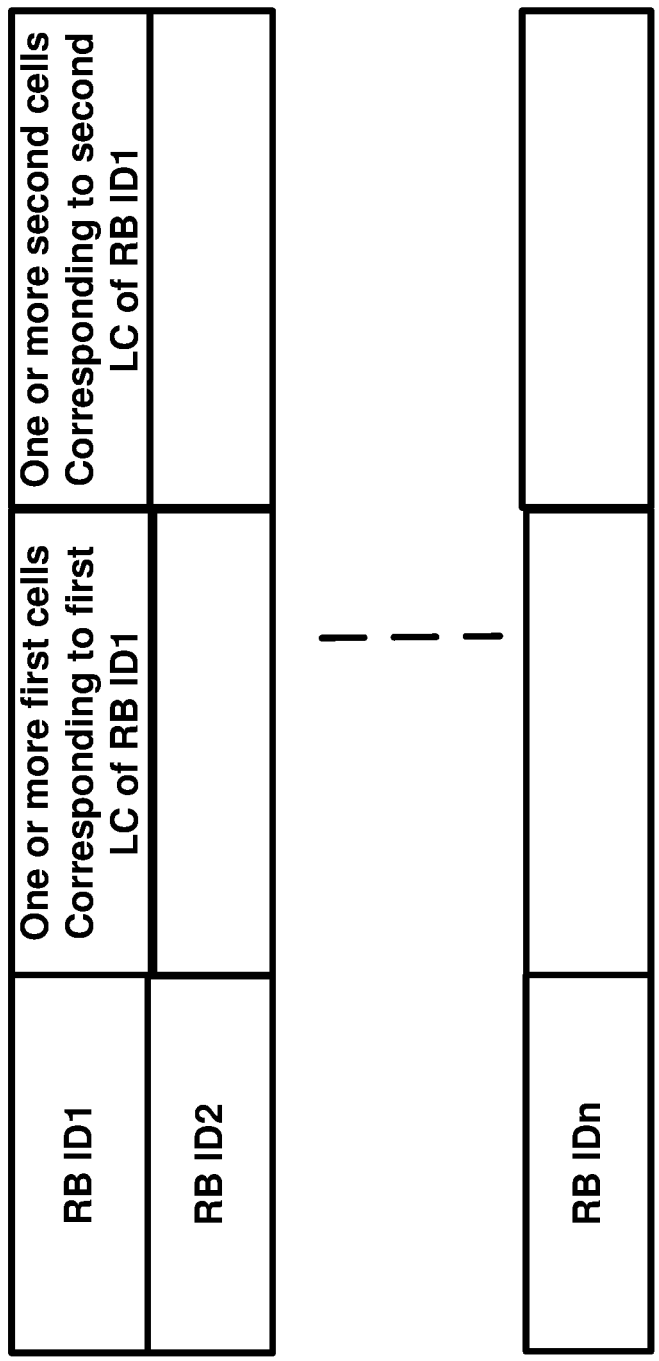
FIG. 21 is an example illustration of PDCP duplication control MAC control element (MAC CE) format as per an aspect of an embodiment of the present invention.

An example PDCP duplication control MAC CE format is shown in FIG. 21. In an example, the MAC CE may comprise a first plurality of fields comprising IDs corresponding to one or more second radio bearers. The one or more second radio bearers may be a subset of one or more first radio bearers configured for PDCP duplication, e.g., by RRC. The radio bearers whose IDs are included in the MAC CE may be activated for PDCP duplication. The radio bearers that are configured for PDCP duplication (e.g., by RRC) and their IDs are not included in the MAC CE may be deactivated for PDCP duplication. The MAC CE may comprise a second plurality of fields. One or more fields in the second plurality of fields may correspond to radio bearer ID. A field in the one or more fields corresponding to the radio bearer ID may indicate one or more first cells/carriers and one or more second cells/carriers. The one or more first cells/carriers may be used for mapping a first logical channel corresponding to the radio bearer and the one or more second logical channel may be used for mapping a second logical channel (e.g., duplicate logical channel) corresponding to the radio bearer. In an example, buffers associated to the first logical channel may comprise data corresponding to PDCP PDUs corresponding to the radio bearer. In an example, the buffers associated to the second logical corresponding to the radio bearer may comprise data corresponding to duplicate PDCP PDUs corresponding to the radio bearer. In an example, a field in the one or more fields in the plurality of fields corresponding to the radio bearer may indicate other parameters related to PDCP duplication for the radio bearer (e.g., the first logical channel, the second logical channel, etc.).

Figure 22:
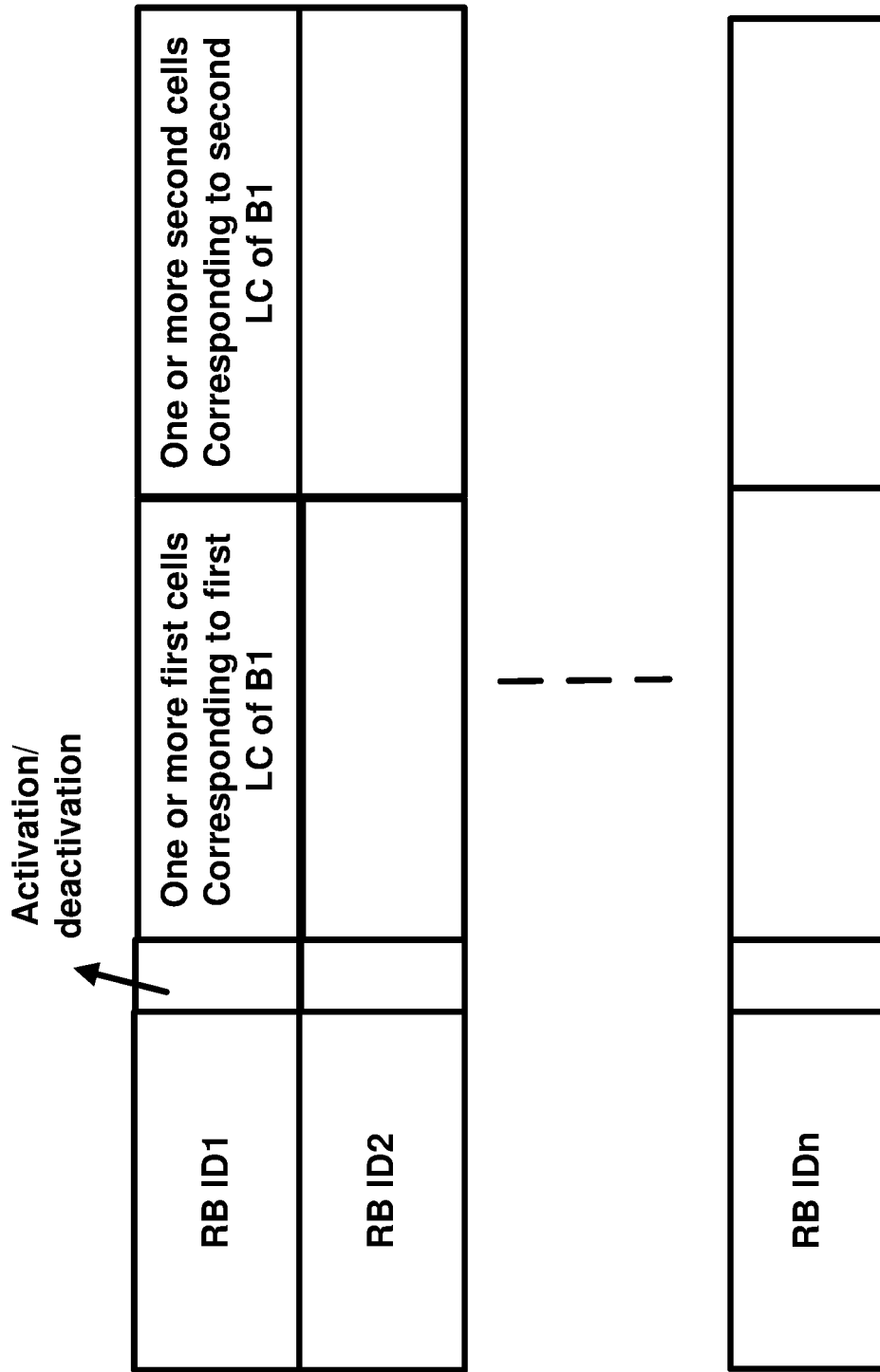
FIG. 22 is an example illustration of PDCP duplication procedure and PDCP duplication control MAC control element (MAC CE) format as per an aspect of an embodiment of the present invention.

An example PDCP duplication control MAC CE format is shown in FIG. 22. The MAC CE may comprise a first plurality of fields comprising radio bearer IDs for a plurality of radio bearers. In an example, the number of the first plurality of fields may be equal to the number of radio bearers configured for PDCP duplication (e.g., by RRC). In an example, the MAC CE may comprise a second plurality of fields. A field in the second plurality of fields may indicate whether PDCP duplication is activated/started and/or deactivated/stopped for a radio bearer corresponding to the field. In an example, the MAC CE may comprise a third plurality of fields. In an example, a radio bearer ID may correspond to one or more fields in the third plurality of fields. In an example, a radio bearer ID whose corresponding radio bearer is activated for PDCP duplication (e.g., as indicated by a corresponding field in the second plurality of fields) may correspond to one or more fields in the third plurality of fields. In an example, a radio bearer ID whose corresponding radio bearer is deactivated/stopped for PDCP duplication (e.g., as indicated by a corresponding field in the second plurality of fields) may not correspond to a field in the third plurality of fields. In an example, a field in the one or more fields may indicate one or more first cells/carriers and one or more second cells/carriers. The one or more first cells/carriers may be used for mapping a first logical channel corresponding to the radio bearer and the one or more second logical channel may be used for mapping a second logical channel (e.g., duplicate logical channel) corresponding to the radio bearer. In an example, buffers associated to the first logical channel may comprise data corresponding to PDCP PDUs corresponding to the radio bearer. In an example, the buffers associated to the second logical corresponding to the radio bearer may comprise data corresponding to duplicate PDCP PDUs corresponding to the radio bearer. In an example, a field in the one or more fields in the third plurality of fields corresponding to the radio bearer may indicate other parameters related to PDCP duplication for the radio bearer (e.g., the first logical channel, the second logical channel, etc.).

In an example embodiment, a wireless device may receive one or more messages comprising configuration parameters for a plurality of cells. In an example, the one or more messages may comprise one or more RRC messages. In an example, the configuration parameters may comprise parameters for one or more logical channels. In an example, the configuration parameters may comprise parameters for one or more radio bearers. In an example, the configuration parameters may indicate whether PDCP duplication is configured for one or more first radio bearers. In an example, the base station may activate/start and/or deactivate/stop PDCP duplication for one or more second radio bearers in the one or more first radio bearers. The base station may activate/start and/or deactivate/stop PDCP duplication for the one or more second radio bearers in the one or more first radio bearers using a PDCP duplication control MAC CE. In an example, a plurality of sets of semi-persistent scheduling (SPS) grants and/or grant-free resources may be configured in response to PDCP duplication being configured and/or activated/started for a radio bearer in a wireless device. In an example, a first set of SPS grants and/or grant-free resources may be configured for transmission of data in a first logical channel corresponding to a radio bearer configured and/or activated for PDCP duplication. A second set of SPS grants and/or grant-free resources may be configured for transmission of data in a second logical channel corresponding to a radio bearer configured and/or activated for PDCP duplication. In an example, the buffers associated with the first logical channel may comprise data corresponding to PDCP PDUs corresponding to the radio bearer. The buffers associated with the second logical channel may comprise data corresponding to duplicate PDCP PDUs corresponding to the radio bearer.

In an example embodiment, the wireless device may receive a PDCP duplication control MAC CE indicating PDCP duplication activation for a first radio bearer. The reception of the PDCP duplication control MAC CE may implicitly activate the first set of SPS grants and/or grant-free resources, and/or may implicitly activate the second set of SPS grants and/or grant-free resources. In an example, the uplink resources and/or some other transmission parameters (e.g., HARQ parameters e.g., HARQ ID, MCS, etc.) for the first set of SPS grants and/or grant-free resources and/or the second set of SPS grants and/or grant-free resources may be configured by RRC and/or PDCCH and/or may be known by the wireless device.

In an example embodiment, the PDCP duplication control MAC CE indicating PDCP duplication activation for a first radio bearer may comprise one or more fields indicating whether the first set of SPS grants and/or grant-free resources, and/or the second set of SPS grants and/or grant-free resources may be activated. The one or more fields indicating whether the first set of SPS grants and/or grant-free resources, and/or the second set of SPS grants and/or grant-free resources may be activated may be incorporated in the example MAC CE formats illustrated in FIG. 17-FIG. 23. In an example, the uplink resources and/or other transmission parameters (e.g., HARQ parameters, etc.) for the first set of SPS grants and/or grant-free resources and/or the second set of SPS grants and/or grant-free resources may be configured by RRC and/or may be known by the wireless device. In an example, a first portion of transmission parameters for the first set of SPS grants and/or grant-free resources and/or the second set of SPS grants and/or grant-free resources may be configured by RRC and a second portion of transmission parameters for the first set of SPS grants and/or grant-free resources and/or the second set of SPS grants and/or grant-free resources may be indicated by the PDCP duplication control MAC CE and/or may be known by the wireless device. In an example, transmission parameters for the first set of SPS grants and/or grant-free resources and/or the second set of SPS grants and/or grant-free resources may be indicated to the wireless device.

In an example embodiment, the wireless device may be configured with a first set of SPS grants and/or grant-free resources for a first logical channel corresponding to a first radio bearer configured and/or activated with PDCP duplication and/or a second set of SPS grants and/or grant-free resources for a second logical channel (e.g., duplicate logical channel) corresponding to the first radio bearer. The wireless device may receive a PDCP duplication control MAC CE indicating PDCP duplication deactivation/stopping for the first radio bearer. In an example, the reception of PDCP duplication control MAC CE indicating stopping and/or deactivating PDCP duplication for the first radio bearer may implicitly release the first set of SPS grants and/or grant-free resources, and/or may implicitly release the second set of SPS grants and/or grant-free resources.

In an example embodiment, the wireless device may be configured with a first set of SPS grants and/or grant-free resources for a first logical channel corresponding to a first radio bearer configured and/or activated with PDCP duplication and/or a second set of SPS grants and/or grant-free resources for a second logical channel (e.g., duplicate logical channel) corresponding to the first radio bearer. The wireless device may receive a PDCP duplication control MAC CE indicating PDCP duplication deactivation/stopping for the first radio bearer. In an example, the PDCP duplication control MAC CE may comprise one or more fields indicating whether the first set of SPS grants and/or grant-free resources, and/or the second set of SPS grants and/or grant-free resources may be released. The one or more fields indicating whether the first set of SPS grants and/or grant-free resources, and/or the second set of SPS grants and/or grant-free resources may be released may be incorporated in the example MAC CE formats illustrated in FIG. 17-FIG. 23.

In an example embodiment, the wireless device may be configured with a first set of SPS grants and/or grant-free resources for a first logical channel corresponding to a first radio bearer configured and/or activated with PDCP duplication and/or a second set of SPS grants and/or grant-free resources for a second logical channel (e.g., duplicate logical channel) corresponding to the first radio bearer. In an example, if buffer associated with the first logical channel is emptied, the wireless device may flush the buffers associated with the second logical channel. The wireless device may not use the grants for the second logical channel until data arrives in the first and second logical channel. The wireless device may use the grants for logical channels other than the first logical channel and the second logical in the meantime if needed, e.g., in response to the first logical channel and the second logical channel being empty and/or in response to data not arriving for the first logical channel and the second logical channel, until data arrives in the first logical channel and the second logical channel.

In an example embodiment, the wireless device may be configured with a first set of SPS grants and/or grant-free resources for a first logical channel corresponding to a first radio bearer configured and/or activated with PDCP duplication and/or a second set of SPS grants and/or grant-free resources for a second logical channel (e.g., duplicate logical channel) corresponding to the first radio bearer. In an example, the configuration parameters for the second set of SPS grants and/or grant-free resources may be derived implicitly from the configuration parameters of the first set of SPS grants and/or grant-free resources. In an example, the base station may activate the first set of SPS grants and/or grant-free resources and the second set of SPS grants and/or grant-free resources using a first SPS activation PDCCH. In an example, the base station may activate simultaneously the first set of SPS grants and/or grant-free resources and the second set of SPS grants and/or grant-free resources using a first SPS activation PDCCH. In an example, the base station may release/deactivate the first set of SPS grants and/or grant-free resources and the second set of SPS grants and/or grant-free resources using a first SPS release/deactivation PDCCH. In an example, the base station may release/deactivate simultaneously the first set of SPS grants and/or grant-free resources and the second set of SPS grants and/or grant-free resources using a first SPS release/deactivation PDCCH. In an example, the SPS activation and/or the SPS release/deactivation PDCCH may comprise a bit-map indicating for which of the first logical channel and/or the second logical channel the set of SPS grants and/or grant-free resources may be activated and/or released.

In an example embodiment, the wireless device may be configured with a first set of SPS grants and/or grant-free resources for a first logical channel corresponding to a first radio bearer configured and/or activated with PDCP duplication and/or a second set of SPS grants and/or grant-free resources for a second logical channel (e.g., duplicate logical channel) corresponding to the first radio bearer. In an example, the configuration parameters for the second set of SPS grants and/or grant-free resources may be derived implicitly from the configuration parameters of the first set of SPS grants and/or grant-free resources. In an example, the transmission parameters (e.g., uplink resources, HARQ ID, grant TTI, periodicity, MCS, etc.) for the second set of SPS grants and/or grant-free resources may be implicitly derived from the transmission parameters corresponding to the first set of SPS grants and/or grant-free resources. In an example, the starting TTI for the second set of SPS grants and/or grant-free resources may be a shift to the first set of SPS grants and/or grant-free resources. In an example, the shift may be indicated to the wireless device (e.g., using RRC and/or MAC CE and/or PDCCH). In an example, periodicity of the second set of SPS grants and/or grant-free resources may be same as periodicity of the first set of SPS grants and/or grant-free resources. In an example, HARQ ID for a second SPS grant and/or grant free resource in the second set of SPS grants and/or grant-free resources may be a shift to a first SPS grant and/or grant-free resource. In an example, the shift may be indicated to the wireless device e.g., using RRC and/or MAC CE and/or PDCCH).

A packet corresponding to a radio bearer configured with PDCP duplication and its corresponding duplicate packet are transmitted via different carriers. Periodic resource allocation may be used to transmit packets corresponding to a radio bearer configured with PDCP duplication. Using legacy procedures, the wireless device needs to receive two separate activation DCI for two periodic resource allocation activations on two different cells. The legacy procedures increase downlink control signaling. There is a need to enhance the efficiency of downlink control signaling for activation of periodic resource allocation when used for transmission of packets from bearers configured with PDCP duplication. Example embodiments enhance the downlink control signaling efficiency for activation of periodic resource allocation when used for transmission of packets of bearers configured with PDCP duplication.

Figure 24:
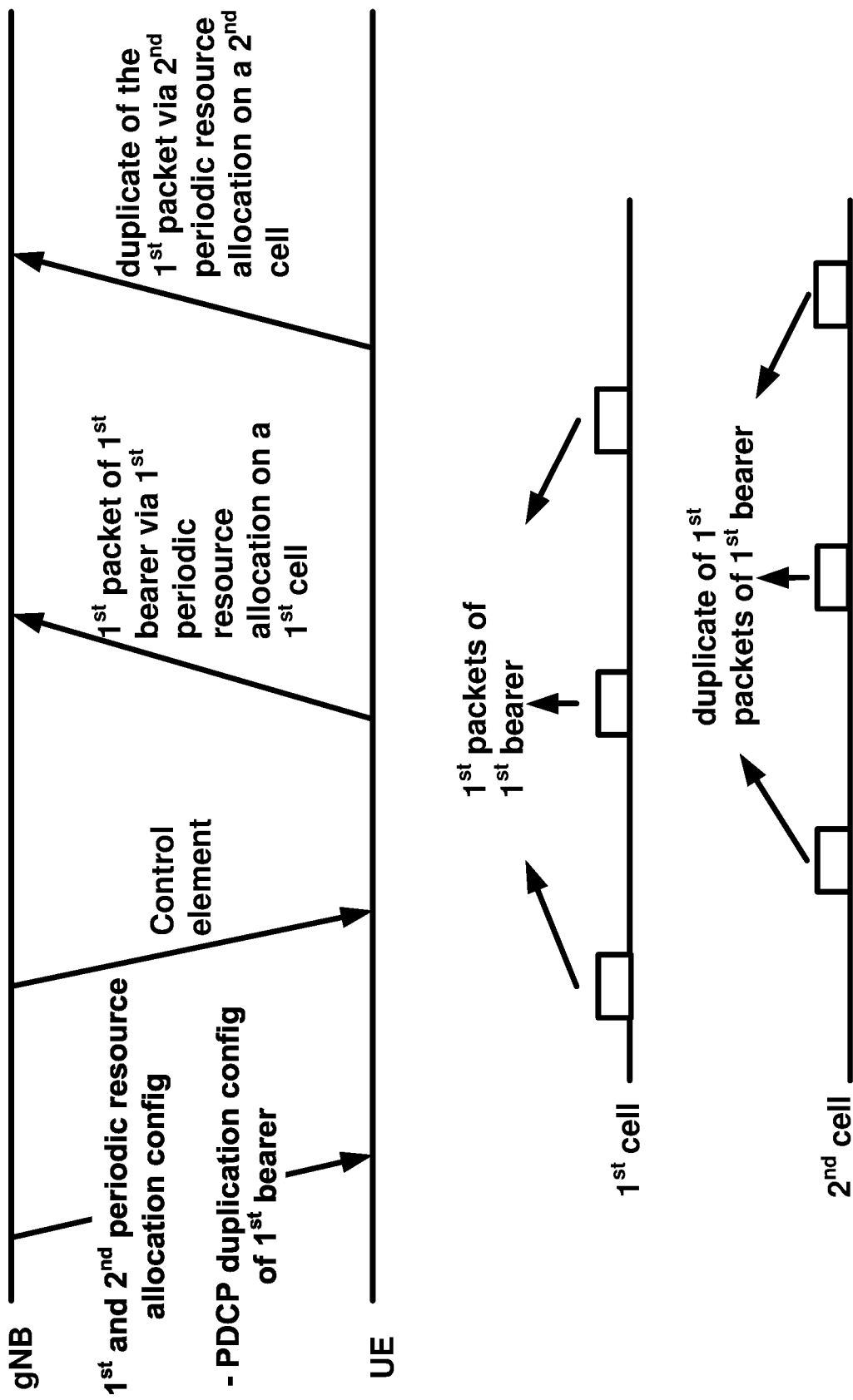
FIG. 24 is an example illustration of PDCP duplication procedure as per an aspect of an embodiment of the present invention.

An example embodiment is shown in FIG. 24. In an example, a wireless device may receive one or more messages comprising configuration parameters. In an example, the one or more messages may comprise RRC messages. The one or more messages may comprise first configuration parameters for a first periodic resource allocation and a second periodic resource allocation. The first periodic resource allocation may comprise a first periodicity and one or more first parameters for determining resources associated with the first periodic resource allocation. The first periodic resource allocation may comprise a second periodicity and one or more second parameters for determining resources associated with the second periodic resource allocation. The one or more messages may comprise second configuration parameters for PDCP packet duplication of a first bearer in a plurality of bearers. In an example, the one or more messages may comprise configuration parameters for the plurality of bearers. The wireless device may receive a control element. In an example, the control element may be a MAC control element. In an example, the control element may indicate activation of the PDCP duplication for the first bearer.

The wireless device may receive a DCI indicating activation of the first periodic resource allocation. In an example, the configuration parameters for the first periodic resource allocation may comprise a first radio network temporary identifier. The DCI may be associated with the first radio network temporary identifier. In an example, the wireless device may validate the DCI as an activating DCI for the first periodic resource allocation. In response to receiving the DCI, the wireless device may activate a first plurality of resources corresponding to the first periodic resource allocation on a first cell and a second plurality of resources corresponding to the second periodic resource allocation on a second cell. In an example, the wireless device may transmit first data packets of the first radio bearer via the first plurality of resources on the first cell. The wireless device may transmit duplicate of first data packets via the second plurality of resources of the second cell.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

FIG. 27 is an example flow diagram as per an aspect of an embodiment of the present disclosure. At 2710, a wireless device may receive one or more messages comprising configuration parameters indicating that one or more first bearers in a plurality of bearers are configured with packet data convergence protocol (PDCP) duplication. Each bearer in the plurality of bearers may be identified by a bearer identifier. At 2720, a control element of a fixed size of one octet may be received. The control element may comprise a sequence of activation bits comprising a first activation bit for a first bearer in the one or more first bearers. A first position of the first activation bit in the one octet may identify a second position of a first bearer identifier in an ordered list of bearer identifiers of the one or more first bearers configured with the PDCP duplication. A first value of the first activation bit may indicate whether the PDCP duplication for the first bearer is activated or deactivated. At 2730, a first packet may be transmitted in response to the control element indicating that the PDCP duplication is activated for the first bearer. The first packet may correspond to the first bearer via a first cell and a duplicate of the first packet via a second cell.

According to an embodiment, a first buffer associated with a first logical channel may comprise the first packet; and a second buffer associated with a second logical channel may comprise the duplicate of the first packet. According to an embodiment, the one or messages may indicate that: the first cell is a first allowed serving cell for transmission of data from the first logical channel; and the second cell is a second allowed serving cell for transmission of data from the second logical channel. According to an embodiment, the one or messages may indicate that: a first plurality of cells are first allowed serving cells for transmission of data from the first logical channel. The first plurality of cells may comprise the first cell. According to an embodiment, a second plurality of cells may be second allowed serving cells for transmission of data from the second logical channel. The second plurality of cells may comprise the second cell.

According to an embodiment, the first packet may correspond to a first radio link control (RLC) entity and a first logical channel; and the duplicate of the first packet may correspond to a second RLC entity and a second logical channel. According to an embodiment, a first uplink grant for transmission of the first packet may be received via the first cell; and a second uplink grant for transmission of the duplicate of the first packet may be received via the second cell.

According to an embodiment, the ordered list may be an ascending ordered list. According to an embodiment, the ordered list may be a descending ordered list. According to an embodiment, the first position may be same as the second position. According to an embodiment, the control element may indicate: activation of the PDCP duplication for the first bearer in response to the first value being one; and deactivation of the PDCP duplication for the first bearer in response to the first value being zero. According to an embodiment, a bearer in the plurality of bearers may be a data radio bearer. According to an embodiment, the control element may be associated with a logical channel identifier indicating that the control element is for PDCP duplication activation/deactivation of one or more bearers.

According to an embodiment, a second control element indicating that the PDCP duplication is deactivated for the first bearer may be received. According to an embodiment, an uplink grant for the second cell may be received. According to an embodiment, a packet associated with the first bearer based on the uplink grant may be transmitted.

Figure 28:
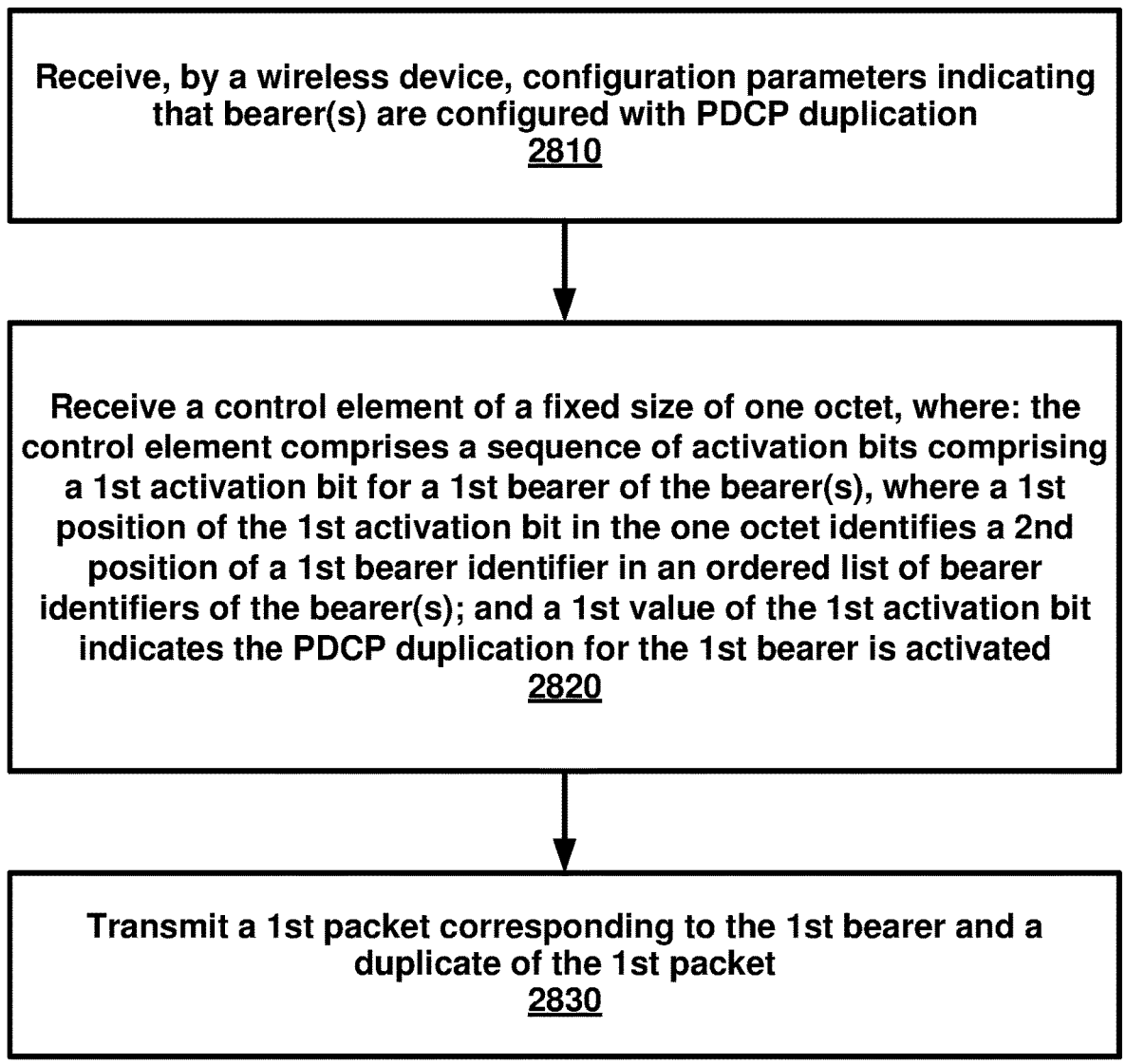
FIG. 28 is a flow diagram of an aspect of an embodiment of the present disclosure.

FIG. 28 is an example flow diagram as per an aspect of an embodiment of the present disclosure. At 2810, a wireless device may receive configuration parameters indicating that one or more bearers are configured with packet data convergence protocol (PDCP) duplication. At 2820, a control element of a fixed size of one octet may be received. The control element may comprise a sequence of activation bits comprising a first activation bit for a first bearer of the one or more bearers. A first position of the first activation bit in the one octet may identify a second position of a first bearer identifier in an ordered list of bearer identifiers of the one or more bearers. A first value of the first activation bit may indicate the PDCP duplication for the first bearer is activated. At 2830, a first packet corresponding to the first bearer and a duplicate of the first packet may be transmitted. According to an embodiment, each bearer in the one or more bearers may be identified by a bearer identifier.

Figure 29:
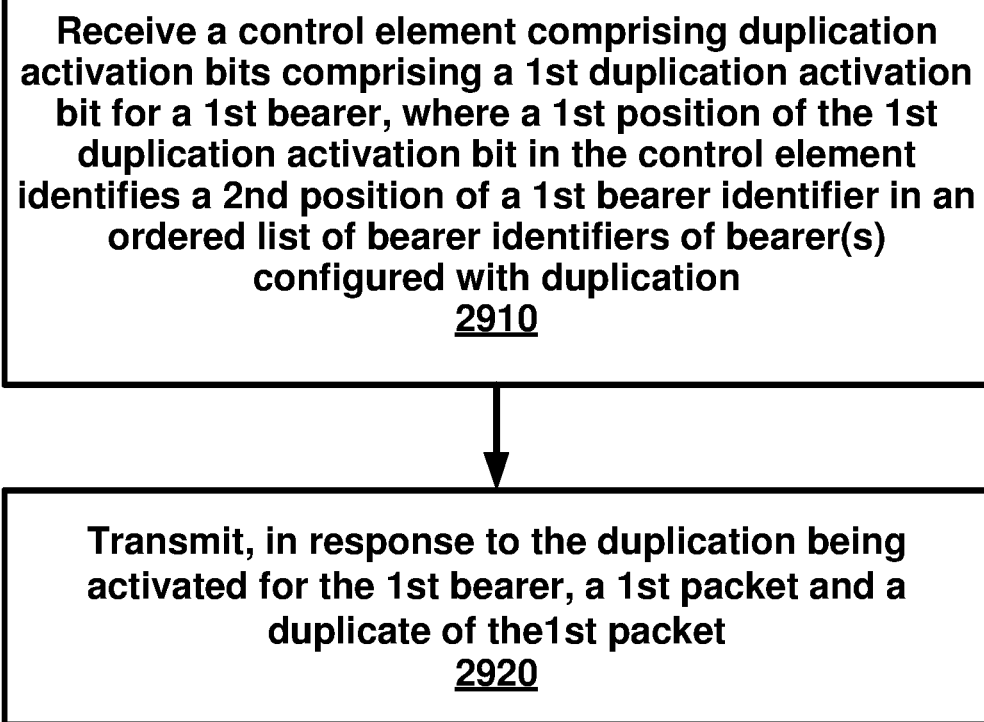
FIG. 29 is a flow diagram of an aspect of an embodiment of the present disclosure.

FIG. 29 is an example flow diagram as per an aspect of an embodiment of the present disclosure. At 2910, a control element comprising duplication activation bits may be received. The duplication activation bits may comprise a first duplication activation bit for a first bearer. A first position of the first duplication activation bit in the control element may identify a second position of a first bearer identifier in an ordered list of bearer identifiers of one or more bearers configured with duplication. In response to the duplication being activated for the first bearer, a first packet and a duplicate of the first packet may be transmitted at 2920.

According to an embodiment, one or more messages may be received. The one or more messages may comprise configuration parameters indicating that one or more bearers comprising the first bearer are configured with the duplication. According to an embodiment, the duplication may comprise packet data convergence protocol duplication. According to an embodiment, each bearer in the one or more bearers may be identified by a bearer identifier. According to an embodiment, a first value of the first duplication activation bit may indicate whether the duplication for the first bearer is activated or deactivated. According to an embodiment, the first packet may be transmitted via a first cell and the duplicate of the first packet may be transmitted via a second cell.

FIG. 30 is an example flow diagram as per an aspect of an embodiment of the present disclosure. At 3010, a base station may transmit one or more messages. The one or more messages may comprise configuration parameters indicating that one or more first bearers in a plurality of bearers are configured with packet data convergence protocol (PDCP) duplication. Each bearer in the plurality of bearers may be identified by a bearer identifier. At 3020, a control element of a fixed size of one octet may be transmitted. The control element may comprise a sequence of activation bits comprising a first activation bit for a first bearer in the one or more first bearers. A first position of the first activation bit in the one octet may identify a second position of a first bearer identifier in an ordered list of bearer identifiers of the one or more first bearers configured with the PDCP duplication. A first value of the first activation bit may indicate whether the PDCP duplication for the first bearer is activated or deactivated. At 3030, in response to the control element indicating that the PDCP duplication is activated for the first bearer, a first packet corresponding to the first bearer may be received via a first cell and a duplicate of the first packet may be received via a second cell.

According to an embodiment, a first buffer may be associated with a first logical channel comprises the first packet. According to an embodiment, a second buffer may be associated with a second logical channel comprises the duplicate of the first packet. According to an embodiment, the one or messages may indicate that: the first cell is a first allowed serving cell for transmission of data from the first logical channel; and the second cell is a second allowed serving cell for transmission of data from the second logical channel. According to an embodiment, the one or messages may indicate that a first plurality of cells are first allowed serving cells for transmission of data from the first logical channel. The first plurality of cells may comprise the first cell. According to an embodiment, the one or messages may indicate that a second plurality of cells are second allowed serving cells for transmission of data from the second logical channel. The second plurality of cells may comprise the second cell.

According to an embodiment, the first packet may correspond to a first radio link control (RLC) entity and a first logical channel; and the duplicate of the first packet may correspond to a second RLC entity and a second logical channel. According to an embodiment, a first uplink grant for transmission of the first packet may be transmitted via the first cell. According to an embodiment, a second uplink grant for transmission of the duplicate of the first packet may be transmitted via the second cell. According to an embodiment, the ordered list may be an ascending ordered list. According to an embodiment, the ordered list may be a descending ordered list. According to an embodiment, the first position may be same as the second position. According to an embodiment, the control element may indicate: activation of the PDCP duplication for the first bearer in response to the first value being one; and deactivation of the PDCP duplication for the first bearer in response to the first value being zero.

According to an embodiment, a bearer in the plurality of bearers may be a data radio bearer. According to an embodiment, the control element may be associated with a logical channel identifier indicating that the control element is for PDCP duplication activation/deactivation of one or more bearers. According to an embodiment, a second control element indicating that the PDCP duplication is deactivated for the first bearer may be transmitted. According to an embodiment, an uplink grant for the second cell may be transmitted. According to an embodiment, a packet associated with the first bearer based on the uplink grant may be transmitted.

Figure 31:
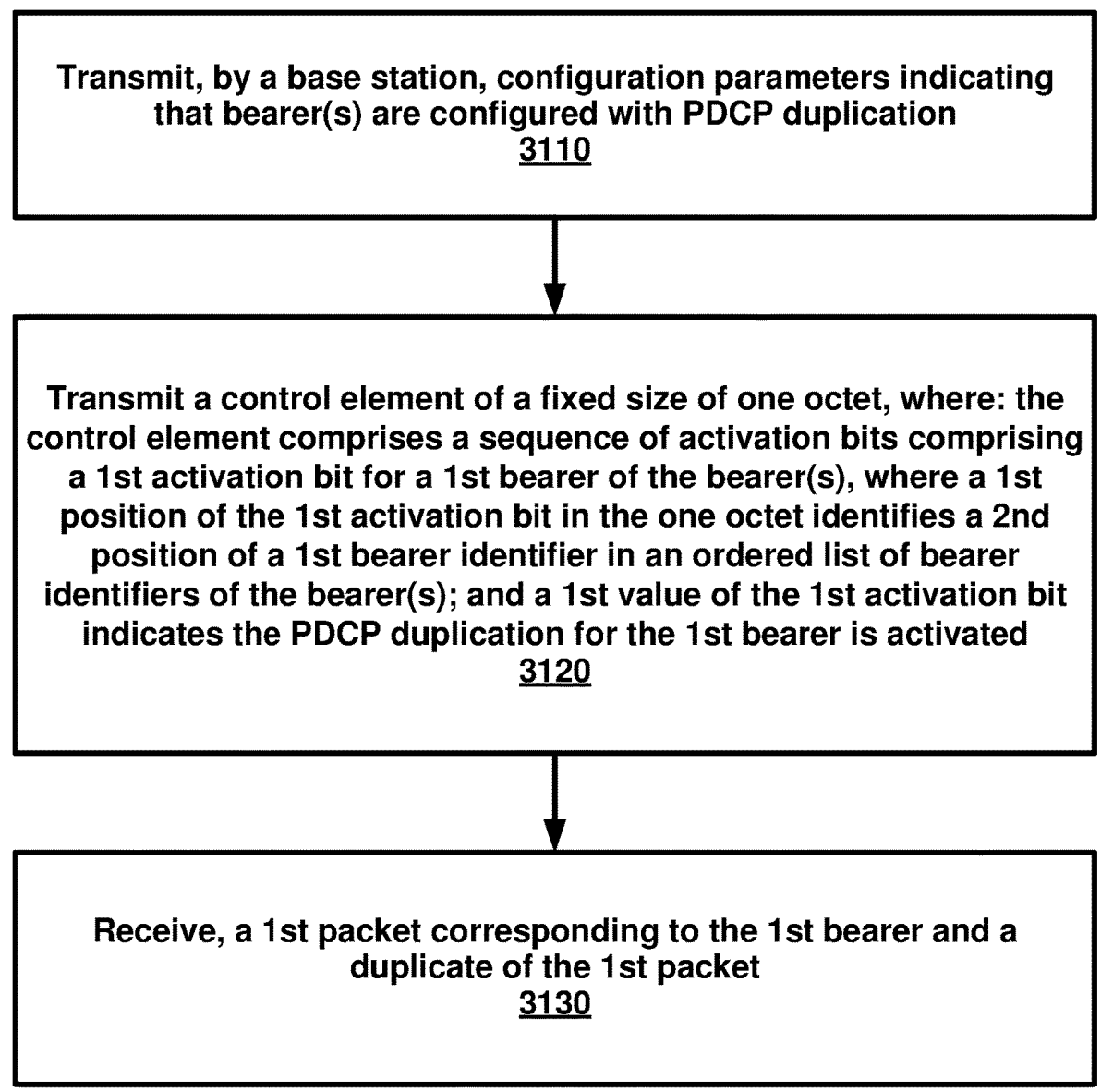
FIG. 31 is a flow diagram of an aspect of an embodiment of the present disclosure.

FIG. 31 is an example flow diagram as per an aspect of an embodiment of the present disclosure. At 3110, a base station may transmit configuration parameters. The configuration parameters may indicate that one or more bearers are configured with packet data convergence protocol (PDCP) duplication. At 3120, a control element of a fixed size of one octet may be transmitted. The control element may comprise a sequence of activation bits comprising a first activation bit for a first bearer of the one or more bearers. A first position of the first activation bit in the one octet may identify a second position of a first bearer identifier in an ordered list of bearer identifiers of the one or more bearers. A first value of the first activation bit may indicate the PDCP duplication for the first bearer is activated. A first packet may be received at 3130. The first packet may correspond to the first bearer and a duplicate of the first packet. According to an embodiment, each bearer in the one or more bearers may be identified by a bearer identifier.

FIG. 32 is an example flow diagram as per an aspect of an embodiment of the present disclosure. A control element may be transmitted at 3210. The control element may comprise duplication activation bits. The duplication activation bits may comprise a first duplication activation bit for a first bearer. A first position of the first duplication activation bit in the control element may identify a second position of a first bearer identifier in an ordered list of bearer identifiers of one or more bearers configured with duplication. At 3220, a first packet and a duplicate of the first packet may be received in response to the duplication being activated for the first bearer.

According to an embodiment, one or more messages may be transmitted. The one or more messages may comprise configuration parameters indicating that the one or more bearers comprising the first bearer are configured with duplication. According to an embodiment, the duplication may comprise packet data convergence protocol duplication. According to an embodiment, each bearer in the one or more bearers may be identified by a bearer identifier. According to an embodiment, a first value of the first duplication activation bit may indicate whether the duplication for the first bearer is activated or deactivated. According to an embodiment, the first packet may be transmitted via a first cell and the duplicate of the first packet may be transmitted via a second cell.

FIG. 33 is an example flow diagram as per an aspect of an embodiment of the present disclosure. At 3310, a wireless device may receive one or more messages. The one or more messages may comprise: a parameter indicating that uplink duplication may be configured for a bearer corresponding to a first logical channel and a second logical channel; first mapping restrictions of the first logical channel to at least one first cell; and second mapping restrictions of the second logical channel to at least one second cell. At 3320, a control element indicating activation or deactivation of duplication for the bearer may be received. If the control element indicates activation of the duplication (at 3330), the first mapping restrictions may be applied to the first logical channel and the second mapping restrictions may be applied to the second logical channel at 3340. If the control element indicates deactivation of the duplication (at 3350), the first mapping restrictions may be lifted from the first logical channel and the second mapping restrictions may be lifted from the second logical channel at 3360.

According to an embodiment, a first buffer associated with the first logical channel may comprise a first packet corresponding to the bearer; and a second buffer associated with the second logical channel may comprise a duplicate of the first packet. According to an embodiment, the first logical channel may correspond to a first radio link control (RLC) entity; and the second logical channel may correspond to a second RLC entity.

According to an embodiment, the one or messages may comprise first configuration parameters of the first logical channel and second configuration parameters of the second logical channel. According to an embodiment, the first configuration parameters may indicate the first mapping restrictions. According to an embodiment, the second configuration parameters may indicate the second mapping restrictions.

According to an embodiment, first data of the first logical channel may be transmitted via the at least one second cell when the first mapping restrictions are lifted. According to an embodiment, first data of the first logical channel may be transmitted via at least one of the at least one first cell or the at least one second cell when the first mapping restrictions are lifted.

According to an embodiment, first data of the first logical channel may be transmitted via the at least one first cell in response to applying the first mapping restrictions; and second data of the second logical channel may be transmitted via the at least one second cell in response to applying the second mapping restrictions. According to an embodiment, the duplication may comprise packet data convergence protocol duplication. According to an embodiment, the bearer may be a data radio bearer. According to an embodiment, a logical channel prioritization procedure may be applied based on the first mapping restriction and the second mapping restriction.

Figure 34:
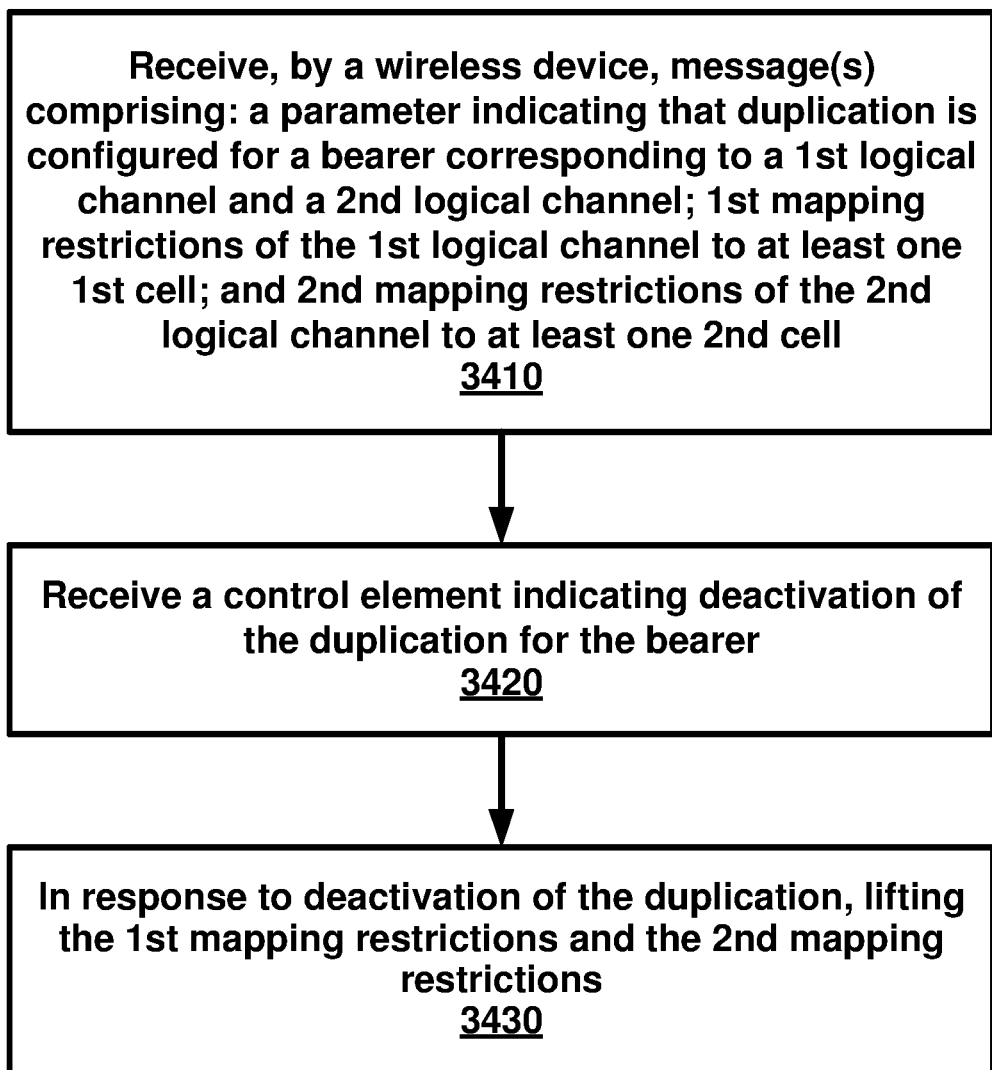
FIG. 34 is a flow diagram of an aspect of an embodiment of the present disclosure.

FIG. 34 is an example flow diagram as per an aspect of an embodiment of the present disclosure. At 3410, a wireless device may receive one or more messages. The one or more messages may comprise: a parameter indicating that duplication may configured for a bearer corresponding to a first logical channel and a second logical channel; first mapping restrictions of the first logical channel to at least one first cell; and second mapping restrictions of the second logical channel to at least one second cell. At 3420, a control element indicating deactivation of the duplication for the bearer may be received. At 3430, in response to deactivation of the duplication, the first mapping restrictions and the second mapping restrictions may be lifted. According to an embodiment, first data of the first logical channel may be transmitted via the at least one second cell when the first mapping restrictions are lifted. According to an embodiment, first data of the first logical channel may be transmitted via at least one of the at least one first cell or the at least one second cell when the first mapping restrictions are lifted.

Figure 35:
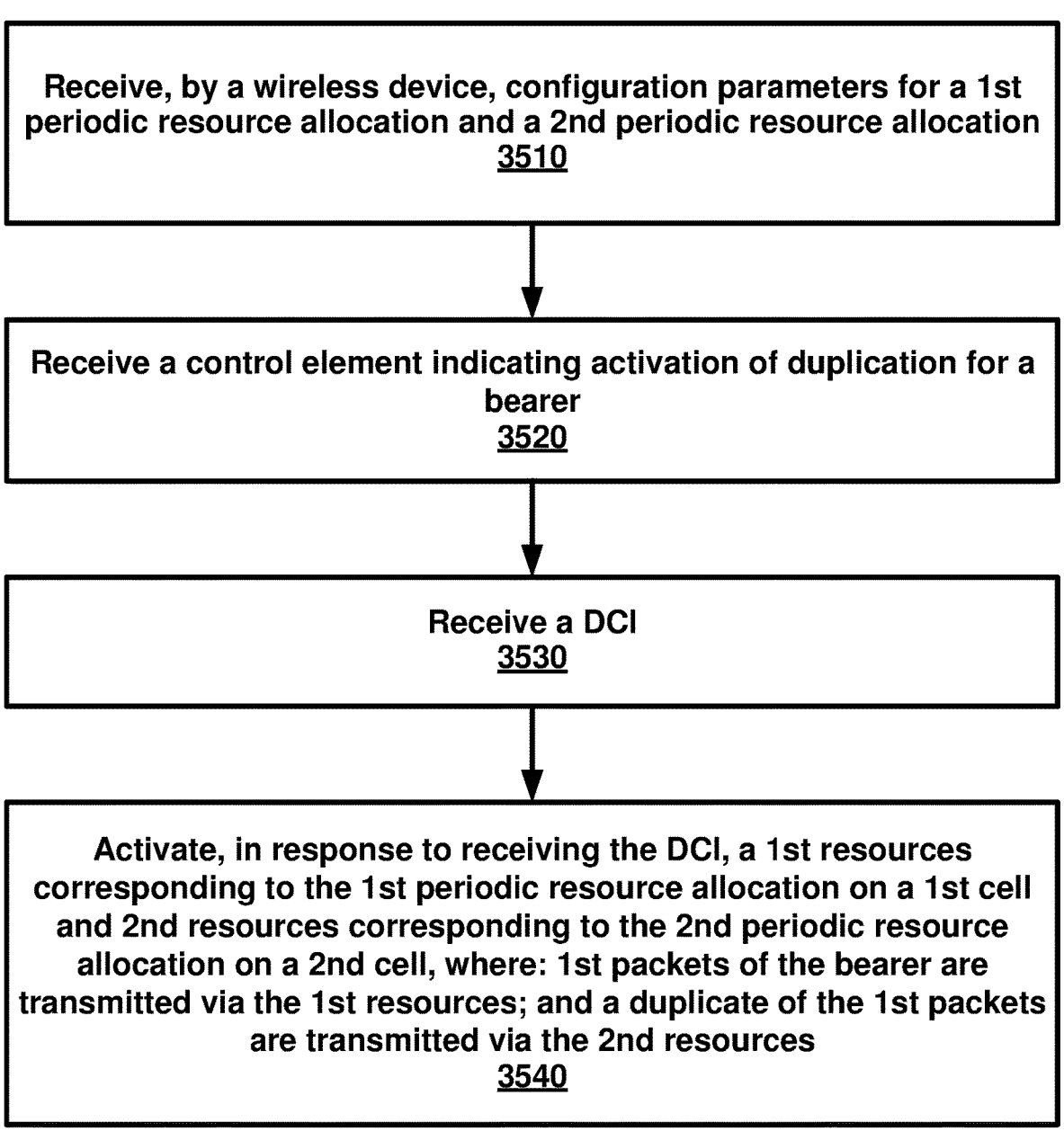
FIG. 35 is a flow diagram of an aspect of an embodiment of the present disclosure.

FIG. 35 is an example flow diagram as per an aspect of an embodiment of the present disclosure. At 3510, a wireless device may receive configuration parameters for a first periodic resource allocation and a second periodic resource allocation. At 3520, a control element indicating activation of duplication for a bearer may be received. At 3530, a downlink control information (DCI) may be received. At 3540, a first plurality of resources may be activated in response to receiving the DCI. The first plurality of resources may correspond to the first periodic resource allocation on a first cell and a second plurality of resources corresponding to the second periodic resource allocation on a second cell. First packets of the bearer may be transmitted via the first plurality of resources. A duplicate of the first packets may be transmitted via the second plurality of resources.

According to an embodiment, the duplication may be packet data convergence protocol duplication. According to an embodiment, the bearer may be a data radio bearer. According to an embodiment, the bearer may correspond to a first logical channel and a second logical channel. According to an embodiment, a first buffer associated with the first logical channel may comprise the first packets; and a second buffer associated with the second logical channel may comprise the duplicate of the first packets. According to an embodiment, the control element may be a medium access control (MAC) control element.

FIG. 36 is an example flow diagram as per an aspect of an embodiment of the present disclosure. At 3610, a wireless device may receive configuration parameters for a first periodic resource allocation and a second periodic resource allocation. At 3620, a control element may be received. The control element may indicate activation of duplication for a bearer. At 3630, in response to receiving the control element, a first plurality of resources and a second plurality of resources may be activated. The first plurality of resources may correspond to the first periodic resource allocation on a first cell. The second plurality of resources may correspond to the second periodic resource allocation on a second cell. First packets of the bearer may be transmitted via the first plurality of resources. A duplicate of the first packets may be transmitted via the second plurality of resources.

According to an embodiment, the duplication may be packet data convergence protocol duplication. According to an embodiment, the bearer may be a data radio bearer. According to an embodiment, the bearer may correspond to a first logical channel and a second logical channel. According to an embodiment, a first buffer associated with the first logical channel may comprise the first packets; and a second buffer associated with the second logical channel may comprise the duplicate of the first packets. According to an embodiment, the control element may be a medium access control (MAC) control element.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in a system comprising one or more TDD cells (e.g. frame structure 2 and/or frame structure 3-licensed assisted access). The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112.

What is claimed is:

1. A method comprising:
   receiving, by a wireless device, one or more messages comprising configuration parameters indicating a plurality of data bearers comprising one or more first data bearers configured with packet data convergence protocol (PDCP) duplication and one or more second data bearers that are not configured with PDCP duplication, wherein each data bearer in the plurality of data bearers is identified by a data bearer identifier;
   receiving a control element of a fixed size of one octet, wherein:
      the control element comprises a sequence of activation bits comprising a first activation bit for a first data bearer in the one or more first data bearers, wherein a first position of the first activation bit in the one octet identifies a second position of a first data bearer identifier in an ordered list of data bearer identifiers of the one or more first data bearers configured with the PDCP duplication, wherein the ordered list of data bearer identifiers excludes the one or more second data bears that are not configured with PDCP duplication; and
      a first value of the first activation bit indicates whether the PDCP duplication for the first data bearer is activated or deactivated; and
   transmitting, in response to the control element indicating that the PDCP duplication is activated for the first data bearer, a first packet corresponding to the first data bearer via a first cell and a duplicate of the first packet via a second cell different from the first cell.

2. The method of claim 1, wherein:
   a first buffer associated with a first logical channel comprises the first packet; and
   a second buffer associated with a second logical channel comprises the duplicate of the first packet.

3. The method of claim 2, wherein the one or messages indicates that:
   the first cell is a first allowed serving cell for transmission of data from the first logical channel; and
   the second cell is a second allowed serving cell for transmission of data from the second logical channel.

4. The method of claim 2, wherein the one or messages indicates that:
   a first plurality of cells are first allowed serving cells for transmission of data from the first logical channel, the first plurality of cells comprising the first cell; and
   a second plurality of cells are second allowed serving cells for transmission of data from the second logical channel, the second plurality of cells comprising the second cell.

5. The method of claim 1, wherein:
   the first packet corresponds to a first radio link control (RLC) entity and a first logical channel; and
   the duplicate of the first packet corresponds to a second RLC entity and a second logical channel.

6. The method of claim 1, further comprising:
   receiving a first uplink grant for transmission of the first packet via the first cell; and
   receiving a second uplink grant for transmission of the duplicate of the first packet via the second cell.

7. The method of claim 1, wherein the ordered list is an ascending ordered list.

8. The method of claim 1, wherein the ordered list is a descending ordered list.

9. The method of claim 1, wherein the first position is same as the second position.

10. The method of claim 1, wherein the control element indicates:
    activation of the PDCP duplication for the first data bearer in response to the first value being one; and
    deactivation of the PDCP duplication for the first data bearer in response to the first value being zero.

11. The method of claim 1, wherein a data bearer in the plurality of data bearers is a data radio bearer.

12. The method of claim 1, wherein the control element is associated with a logical channel identifier indicating that the control element is for PDCP duplication activation/deactivation of one or more data bearers.

13. The method of claim 1, further comprising:
    receiving a second control element indicating that the PDCP duplication is deactivated for the first data bearer;
    receiving an uplink grant for the second cell; and
    transmitting a packet associated with the first data bearer based on the uplink grant.

14. The method of claim 3, wherein:
    the first packet corresponds to a first radio link control (RLC) entity and the first logical channel; and
    the duplicate of the first packet corresponds to a second RLC entity and the second logical channel.

15. The method of claim 13, further comprising:
    receiving a first uplink grant for transmission of the first packet via the first cell; and
    receiving a second uplink grant for transmission of the duplicate of the first packet via the second cell.

16. The method of claim 14, wherein the first position is same as the second position.

17. The method of claim 15, wherein the ordered list is an ascending ordered list.

18. The method of claim 15, wherein the ordered list is a descending ordered list.

19. The method of claim 4, wherein:
    the first packet corresponds to a first radio link control (RLC) entity and the first logical channel; and
    the duplicate of the first packet corresponds to a second RLC entity and the second logical channel.

20. The method of claim 19, further comprising:
    receiving a first uplink grant for transmission of the first packet via the first cell; and
    receiving a second uplink grant for transmission of the duplicate of the first packet via the second cell.

* * * * *